United States Patent
Buchan

(10) Patent No.: US 7,584,165 B2
(45) Date of Patent: Sep. 1, 2009

(54) SUPPORT APPARATUS, METHOD AND SYSTEM FOR REAL TIME OPERATIONS AND MAINTENANCE

(75) Inventor: John Gibb Buchan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 230 days.

(21) Appl. No.: 10/753,190

(22) Filed: Dec. 31, 2003

(65) Prior Publication Data

US 2004/0153437 A1 Aug. 5, 2004

Related U.S. Application Data

(60) Provisional application No. 60/443,725, filed on Jan. 30, 2003.

(51) Int. Cl.
*G06N 5/00* (2006.01)
(52) U.S. Cl. .......................................... 706/60; 706/45
(58) Field of Classification Search .................. 706/60, 706/19; 705/50; 704/1; 717/115
See application file for complete search history.

(56) References Cited

U.S. PATENT DOCUMENTS

| | | | |
|---|---|---|---|
| 3,045,750 A | 7/1962 | Peters et al. |
| 3,760,362 A | 9/1973 | Copland et al. |
| 3,971,926 A | 7/1976 | Gau et al. |
| 4,461,172 A | 7/1984 | McKee et al. |
| 4,559,610 A | 12/1985 | Sparks et al. |
| 4,633,954 A | 1/1987 | Dixon et al. |
| 4,676,313 A | 6/1987 | Rinaldi |
| 4,685,522 A | 8/1987 | Dixon et al. |
| 4,721,158 A | 1/1988 | Merritt, Jr. et al. |
| 4,738,313 A | 4/1988 | McKee |

(Continued)

FOREIGN PATENT DOCUMENTS

EP 1 679 424 A2 7/2006

(Continued)

OTHER PUBLICATIONS

Rommetveit, Rolv, Vefring, E.H., Wang, Zhihua, Bieseman, Taco, Faure, A.M., "*A Dynamic Model for Underbalanced Drilling With Coiled Tubing*," SPE/IADC 29363, paper prepared for presentation at the 1995 SPE/IADC Drilling Conference, Amsterdam, Feb. 28-Mar. 2, 1995, 11 pages.

(Continued)

*Primary Examiner*—Wilbert L Starks, Jr.
(74) *Attorney, Agent, or Firm*—Fish & Richardson P.C.

(57) ABSTRACT

An apparatus, system and method for facilitating decision-making in connection with management of enterprise assets are disclosed. A real time expert decision support module is interfaced with an access portal including a navigation table for asset management, and with an historical parameter database associated with a distributed control system of plant end sensors and actuated control elements of a production process. The access portal and navigation table provide access to tools in the support module that facilitate real time decision making information delivery to the functional teams that support an asset, line of sight management performance models of team performance, practical performance analysis tools that extract information in real time from the process control system and other sources of asset data for translation into actionable information, and a real time interactive schematic environment.

131 Claims, 20 Drawing Sheets

U.S. PATENT DOCUMENTS

| | | | |
|---|---|---|---|
| 5,208,748 A * | 5/1993 | Flores et al. | 704/1 |
| 5,442,730 A * | 8/1995 | Bigus | 706/19 |
| 5,455,780 A | 10/1995 | Nguyen et al. | |
| 5,531,270 A | 7/1996 | Fletcher et al. | |
| 5,547,029 A | 8/1996 | Rubbo et al. | |
| 5,565,862 A | 10/1996 | Hubbard et al. | |
| 5,566,092 A | 10/1996 | Wang et al. | |
| 5,597,042 A | 1/1997 | Tubel et al. | |
| 5,636,693 A | 6/1997 | Elmer | |
| 5,662,165 A | 9/1997 | Tubel et al. | |
| 5,706,892 A | 1/1998 | Aeschbacher, Jr. et al. | |
| 5,706,896 A | 1/1998 | Tubel et al. | |
| 5,710,726 A | 1/1998 | Rowney et al. | |
| 5,721,538 A | 2/1998 | Tubel et al. | |
| 5,730,219 A | 3/1998 | Tubel et al. | |
| 5,732,776 A | 3/1998 | Tubel et al. | |
| 5,764,515 A | 6/1998 | Guerillot et al. | |
| 5,767,680 A | 6/1998 | Torres-Verdin et al. | |
| 5,829,520 A | 11/1998 | Johnson | |
| 5,841,678 A | 11/1998 | Hasenberg et al. | |
| 5,842,149 A | 11/1998 | Harrell et al. | |
| 5,859,437 A | 1/1999 | Hsu et al. | |
| 5,871,047 A | 2/1999 | Spath et al. | |
| 5,873,049 A | 2/1999 | Bielak et al. | |
| 5,881,811 A | 3/1999 | Lessi et al. | |
| 5,959,547 A | 9/1999 | Tubel et al. | |
| 5,975,204 A | 11/1999 | Tubel et al. | |
| 5,979,558 A | 11/1999 | Bouldin et al. | |
| 5,992,519 A | 11/1999 | Ramakrishnan et al. | |
| 6,002,985 A | 12/1999 | Stephenson | |
| 6,021,377 A | 2/2000 | Dubinsky et al. | |
| 6,021,662 A | 2/2000 | Moulu et al. | |
| 6,022,985 A | 2/2000 | Authelin et al. | |
| 6,023,656 A | 2/2000 | Cacas et al. | |
| 6,076,046 A | 6/2000 | Vasudevan et al. | |
| 6,088,656 A | 7/2000 | Ramakrishnan et al. | |
| 6,095,262 A | 8/2000 | Chen | |
| 6,098,020 A | 8/2000 | den Boer | |
| 6,101,447 A | 8/2000 | Poe, Jr. | |
| 6,112,126 A | 8/2000 | Hales et al. | |
| 6,112,817 A | 9/2000 | Voll et al. | |
| 6,176,323 B1 | 1/2001 | Weirich et al. | |
| 6,182,756 B1 | 2/2001 | Garcia et al. | |
| 6,192,980 B1 | 2/2001 | Tubel et al. | |
| 6,236,894 B1 | 5/2001 | Stoisits et al. | |
| 6,266,619 B1 | 7/2001 | Thomas et al. | |
| 6,281,489 B1 | 8/2001 | Tubel et al. | |
| 6,282,452 B1 | 8/2001 | DeGuzman et al. | |
| 6,356,844 B2 | 3/2002 | Thomas et al. | |
| 6,397,946 B1 | 6/2002 | Vail, III | |
| 6,412,555 B1 | 7/2002 | Sten-Halvorsen et al. | |
| 6,422,312 B1 | 7/2002 | Delatorre et al. | |
| 6,424,919 B1 | 7/2002 | Moran et al. | |
| 6,434,435 B1 | 8/2002 | Tubel et al. | |
| 6,442,445 B1 | 8/2002 | Bunkofske et al. | |
| 6,516,293 B1 | 2/2003 | Huang et al. | |
| 6,549,879 B1 | 4/2003 | Cullick et al. | |
| 6,584,368 B2 | 6/2003 | Bunkofske et al. | |
| 6,609,079 B1 | 8/2003 | Seitlinger | |
| 6,662,109 B2 | 12/2003 | Roggero et al. | |
| 6,678,569 B2 | 1/2004 | Bunkofske et al. | |
| 6,701,514 B1 * | 3/2004 | Haswell et al. | 717/115 |
| 6,823,296 B2 | 11/2004 | Rey-Fabret et al. | |
| 6,826,483 B1 | 11/2004 | Anderson et al. | |
| 6,853,921 B2 | 2/2005 | Thomas et al. | |
| 6,871,118 B2 | 3/2005 | Henriot et al. | |
| 6,954,737 B2 * | 10/2005 | Kalantar et al. | 705/50 |
| 6,980,940 B1 | 12/2005 | Gurpinar et al. | |
| 6,985,750 B1 | 1/2006 | Vicknair et al. | |
| 7,027,968 B2 | 4/2006 | Choe et al. | |
| 7,047,170 B2 | 5/2006 | Feldman et al. | |
| 7,054,752 B2 | 5/2006 | Zabalza-Mezghani et al. | |
| 7,062,420 B2 | 6/2006 | Poe, Jr. | |
| 7,072,809 B2 | 7/2006 | Egermann et al. | |
| 7,096,092 B1 | 8/2006 | Ramakrishnan et al. | |
| 7,200,533 B2 | 4/2007 | Hu et al. | |
| 7,266,456 B2 | 9/2007 | De Guzman et al. | |
| 7,277,836 B2 | 10/2007 | Netemeyer et al. | |
| 7,357,196 B2 | 4/2008 | Goldman et al. | |
| 7,373,976 B2 | 5/2008 | Casey | |
| 7,389,185 B2 | 6/2008 | Craig | |
| 2002/0049625 A1 | 4/2002 | Kilambi et al. | |
| 2003/0167157 A1 | 9/2003 | Mougin et al. | |
| 2004/0104027 A1 | 6/2004 | Rossi et al. | |
| 2004/0138862 A1 | 7/2004 | Hu et al. | |
| 2004/0148147 A1 | 7/2004 | Martin | |
| 2004/0153437 A1 | 8/2004 | Buchan | |
| 2004/0220790 A1 | 11/2004 | Cullick et al. | |
| 2004/0230413 A1 | 11/2004 | Chen | |
| 2004/0236553 A1 | 11/2004 | Chen et al. | |
| 2004/0254734 A1 | 12/2004 | Zabalza-Mezghani et al. | |
| 2005/0010384 A1 | 1/2005 | Rheem et al. | |
| 2005/0038603 A1 | 2/2005 | Thomas et al. | |
| 2005/0096893 A1 | 5/2005 | Feraille et al. | |
| 2005/0149307 A1 | 7/2005 | Gurpinar et al. | |
| 2005/0267718 A1 | 12/2005 | Guyaguler et al. | |
| 2005/0267771 A1 | 12/2005 | Biondi et al. | |
| 2005/0273301 A1 | 12/2005 | Huang | |
| 2005/0273303 A1 | 12/2005 | Flandrin et al. | |
| 2006/0085174 A1 | 4/2006 | Hemanthkumar et al. | |
| 2006/0116856 A1 | 6/2006 | Webb | |
| 2006/0149520 A1 | 7/2006 | Le Ravalec-Dupin et al. | |
| 2006/0224369 A1 | 10/2006 | Yang et al. | |
| 2007/0078637 A1 | 4/2007 | Martin et al. | |
| 2007/0112547 A1 | 5/2007 | Ghorayeb et al. | |
| 2007/0179766 A1 | 8/2007 | Cullick et al. | |
| 2007/0179767 A1 | 8/2007 | Cullick et al. | |
| 2007/0179768 A1 | 8/2007 | Cullick et al. | |
| 2007/0192072 A1 | 8/2007 | Cullick et al. | |
| 2007/0265815 A1 | 11/2007 | Couet et al. | |
| 2007/0271077 A1 | 11/2007 | Kosmala et al. | |
| 2007/0295501 A1 | 12/2007 | Poulisse | |
| 2008/0077371 A1 | 3/2008 | Yeten et al. | |
| 2008/0082469 A1 | 4/2008 | Wilkinson et al. | |
| 2008/0091396 A1 | 4/2008 | Kennon et al. | |
| 2008/0133194 A1 | 6/2008 | Klumpen et al. | |
| 2008/0133550 A1 | 6/2008 | Orangi et al. | |
| 2008/0154505 A1 | 6/2008 | Kim et al. | |
| 2008/0162100 A1 | 7/2008 | Landa | |
| 2008/0249906 A1 | 10/2008 | Landis, Jr. et al. | |
| 2008/0270328 A1 | 10/2008 | Lafferty et al. | |
| 2008/0275594 A1 | 11/2008 | de Guzman | |
| 2008/0288226 A1 | 11/2008 | Gurpinar et al. | |

FOREIGN PATENT DOCUMENTS

| | | |
|---|---|---|
| GB | 2320731 | 7/1998 |
| GB | 2395315 A | 5/2004 |
| WO | WO 97/41330 | 11/1997 |
| WO | WO 97/49894 | 12/1997 |
| WO | WO 98/07049 | 2/1998 |
| WO | WO 98/12417 | 3/1998 |
| WO | WO 98/37465 | 8/1998 |
| WO | WO 99/60247 | 11/1999 |
| WO | WO 02/054332 A1 | 7/2002 |
| WO | WO 02/063130 A1 | 8/2002 |
| WO | WO 2004/049216 | 6/2004 |
| WO | WO 2004/079144 A2 | 9/2004 |
| WO | WO 2004/095259 A1 | 11/2004 |

OTHER PUBLICATIONS

Caers, Jef, "*Efficient gradual deformation using a streamline-based proxy method*", Journal of Petroleum Science and Engineering 39 (2003), pp. 57-83 (27 pages).

Yeten, B., Castellini, A., Guyaguler, B., Chen, W.H., "*A Comparison Study on Experimental Design and Response Surface Methodologies*", SPE 93347, prepared for presentation at the 2005 SPE Reservoir Simulation Symposium in Houston, Texas, Jan. 31-Feb. 2, 2005, 15 pages.

Guyaguler, Baris, Horne, Roland N., Rogers, Leah, Rosenzweig, Jacob J., "*Optimization of Well Placement in a Gulf of Mexico Waterflooding Project*", SPE 63221, pp. 667-676, prepared for presentation at the 2000 SPE Annual Technical Conference and Exhibition, Dallas, Texas, Oct. 1-4, 2000, 12 pages.

Aminian, K., Ameri, S., "*Application of artificial neural networks for reservoir characterization with limited data*", Journal of Petroleum Science and Engineering 49, pp. 212-222, May 20, 2005, 11 pages.

Oberwinkler, Christian, Stundner, Michael, "*From Real Time Data to Production Optimization*", SPE 87008, prepared for presentation at the SPE Asia Pacific Conference on Integrated Modelling for Asset Management, Kuala Lumpur, Malaysia, Mar. 29-30, 2004, 14 pages.

Oberwinkler, Christian, Ruthammer, Gerhard, Zangl, Georg, Economides, Michael, "*New Tools for Fracture Design Optimization*", SPE 86467, prepared for presentation at the SPE International Symposium and Exhibition on Formation Damage Control, Lafayette, Louisiana, Feb. 18-20, 2004, 13 pages.

Johnson, Virginia M., Ammer, James R., Trick, Mona D., "*Improving Gas Storage Development Planning Through Simulation-Optimization*", SPE 65639, prepared for presentation at the 2000 SPE Eastern Regional Meeting, Morgantown, West Virginia, Oct. 17-19, 2000, 18 pages.

Du, Yuqi, Weiss, W.W., Xu, Jianyun, Balch, R.S., Li, Dacun, "*Obtain an Optimum Artificial Neural Network Model for Reservoir Studies*", SPE 84445, prepared for presentation at the SPE Annual Technical Conference and Exhibition, Denver, Colorado, Oct. 5-8, 2003, 8 pages.

Sengul, Mahmut, Bekkousha, Miloud A., "*Applied Production Optimization: i-Field*", SPE 77608, prepared for presentation at the SPE Annual Technical Conference and Exhibition, San Antonio, Texas, Sep. 29-Oct. 2, 2002, 12 pages.

Stundner, M., Al-Thuwaini, J.S., "*How Data-Driven Modeling Methods like Neural Networks can help to integrate different Types of Data into Reservoir Management*", SPE 68163, prepared for presentation at the 2001 SPE Middle East Oil Show, Bahrain, Mar. 17-20, 2001, 8 pages.

Yeten, Burak, Durlofsky, Louis J., Aziz, Khalid, "*Optimization of Nonconventional Well Type, Location, and Trajectory*", SPE 86880, SPE Journal, Sep. 2003, pp. 200-210 (11 pages).

He, Xin-Gui, Xu, Shao-Hua, "*Process Neural Network with Time-Varied Input and Output Functions and its Applications*," Ruan Jian Xue Bao/Journal of Software, v. 14, n. 4, Apr. 2003. p. 764-769 (6 pages).

Dashevskiy, D., Dubinsky, V., Macpherson, J.D., "*Application of Neural Networks for Predictive Control in Drilling Dynamics*", SPE 56442, prepared for presentation at the 1999 SPE Annual Technical Conference and Exhibition, Houston, Texas, Oct. 3-6, 1999, 10 pages.

Centilmen, A., Ertekin, T., Grader, A.S., "*Applications of Neural Networks in Multiwell Field Development*", SPE 56433, prepared for presentation at the 1999 SPE Annual Technical Conference and Exhibition, Houston, Texas, Oct. 3-6, 1999, 13 pages.

Sung, Andrew H., "*Applications of soft computing in petroleum engineering*", SPIE vol. 3812, Part of the SPIE Conference on Applications and Science of Neural Networks, Fuzzy Systems, and Evolutionary Computation II, Denver, Colorado, Jul. 1999, 13 pages.

Mohaghegh, Shahab D., "*Recent Developments in Application of Artificial Intelligence in Petroleum Engineering*", Journal of Petroleum Technology, v. 57, n. 4, Apr. 2005, pp. 86-91 (6 pages).

Dirk Neupert, Michael Schlee, Ewald Simon, MODI-an expert system supporting reliable, economical power plant control. Jan. 1994, ABB Review.

B. He and A.K. Kochhar, An expert system for the diagnosis and control of manufacturing processes, Nov. 1988, International Conference on Computer Aided Production Engineering.

European Patent Office, Supplementary European Search Report for Application No. EP 04704046.4-2224, dated Oct. 25, 2006 (4 pages).

KBR Enterprise—Client RTO Portal, RTO Portal User Manual, Version 1, Dec. 2002, 91 pages.

Clark E. Robison, "*Overcoming the Challenges Associated With the Life-Cycle Management of Multilateral Wells: Assessing Moves Toward the 'Intelligent Completion'*", SPE 38497, paper prepared for presentation at the 1997 Offshore Europe Conference, Aberdeen, Scotland, Sep. 9-12, 1997, pp. 269-276.

Ian C. Phillips, "*Reservoir Management of the Future*", Halliburton M&S Ltd., Aberdeen, Scotland, paper presented at EU Thermie Conference, Apr. 1997, Aberdeen, Scotland, pp. 1-15.

Safley et al., "*Projects Implement Management Plans*", The American Oil & Gas Reporter, vol. 41, No. 9, Sep. 1998, XP000957690, pp. 136, 138-142.

Vinje, "*Reservoir Control Using Smart Wells*", 10$^{th}$ Underwater Technology Conference Proceedings, Mar. 25-26, 1998, XP000957692, 9 pages.

Beamer et al., "*From Pore To Pipeline, Field Scale Solutions*"; Oilfield Review, vol. 10, No. 2, 1998, XP000961345, pp. 2-19.

Allard et al., "*Reservoir Management Making A Difference In Australia's First Oilfield Developed Entirely With Horizontal Wells*", paper SPE 50051, SPE Asia Specific Oil & Gas Conf., Oct. 12-14, 1998, pp. 165-173.

Smith et al., "*The Road Ahead To Real-Time Oil And Gas Reservoir Management*", Trans. Inst. Chem. Eng., vol. 76, No. A5, Jul. 1998, XP000957748, 18 pages.

Notification of Transmittal of the International Search Report or the Declaration (3 pages) and International Search Report (4 pages) for International Application No. PCT/US 00/19443, dated Nov. 14, 2000.

Tulsa Petroleum Abstracts, Keyword Search Results (Abstracts 1-113), 212 pages, various authors and dates.

Ajayi, et al., "*A Dynamic Optimisation Technique for Simulation of Multi-Zone Intelligent Well Systems in a Reservoir Development*", SPE 84192 Society of Petroleum Engineers, Copyright 2003, pp. 1-7.

Bruni, et al., "*A Technically Rigorous and Fully Automated System for Performance Monitoring and Production Test Validation*", SPE 84881, Society of Petroleum Engineers, Copyright 2003, pp. 1-19.

Webpage, Landmark: A Halliburton Company, "*Calendar of Innovations 2003*", Apr. 2003—Decision Space™—Decision Management System, mhtml:file://C:\Documents%20and%20Settings\jyg.FRDOMAIN\Local%20Settings\Tempo..., printed Jun. 6, 2004, 2 pages.

Webpage, Landmark: A Halliburton Company, "*Calendar of Innovations 2003*", May 2003—Decision Space Asset Planner™, mhtml:file://C:\Documents%20and%20Settings\jyg.FRDOMAIN\Local%20Settings\Tempo..., printed Jun. 6, 2004, 2 pages.

Brochure, Landmark: A Halliburton Company, Corporate Data Archiver™, Copyright 2003, 4 pages.

Cullick, et al., "*Optimizing Multiple-Field Scheduling and Production Strategy with Reduced Riski*", SPE 84239, Society of Petroleum Engineer, Copyright 2003, pp. 1-12.

Litvak, et al., "*Prudhoe Bay E-Field Production Optimization System Based on Integrated Reservoir and Facility Simulation*", SPE 77643, Society of Petroleum Engineers, Copyright 2002, pp. 1-11.

Bogaert, et al., "*Improving Oil Production Using Smart Fields Technology in the SF30 Satellite Oil Development Offshore Malaysia*," OTC 16162, Offshore Technology Conference, Copyright 2004, pp. 1-7.

Notification of Transmittal of the International Search Report and the Written Opinion of the International Searching Authority, or the Declaration (1 page), International Search Report (3 pages), and Written Opinion of the International Searching Authority (4 pages) for International Application No. PCT/US04/01534 mailed Dec. 14, 2005.

Halliburton Energy Services, Inc., "*SmartWell Technology Asset Management of the Future*", Aug. 1998 (6 pages).

G. Botto et al., Synopsis of "*Innovative Remote Controlled Completion for Aquila Deepwater Challenge*", JPT, Oct. 1997, originally presented at the 1996 SPE European Petroleum Conference, Milan, Italy, Oct. 22-24, 1996 (3 pages).

Sheila Popov, "*Two Emerging Technologies Enhance Reservoir Management*", Hart's Petroleum Engineer International, Jan. 1998, pp. 43 and 45.

Dick Ghiselin, "*New Technology, New Techniques, Set the Pace for Success*", Hart's Petroleum Engineer International, Jan. 1998, 2 pages.

Ken R. LeSuer, "*Breakthrough Productivity—Our Ultimate Challenge*", Offshore, Dec. 1987 (1 page).

Thomas R. Bates, Jr., "*Technology Pace Must Accelerate to Counter Oilfield Inflation*", Offshore, Dec. 1987 (1 page).

Bjarte Bruheim, "*Data Management—A Key to Cost Effective &P*", Offshore, Dec. 1987.

David M. Clementz, "*Enabling Role of Information Technology: Where are the Limits?*", Offshore, Dec. 1997, p. 42.

George R. Remery, "Reshaping Development Opportunities", and David Harris, *Training and Cooperation Critical to Deepwater Furture*, Offshore, Dec. 1997, p. 44.

Marsh, Jack, et al., "*Wildcat Hills Gas Gathering System Case Studies: An Integrated Approach From Reservoir Development Through to Sales Pipeline Delivery*," Society of Petroleum Engineers, SPE 75698, Copyright 2002, 13 pages.

Liao, TonyTianlu, et al., "*Evaluating Operation Strategies via Integrated Asset Modeling*," Society of Petroleum Engineers, SPE 75525, Copyright 2002, Abstract Only, 2 pages.

Lobato-Barradas, Gerardo, et al., "*Integrated Compositional Surface-Subsurface Modeling for Rate Allocation Calculations*," Society of Petroleum Engineers, SPE 74382, Copyright 2002, Abstract Only, 1 page.

Zapata, V.J., et al., "*Advances in Tightly Coupled Reservoir/Wellbore/Surface-Network Simulation*," SPE Reservoir Evaluation & Engineering, vol. 4, No. 2, SPE 71120, Apr. 2001, pp. 114-120, Abstract Only, 3 pages.

Beliakova, N., et al., "*Hydrocarbon Field Planning Tool for Medium to Long Term Production Forecasting from Oil and Gas Fields Using Integrated Subsurface—Surface Models*," Society of Petroleum Engineers, SPE 65160, Copyright 2000, 5 pages.

Barroux, C.C., et al., "*Linking Reservoir and Surface Simulators: How to Improve the Coupled Solutions*," Society of Petroleum Engineers, SPE 65159, Copyright 2000, Abstract Only, 2 pages.

Litvak, M.L., et al., "*Simplified Phase-Equilibrium Calculations in Integrated Reservoir and Surface-Pipeline-Network Models*," SPE Journal, vol. 5, No. 2, SPE 64498, Jun. 2000, pp. 236-241, Abstract Only, 3 pages.

Weisenborn, A.J. (Toon), et al., "*Compositional Integrated Subsurface-Surface Modeling*," Society of Petroleum Engineers, SPE 65158, Copyright 2000, Abstract Only, 2 pages.

Tingas, John, "*Integrated Reservoir and Surface Network Simulation in Reservoir Management of Southern North Sea Gas Reservoirs*," Society of Petroleum Engineers, SPE 50635, Copyright 1998, Abstract Only, 2 pages.

Trick, M.D., "*A Different Approach to Coupling a Reservoir Simulator with a Surface Facilities*," Society of Petroleum Engineers, SPE 40001, Copyright 1998, Abstract Only, 1 page.

Hepguler, Gokhan, "*Integration of a Field Surface and Production Network With a Reservoir Simulator*," SPE Computer Applications, vol. 12, No. 4, SPE 38937, Jun. 1997, Abstract Only, 3 pages.

Deutman, Robert, et al., "*A Case Study of Integrated Gas Field System Modelling in the North Sea Environment*," Society of Petroleum Engineers, SPE 38556, Copyright 1997, Abstract Only, 2 pages.

Pieters, Johan, et al., "*Total System Modelling—A Tool for Effective Reservoir Management of Multiple Fields with Shared Facilities*," Society of Petroleum Engineers, SPE 30442, Copyright 1995, Abstract Only, 2 pages.

Litvak, M.L., et al., "*Surface Network and Well Tubing head Pressure Constraints in Compositional Simulation*," Society of Petroleum Engineers, SPE 29125, Copyright 1995, Abstract Only, 2 pages.

Haugen, E.D., et al., "*Simulation of Independent Reservoirs Couled by Global Production and Injection Constraints*," Society of Petroleum Engineers, SPE 29106, Copyright 1995, Abstract Only, 2 pages.

Halliburton, Drilling, Evaluation and Digital Solutions, Landmark, The Role and Development of the Operational Asset Optimization Model Within DecisionSpace for Production Solutions, White Paper, May 2007, 16 pages.

Laplante, Phillip, "*It Isn't Your Fathers Realtime Anymore*," System Performance, vol. 4, No. 1, Feb. 2006, 3 pages.

Computer Searching Results, File 8:Ei Compendex ®, 1970-2007/Dec W5, Jan. 2008, 22 pages.

Computer Searching Results, File 351:Derwent WPI 1963-2006/UD=200703, Jan. 2008, 10 pages.

Computer Searching Results, Search 1, File 340:Claims®/US Patent 1950-07/Jan. 9, 2008.

Computer Searching Results, Search 2, File 340:Claims®/US Patent 1950-07/Jan. 9, 2008.

U.S. Appl. No. 11/625,197, Inventors Richard G. Ella, Andrew Russell, Laurence Reid, and William D. Johnson, "Dynamic Production System Management," filed Jan. 19, 2007.

U.S. Appl. No. 11/625,141, Inventors Richard G. Ella, Andrew P. Russell, Laurence Reid, and William D. Johnson, "Dynamic Production System Management," filed Jan. 19, 2007.

S. Hsieh and C.-C. Chiang, "Manufacturing-to-Sale Planning Model for Fuel Oil Production," The International Journal of Advanced Manufacturing Technology, 2001, 18:303-311.

Reissue U.S. Appl. No. 11/704,369, filed Feb. 8, 2007, entitled "System and Method for Real Time Reservoir Management", inventors Jacob Thomas et al.

Accelerated Examination U.S. Appl. No. 12/121,710, filed May 15, 2008, entitled "Dynamic Production System Management", inventors Richard G. Ella et al.

Written Opinion of the International Preliminary Examination Authority for International Application No. PCT/US04/01534 mailed May 6, 2008 (5 pages).

Written Opinion of the International Preliminary Examining Authority for International Application No. PCT/USO4/01534 mailed May 29, 2008 (5 pages).

Official Action by the Patent Office of Uzebekistan for PCT Application No. US2004/001534 of Jan. 21, 2004 received Oct. 7, 2008 (6 pages).

Official Action by the Patent Office of Mexico for PCT Application No. PA/a/2005/008105 of Nov. 21, 2008 received Dec. 17, 2008 (6 pages).

J.P. Lechner, et al., "Treating Uncertainties in Reservoir Performance Prediction With Neural Networks", SPE 94357, XP-002438774, Society of Petroleum Engineers, Copyright 2005, 8 pages.

T.E.H. Esmaiel, et al., "Determination of WAG Ratios and Slug Sizes Under Uncertainty in a Smart Wells Environment," SPE 93569, XP-002438797, Society of Petroleum Engineers, Inc., Copyright 2005, 9 pages.

Sanjay Srinivasan, et al., "Conditioning reservoir models to dynamic data—A forward modeling perspective," SPE 62941, Society of Petroleum Engineers, Copyright 2000, 16 pages.

Mahmut Sengul, et al., "Applied Production Optimization: i-Field," SPE 77608, Society of Petroleum Engineers, Copyright 2002, 12 pages.

Saputelli L., et al., "A Critical Overview of Artificial Neural Network Applications in the Context of Continuous Oil Field Optimization," SPE 77703, Society of Petroleum Engineers, Copyright 2002, 10 pages.

Burak Yeten, et al., "Optimization of Smart Well Control," SPE/Petroleum Society of CIM/CHOA 79031, SPE/PS-CIM/CHOA International Termal Operations and Heavy Oil Symposium and International Horizontal Well Technology Conference, Copyright 2002, 10 pages.

L.A. Saputelli, et al., "Promoting Real-Time Optimization of Hydrocarbon Producing Systems," SPE 83978, Society of Petroleum Engineers, Copyright 2003, 9 pages.

Jorge L. Landa, et al., "A Methodology for History Matching and the Assessment of Uncertainties Associated with Flow Prediction," SPE 84465, XP-002438840, Society of Petroleum Engineers, Copyright 2003, 14 pages.

Christian Oberwinkler, et al., "From Real Time Data to Production Optimization," SPE 87008, Society of Petroleum Engineers, Copyright 2004, 14 pages.

B. Yeten, et al., "A Comparison Study on Experimental Design and Response Surface Methodologies," SPE 93347, Society of Petroleum Engineers, 15 pages.

J.R.P. Rodrigues, "Calculating Derivatives for History Matching in Reservoir Simulators," SPE 93445, XP-002444471, Society of Petroleum Engineers, Copyright 2005, 9 pages.

T.E.H. Esmaiel, et al., "Reservoir Screening and Sensitivity Analysis of Waterflooding With SmartWells Through the Application of Experimental Design," SPE 93568, XP-002438798, Society of Petroleum Engineers, Copyright 2005, 8 pages.

A.S. Cullick, et al., "Improved and More-Rapid History Matching With a Nonlinear Proxy and Global Optimization," SPE 101933, Society of Petroleum Engineers, Copyright 2006, 13 pages.

J.L. Landa, et al., "History Match and Associated Forecast Uncertainty Analysis—Practical Approaches Using Cluster Computing," IPTC 10751, XP-002444470, International Petroleum Technology Conference, Copyright 2005, 10 pages.

James Glimm, et al., "Risk management for petroleum reservoir production: A simulation-based study of prediction," Computational Geosciences 5: 173-197, Copyright 2001, 25 pages.

Stephen Chenney, et al., "Proxy Simulations For Efficient Dynamics," The Eurographics Association, Copyright 2001, 10 pages.

Lindsay Birt, et al., "ECLIPSE FloGrid, Application of the ECLIPSE FloGrid fault property calculator to a simple injector-producer pair," Schlumberger Information Solutions, Copyright 2003, 6 pages.

H. Klie, et al., "Models, methods and middleware for grid-enabled multiphysics oil reservoir management," Engineering with Computers, Springer-Verlag London Limited, Copyright 2006, 22 pages.

G. Zangl, et al., "Proxy Modeling in Production Optimization," SPE 100131, Society of Petroleum Engineers, Copyright 2008, 7 pages.

Abstract of "Schedule optimization to complement assisted history matching and prediction under undertainty," H.A. Jutila, Society of Petroleum Engineers, 68th European Association of Geoscientists and Engineers Conference and Exhibition, publication date Dec. 1, 2006, 2 pages.

Abstract of "A rigorous well model to optimize production from intelligent wells and establish the back-allocation Algorithm," T. Graf, Society of Petroleum Engineers, 68th European Association of Geoscientists and Engineers Conference and Exhibition, publication date Dec. 1, 2006, 2 pages.

Abstract of "Improved and more-rapid history matching with a nonlinear proxy and global optimization," A.S. Cullick, SPE Annual Technical Conference and Exhibition, publication date Nov. 23, 2006, 2 pages.

Abstract of "Optimization of the WAG process under uncertainty in a smart wells environment: Utility theory approach," T.E.H. Esmaiel, 2006 SPE Intelligent Energy Conference and Exhibition, publication date Jul. 7, 2006, 2 pages.

Notification of Transmittal of International Preliminary Report on Patentability (2 pages) and International Preliminary Report on Patentability (4 pages) for International Application No. PCT/US04/01534 mailed Oct. 21, 2008.

* cited by examiner

| SOURCE OF INFORMATION | TYPE OF INFORMATION | VALUE OF INFORMATION | APPLICATION OF INFORMATION | DECISION MAKING NEEDS | RTO |
|---|---|---|---|---|---|
| CONTROL SYSTEM | • FACILITY/PROCESS PARAMETER TRENDS<br>• PROCESS VARIANCES<br>• PROCESS SET POINTS<br>• HISTORY REPORTS | • DEMONSTRATES UPTIME VARIANCES<br>• OPPORTUNITY TO OPTIMIZE PROCESS UPTIME<br>• OPPORTUNITY TO STABILIZE PRODUCTION, REDUCE POWER NEEDS, FUEL GAS USE RED<br>• PROVIDES OPERATING ENVELOPE | • REAL TIME PROCESS CONTROLS OPTIMIZATION<br>– UPTIME<br>– ENERGY EFFICIENCY<br>– PRODUCT QUALITY<br>– STABILITY | • REAL TIME & PROCESS/INSTRUMENT DATA | REAL TIME |
| EMERG S/D SYSTEM | • ALARM CONDITIONS<br>• OUT OF SPEC ALARMS<br>• ALARM HISTORY | • RCFA INFO<br>• HIGHLIGHTS PROBLEM AREAS IN FACILITY<br>• BENCHMARKS TRIP PERFORMANCE (WHERE & HOW OFTEN)<br>• OVERALL & UNIT PROBLEMS | • PROCESS ALARM REDUCTION<br>• IPMENT S/D & MAINTENANCE SCHEDULING | • REAL TIME OPTIMIZATION<br>REAL TIME DECISION<br>• EQUIPT TRENDS | WEB SOLUTION |
| OPERATOR LOGS | • CHEMICAL USE<br>• OPERATING HISTORY | • AREAS OF PROBLEMS IN PROCESS<br>• OPTIMIZE CHEMICAL USE<br>• WELL TEST INFO FOR PRODUCTION IMPROVEMENT<br>• BS&W PERFORMANCE<br>• OPERATOR ACTIVITIES | • MATERIAL PLANNING & INVENTORY CONTROL<br>• LABOR RESOURCE PLANNING | • W.O. INFO | WEB SOLUTION |
| EQUIPT MONITORING | • EQUIPT TRENDS IN PERFORMANCE ENVELOPE<br>• POTENTIAL ALARM CONDITIONS | • AREAS OF EQUIPT WEAKNESS<br>• DEFECT ELIMINATION IMPROVEMENT<br>• EQUIPT LIFE IMPROVEMENT<br>• PROACTIVE MAINT. SCHEDULING | • DEFECT ELIMINATION FOR UPTIME IMPROVEMENT & RELIABILITY<br>• PRODUCTION PLAN IMPROVEMENT<br>• MAINTENANCES PROGRAM OPTIMIZATION | • W.O. INFO<br>• ALL INFO<br>• PROCESS PREFORMANCE<br>• PROCESS PREFORMANCE | WEB SOLUTION<br>WEB SOLUTION<br>REAL TIME<br>WEB SOLUTION |
| MAINT/INSPECTION REPORTS | • FAILURE REPORTS<br>• CORROSION SPOTS<br>• WORK INSTRUCTIONS & FACILITY NEEDS<br>• MATERIAL REQTS FOR ROUTINE W.O'S | • WORK HISTORY PATTERNS<br>• AREAS OF PROBLEMS<br>• PRIORITIES ON WORK<br>• MAINT PROGRAM EFFECTIVENESS<br>• REPAIR NEEDS<br>• OPPORTUNITY FOR PROACTIVE MAINTENANCE | • LOGISTIC RESOURCE OPTIMIZATION/PLANNING | • W.O. INFO,<br>EQUIPT TRENDS & PROCESS TRENDS<br>• W.O. INFO | |
| SCADA SYSTEM | • EQUIPT ALARMS & EVENT LOGS<br>• PERFORMANCE TRENDS<br>• VARIANCES<br>• HISTORY REPORTS | • HIGHLIGHTS PROBLEMS<br>• OPPORTUNITY FOR PROCESS OPTIMIZATION | | | |

* MANUAL DATA GATHERING
▸ AUTOMATED DATA GATHERING

*FIG. 2*

| OVERVIEW | |
|---|---|
| SYSTEM | COMPRESSION |
| MANUFACTURER | ROLLS ROYCE |
| WORK BREAKDOWN STRUCTURE | COMPRESSOR |
| OBJECTIVE | TO COMPRESS GAS TO MEET EXPORT PRESSURE |
| RECORDED DEFECTS (CAUSE) | HIGH LIQUID LEVEL IN FUEL GAS FILTERS |

| SYMPTOMS OF DEFECT | | | |
|---|---|---|---|
| SYMPTON | SEVERITY (HIGH / MEDIUM / LOW) | CONSEQUENCE | DETECTION MECHANISM |
| INCREASE IN LEVEL | MEDIUM | ALARM / TRIP | INCREASE IN LEVEL |
| CHANGING GAS DEWPOINT | LOW | INCREASE IN MONITORING BY CONTROL ROOM OPERATIONS, NO SYSTEM EVENTS INITIATED | CHANGING GAS DEWPOINT (AVAILABLE FROM METERING SYSTEM) |

| OTHER INFORMATION | |
|---|---|
| DEFECT OCCURANCE FREQUENCY | 6 MONTHS |
| LOGIC RULE FREQUENCY | 12 HOURS |
| LOGIC AND RULES | IF LEVEL SS1-MIN_FUEL INCREASING IN FUEL GAS FILTERS OR GAS DEWPOINT TAG ? INCREASING. POTENTIAL CARRY OVER. IF GAS DEWPOINT 331-??-? IS CHANGING AT THE RATE OF X PER HOUR THEN THERE IS AN INCREASING CHANCE OF CARRYOVER |
| ACTION TO TAKE | CHECK FOR LEVEL IN FILTER AND DRAIN IF REQUIRED |
| RECIPIENT | VTS TEAM LEADER, VIKING CONTROL ROOM |
| COMMENTS | ABC123 ONLY HAVE SWITCHES |

FIG. 6

| FILTER BY: | | | | | | | | | |
|---|---|---|---|---|---|---|---|---|---|
| DOWNTIME DATE RANGE: | 01-DEC-2002 00:00 | LOSS CATEGORY: | ALL | | | | RAISED BY: | ALL | |
| | TO | CAUSE CATEGORY: | ALL | | | | RESPONSIBLE ASSET: | ALL | |
| OR SEARCH BY SIR NO: | 31-DEC-2002 23:59 | ISC LOSS: | ALL | | | | SIR STATUS: | ALL | |

*CALCULATIONS BASED ON CURRENT GAS COST OF 300

| SIR NO | DATE RAISED | LOSS CAT. | SENT TO | SOURCE LOCATION | TIME DOWN | TIME BACK | GAS LOST (MMJ) | COST (£K) | CAUSE CATEGORY | ISC LOSS | RESPONSIBLE ASSET | EXPLANATION OF PROBLEM/EVENT |
|---|---|---|---|---|---|---|---|---|---|---|---|---|
| 1564 | 06-JAN-2002 | U | ABC OPERATIONS SUPERVISOR | ABC | 04-JAN-2002 17:00 | 24-DEC-2002 09:54 | 0.00 | 0.00 | EQUIPMENT FAILURE (MECHANICAL) | V | ABC | ABC PROCESS TRAINS UNAVAILABLE DUE TO A LEAK ON THE PROPANE CONDENSERS |
| 1595 | 25-JAN-2002 | WELL | ABC TEAM LEADER | ABC (LD) | 24-JAN-2002 22:10 | 24-DEC-2002 09:54 | 702.38 | 210.71 | EQUIPMENT FAILURE (MECHANICAL) | N | ABC SAIS | LD 02/01 SHUT IN, UNABLE TO BRING ON LINE. CANNOT EQUALISE ACROSS DHSV (POSSIBLE LIQUID |

AVAILABILITY / EFFICIENCY FROM START OF GAS DAY AT 0800 HRS GMT (GREEN)    <97% FOR NON-COMPRESSOR PLATFORMS
                    <98% FOR COMPRESSOR PLATFORMS
                    >=97%<98% FOR NON-COMPRESSOR PLATFORMS
(YELLOW)    >=98%=<99% FOR COMPRESSOR PLATFORMS
                    <=98% FOR NON-COMPRESSOR PLATFORMS
(RED)            >=99% FOR COMPRESSOR PLATFORMS

WHITE (BLANK) TRAFFIC LIGHT = NO DATA AVAILABLE

SUPPORT APPARATUS, METHOD AND SYSTEM FOR REAL TIME OPERATIONS AND MAINTENANCE

CROSS REFERENCE TO RELATED APPLICATION

This application claims the benefit of my earlier commonly assigned provisional application U.S. Ser. No. 60/443,725, filed Jan. 30, 2003, for Support Apparatus, Method and System for Real Time Operations and Maintenance.

COPYRIGHT STATEMENT UNDER 37 C.F.R. § 1.71(e)

A portion of the disclosure of this patent document contains material that is subject to copyright protection. The copyright owner has no objection to the facsimile reproduction of the patent document or the patent disclosure, as it appears in the Patent and Trademark Office patent file or records, and only to the extent the document is publicly available or the person making a copy has authorized access thereto, but otherwise reserves all copyright rights whatsoever.

COMPUTER LISTING APPENDIX

This application includes a computer program listing appendix submitted on compact disc (CD), which is hereby incorporated herein by reference. The total number of compact discs submitted herewith including identical duplicates is two. The files listed in the computer program listing appendix are as follows:

| Directory of CD | | | |
|---|---|---|---|
| Folder listing of\ | | | |
| AccessDenied\ | 12/4/2003 | 9:43:18 AM | 1 kb |
| ChangeRequest\ | 12/4/2003 | 9:50:01 AM | 16 kb |
| CNews\ | 12/4/2003 | 9:50:14 AM | 22 kb |
| CTools\ | 12/4/2003 | 9:50:45 AM | 25 kb |
| KnowledgeBase\ | 12/4/2003 | 10:33:22 AM | 93 kb |
| PortalUserRollOut\ | 12/4/2003 | 9:51:54 AM | 6 kb |
| SNS\ | 12/4/2003 | 9:40:18 AM | 12,861 kb |
| UsefulLinks\ | 12/4/2003 | 9:41:01 AM | 17 kb |
| UserHelp\ | 12/4/2003 | 9:43:11 AM | 1 kb |
| Folder listing of\UsefulLinks\ | | | |
| admin\ | 12/4/2003 | 10:33:39 AM | 14 kb |
| conn.inc.txt | 8/14/2002 | 5:47:48 AM | 1 kb |
| gadget.asp.txt | 12/11/2002 | 2:33:44 AM | 2 kb |
| ptincludes.asp.txt | 12/12/2002 | 5:44:08 AM | 1 kb |
| Folder listing of\UsefulLinks\admin\ | | | |
| addusefullink.asp.txt | 12/12/2002 | 5:48:44 AM | 4 kb |
| commprefs.asp.txt | 8/9/2002 | 5:14:49 AM | 1 kb |
| delusefullink.asp.txt | 12/12/2002 | 5:46:52 AM | 3 kb |
| editusefullink.asp.txt | 12/12/2002 | 5:48:13 AM | 4 kb |
| maintainusefullinks.asp.txt | 12/11/2002 | 4:35:13 AM | 3 kb |
| Folder listing of\UserHelp\ | | | |
| gadget.asp.txt | 12/11/2002 | 6:10:42 AM | 1 kb |
| Folder listing of\AccessDenied\ | | | |
| gadget.asp.txt | 12/11/2002 | 5:27:18 AM | 1 kb |
| Folder listing of\ChangeRequest\ | | | |
| calendar.asp.txt | 11/1/2002 | 9:57:04 AM | 6 kb |
| conn.inc.txt | 12/11/2002 | 11:07:33 AM | 1 kb |
| gadget.asp.txt | 12/13/2002 | 3:36:00 AM | 6 kb |
| ptincludes.asp.txt | 12/12/2002 | 4:00:02 AM | 1 kb |
| reportingtool.asp.txt | 12/13/2002 | 4:52:16 AM | 4 kb |
| Folder listing of\CNews\ | | | |
| gadget.asp.txt | 7/11/2003 | 7:46:43 AM | 22 kb |
| Folder listing of\CTools\ | | | |
| admin\ | 12/4/2003 | 10:33:28 AM | 19 kb |
| conn.inc.txt | 8/14/2002 | 5:10:41 AM | 1 kb |
| gadget.asp.txt | 12/12/2002 | 6:26:07 AM | 5 kb |
| ptincludes.asp.txt | 12/12/2002 | 6:23:12 AM | 1 kb |
| Folder listing of\CTools\admin\ | | | |
| addtool.asp.txt | 12/12/2002 | 5:57:25 AM | 6 kb |
| commprefs.asp.txt | 12/12/2002 | 5:54:11 AM | 1 kb |
| deltool.asp.txt | 12/12/2002 | 5:57:56 AM | 3 kb |
| edittool.asp.txt | 12/12/2002 | 5:56:02 AM | 6 kb |
| maintaintools.asp.txt | 12/11/2002 | 4:36:07 AM | 3 kb |
| Folder listing of\KnowledgeBase\ | | | |
| adddefect.asp.txt | 12/12/2002 | 8:05:30 AM | 2 kb |
| addmanufacturer.asp.txt | 12/12/2002 | 7:59:25 AM | 3 kb |
| addsubsystem.asp.txt | 12/12/2002 | 7:51:52 AM | 3 kb |
| addsymptom.asp.txt | 12/12/2002 | 8:03:39 AM | 3 kb |
| addsystem.asp.txt | 12/12/2002 | 8:07:52 AM | 3 kb |
| adminPrefs.asp.txt | 12/12/2002 | 8:24:44 AM | 21 kb |
| adminsymptoms.asp.txt | 12/12/2002 | 8:25:57 AM | 2 kb |
| blank.htm.txt | 7/16/2002 | 8:24:03 AM | 1 kb |
| blankgrey.htm.txt | 10/15/2002 | 4:14:42 AM | 1 kb |
| conn.inc.txt | 8/14/2002 | 5:12:07 AM | 1 kb |

-continued

| Directory of CD | | | | |
|---|---|---|---|---|
| deletesymptom.asp.txt | 12/12/2002 | 8:04:16 AM | 1 | kb |
| editsymptom.asp.txt | 12/12/2002 | 8:26:24 AM | 3 | kb |
| gadget.asp.txt | 12/11/2002 | 5:50:43 AM | 1 | kb |
| gadget_noiframe.asp.txt | 12/11/2002 | 5:11:40 AM | 21 | kb |
| internalgadget.asp.txt | 12/12/2002 | 7:47:32 AM | 21 | kb |
| moreinfo.asp.txt | 12/12/2002 | 8:31:50 AM | 7 | kb |
| moreinfo_like_spreadsheet_new_window.asp.txt | 8/14/2002 | 5:40:12 AM | 3 | kb |
| steps_headings.htm.txt | 7/18/2002 | 7:08:44 AM | 2 | kb |
| Folder listing of\PortalUserRollOut\ | | | | |
| conn.inc.txt | 12/12/2002 | 8:15:14 AM | 1 | kb |
| gadget.asp.txt | 12/12/2002 | 8:45:48 AM | 1 | kb |
| internalgadget.asp.txt | 12/12/2002 | 9:51:14 AM | 5 | kb |
| ptincludes.asp.txt | 12/12/2002 | 8:15:42 AM | 1 | kb |
| Folder listing of\SNS\ | | | | |
| BBS\ | 12/4/2003 | 10:30:34 AM | 27 | kb |
| CommunityLinks\ | 12/4/2003 | 9:52:50 AM | 23 | kb |
| FacEngConSight\ | 12/4/2003 | 9:53:11 AM | 1,881 | kb |
| FieldTeamSight\ | 12/4/2003 | 9:56:30 AM | 4 | kb |
| FosheePresentation\ | 12/4/2003 | 9:57:20 AM | 81 | kb |
| HRSight\ | 12/4/2003 | 9:57:35 AM | 10 | kb |
| HSESight\ | 12/4/2003 | 9:57:46 AM | 18 | kb |
| ideas\ | 12/4/2003 | 9:59:09 AM | 6,236 | kb |
| Launchpad\ | 12/4/2003 | 10:00:06 AM | 9 | kb |
| LeadershipDiscussion\ | 12/4/2003 | 10:00:32 AM | 1 | kb |
| MaintenanceTeamSight\ | 12/4/2003 | 10:03:19 AM | 526 | kb |
| NewSNSAssetChokeModel\ | 12/4/2003 | 10:05:58 AM | 432 | kb |
| PlanningSight\ | 12/4/2003 | 10:06:11 AM | 4 | kb |
| ProcessOptimisation\ | 12/4/2003 | 10:07:53 AM | 75 | kb |
| RTOPortalLinks\ | 12/4/2003 | 10:08:05 AM | 3 | kb |
| scmdelivery\ | 12/4/2003 | 10:08:26 AM | 28 | kb |
| SCMSight\ | 12/4/2003 | 10:08:39 AM | 21 | kb |
| SIRMessages\ | 12/4/2003 | 10:08:46 AM | 458 | kb |
| SNSAssetChokeModel\ | 12/4/2003 | 10:16:24 AM | 432 | kb |
| SNSDashboard\ | 12/4/2003 | 10:17:08 AM | 27 | kb |
| SNSHelp\ | 12/4/2003 | 10:21:48 AM | 1,067 | kb |
| SNSHelp_backup_doNOT_Delete\ | 12/4/2003 | 10:23:57 AM | 974 | kb |
| SnsProductionEfficiency\ | 12/4/2003 | 10:25:44 AM | 208 | kb |
| SNSSubsurfaceModel\ | 12/4/2003 | 10:27:20 AM | 178 | kb |
| SNSTelephoneList\ | 12/4/2003 | 10:28:54 AM | 22 | kb |
| SNSWellStatusTicker\ | 12/4/2003 | 10:29:46 AM | 88 | kb |
| ValueOpportunityRegister\ | 12/4/2003 | 10:30:27 AM | 25 | kb |
| Folder listing of\SNS\BBS\ | | | | |
| admin\ | 12/4/2003 | 9:52:27 AM | 16 | kb |
| bbs.asp.txt | 12/11/2002 | 5:11:40 AM | 6 | kb |
| bbs_action.asp.txt | 12/11/2002 | 5:11:40 AM | 3 | kb |
| bbs_edit.asp.txt | 12/11/2002 | 5:11:41 AM | 1 | kb |
| connection.asp.txt | 8/14/2002 | 5:13:25 AM | 1 | kb |
| gadget.asp.txt | 7/31/2002 | 4:48:27 AM | 1 | kb |
| Folder listing of\SNS\BBS\admin\ | | | | |
| bbs_KPI.asp.txt | 12/11/2002 | 5:14:35 AM | 8 | kb |
| comPrefKPIs.asp.txt | 8/14/2002 | 5:34:23 AM | 6 | kb |
| gadget.asp.txt | 7/31/2002 | 6:31:11 AM | 1 | kb |
| saveBBS.asp.txt | 7/31/2002 | 4:23:43 AM | 2 | kb |
| Folder listing of\SNS\CommunityLinks\ | | | | |
| admin\ | 12/4/2003 | 10:30:40 AM | 18 | kb |
| conn.inc.txt | 8/14/2002 | 5:12:17 AM | 1 | kb |
| gadget.asp.txt | 12/10/2002 | 11:35:53 AM | 4 | kb |
| ptconn.inc.txt | 9/19/2002 | 8:55:42 AM | 1 | kb |
| ptincludes.asp.txt | 8/9/2002 | 9:26:29 AM | 1 | kb |
| Folder listing of\SNS\CommunityLinks\admin\ | | | | |
| addlink.asp.txt | 12/10/2002 | 11:44:52 AM | 5 | kb |
| commprefs.asp.txt | 12/10/2002 | 11:45:42 AM | 1 | kb |
| dellink.asp.txt | 12/10/2002 | 11:45:01 AM | 3 | kb |
| editlink.asp.txt | 12/10/2002 | 11:44:43 AM | 6 | kb |
| maintainlinks.asp.txt | 12/10/2002 | 11:40:17 AM | 3 | kb |
| Folder listing of\SNS\FacEngConSight\ | | | | |
| cms_iii\ | 12/4/2003 | 9:56:19 AM | 1,858 | kb |
| content.asp.txt | 6/29/2003 | 1:50:46 PM | 21 | kb |
| gadget.asp.txt | 6/26/2003 | 6:14:11 AM | 1 | kb |
| ptincludes.asp.txt | 12/11/2002 | 5:48:35 AM | 1 | kb |
| Folder listing of\SNS\FacEngConSight\cms_iii\ | | | | |

-continued

Directory of CD

| | | | | |
|---|---|---|---|---|
| NewFiles\ | 12/4/2003 | 9:55:42 AM | 1,842 | kb |
| index.html.txt | 5/9/2002 | 2:05:00 PM | 11 | kb |
| START.html.txt | 5/9/2002 | 2:53:04 PM | 5 | kb |
| Folder listing of\SNS\ | | | | |
| FacEngConSight\cms__iii\NewFiles\ | | | | |
| 0010.html.txt | 5/5/2002 | 8:43:20 AM | 9 | kb |
| 0011.html.txt | 5/5/2002 | 8:46:54 AM | 9 | kb |
| 0015.html.txt | 5/5/2002 | 8:57:34 AM | 10 | kb |
| 0020.html.txt | 5/5/2002 | 9:46:42 AM | 9 | kb |
| 0025.html.txt | 5/5/2002 | 9:49:22 AM | 9 | kb |
| 0030.html.txt | 5/5/2002 | 9:51:18 AM | 9 | kb |
| 0035.html.txt | 5/5/2002 | 9:54:08 AM | 9 | kb |
| 0040.html.txt | 5/5/2002 | 9:56:02 AM | 9 | kb |
| 0050.html.txt | 5/5/2002 | 11:49:58 AM | 9 | kb |
| 0055.html.txt | 5/5/2002 | 12:19:44 PM | 9 | kb |
| 0060.html.txt | 5/5/2002 | 12:20:16 PM | 9 | kb |
| 0065.html.txt | 5/5/2002 | 12:18:08 PM | 9 | kb |
| 0070.html.txt | 5/5/2002 | 10:00:48 AM | 9 | kb |
| 0080.html.txt | 5/3/2002 | 7:11:40 AM | 9 | kb |
| 0085.html.txt | 5/5/2002 | 12:25:24 PM | 9 | kb |
| 0090.html.txt | 5/5/2002 | 10:02:28 AM | 9 | kb |
| 0095.html.txt | 5/5/2002 | 10:05:12 AM | 9 | kb |
| 0100.html.txt | 5/5/2002 | 10:04:58 AM | 9 | kb |
| 0105.html.txt | 5/5/2002 | 10:04:42 AM | 9 | kb |
| 0110.html.txt | 5/5/2002 | 10:04:34 AM | 9 | kb |
| 0115.html.txt | 5/5/2002 | 10:04:22 AM | 9 | kb |
| 0120.html.txt | 5/5/2002 | 10:04:10 AM | 9 | kb |
| 0125.html.txt | 5/5/2002 | 10:03:56 AM | 9 | kb |
| 0130.html.txt | 5/5/2002 | 10:03:44 AM | 9 | kb |
| 0135.html.txt | 5/5/2002 | 10:03:30 AM | 9 | kb |
| 0140.html.txt | 5/5/2002 | 12:22:24 PM | 9 | kb |
| 0143.html.txt | 5/3/2002 | 12:29:42 PM | 9 | kb |
| 0144.html.txt | 5/3/2002 | 12:29:42 PM | 9 | kb |
| 0145.html.txt | 5/9/2002 | 1:30:38 PM | 9 | kb |
| 0150.html.txt | 5/5/2002 | 10:11:10 AM | 9 | kb |
| 0155.html.txt | 5/5/2002 | 10:10:44 AM | 9 | kb |
| 0160.html.txt | 5/5/2002 | 2:15:18 PM | 9 | kb |
| 0165.html.txt | 5/5/2002 | 10:10:22 AM | 9 | kb |
| 0170.html.txt | 5/5/2002 | 10:10:12 AM | 9 | kb |
| 0175.html.txt | 5/5/2002 | 10:10:02 AM | 9 | kb |
| 0180.html.txt | 5/5/2002 | 1:22:14 PM | 9 | kb |
| 0190.html.txt | 5/5/2002 | 10:09:18 AM | 9 | kb |
| 0195.html.txt | 5/5/2002 | 10:09:06 AM | 9 | kb |
| 0200.html.txt | 5/5/2002 | 10:08:52 AM | 9 | kb |
| 0205.html.txt | 5/5/2002 | 1:19:06 PM | 9 | kb |
| 0210.html.txt | 5/5/2002 | 10:08:20 AM | 9 | kb |
| 0215.html.txt | 5/5/2002 | 10:08:06 AM | 9 | kb |
| 0220.html.txt | 5/5/2002 | 1:16:24 PM | 9 | kb |
| 0225.html.txt | 5/5/2002 | 10:07:40 AM | 9 | kb |
| 0230.html.txt | 5/5/2002 | 10:07:28 AM | 9 | kb |
| 0235.html.txt | 5/5/2002 | 10:07:16 AM | 9 | kb |
| 0240.html.txt | 5/5/2002 | 1:13:40 PM | 9 | kb |
| 0245.html.txt | 5/3/2002 | 1:56:06 PM | 9 | kb |
| 0250.html.txt | 5/5/2002 | 10:16:14 AM | 9 | kb |
| 0255.html.txt | 5/5/2002 | 10:16:06 AM | 9 | kb |
| 0260.html.txt | 5/5/2002 | 10:15:52 AM | 9 | kb |
| 0265.html.txt | 5/5/2002 | 10:15:36 AM | 9 | kb |
| 0270.html.txt | 5/5/2002 | 10:15:22 AM | 9 | kb |
| 0275.html.txt | 5/5/2002 | 10:15:10 AM | 9 | kb |
| 0280.html.txt | 5/5/2002 | 10:14:56 AM | 9 | kb |
| 0285.html.txt | 5/5/2002 | 10:14:42 AM | 9 | kb |
| 0290.html.txt | 5/5/2002 | 10:14:30 AM | 9 | kb |
| 0295.html.txt | 5/5/2002 | 10:14:20 AM | 9 | kb |
| 0300.html.txt | 5/5/2002 | 10:14:10 AM | 9 | kb |
| 0305.html.txt | 5/5/2002 | 10:13:58 AM | 9 | kb |
| 0310.html.txt | 5/5/2002 | 10:13:48 AM | 9 | kb |
| 0315.html.txt | 5/5/2002 | 10:13:34 AM | 9 | kb |
| 0320.html.txt | 5/5/2002 | 10:13:20 AM | 9 | kb |
| 0330.html.txt | 5/5/2002 | 10:13:10 AM | 9 | kb |
| 0335.html.txt | 5/5/2002 | 10:12:58 AM | 9 | kb |
| 0340.html.txt | 5/5/2002 | 10:12:46 AM | 9 | kb |
| 0345.html.txt | 5/3/2002 | 11:27:56 AM | 9 | kb |
| 0350.html.txt | 5/5/2002 | 10:18:44 AM | 9 | kb |
| 0355.html.txt | 5/5/2002 | 10:18:32 AM | 9 | kb |
| 0360.html.txt | 5/5/2002 | 10:18:22 AM | 9 | kb |
| 0365.html.txt | 5/5/2002 | 10:18:10 AM | 9 | kb |
| 0370.html.txt | 5/5/2002 | 10:17:54 AM | 9 | kb |

-continued

| Directory of CD | | | |
|---|---|---|---|
| 0375.html.txt | 5/5/2002 | 10:17:46 AM | 9 kb |
| 0380.html.txt | 5/5/2002 | 10:17:28 AM | 9 kb |
| 0385.html.txt | 5/5/2002 | 10:17:16 AM | 9 kb |
| 0390.html.txt | 5/5/2002 | 10:17:04 AM | 9 kb |
| 0395.html.txt | 5/3/2002 | 11:27:56 AM | 9 kb |
| 0400.html.txt | 5/5/2002 | 10:20:50 AM | 9 kb |
| 0405.html.txt | 5/5/2002 | 10:20:38 AM | 9 kb |
| 0410.html.txt | 5/5/2002 | 10:20:28 AM | 9 kb |
| 0415.html.txt | 5/5/2002 | 10:20:18 AM | 9 kb |
| 0420.html.txt | 5/5/2002 | 10:20:08 AM | 9 kb |
| 0425.html.txt | 5/5/2002 | 10:19:56 AM | 9 kb |
| 0430.html.txt | 5/5/2002 | 10:19:36 AM | 9 kb |
| 0435.html.txt | 5/3/2002 | 11:27:56 AM | 9 kb |
| 0440.html.txt | 5/5/2002 | 10:26:18 AM | 9 kb |
| 0445.html.txt | 5/5/2002 | 10:26:08 AM | 9 kb |
| 0450.html.txt | 5/5/2002 | 10:26:00 AM | 9 kb |
| 0455.html.txt | 5/5/2002 | 10:25:50 AM | 9 kb |
| 0460.html.txt | 5/5/2002 | 10:25:32 AM | 9 kb |
| 0465.html.txt | 5/5/2002 | 10:25:20 AM | 9 kb |
| 0470.html.txt | 5/5/2002 | 10:25:10 AM | 9 kb |
| 0475.html.txt | 5/5/2002 | 10:24:58 AM | 9 kb |
| 0480.html.txt | 5/5/2002 | 10:24:40 AM | 9 kb |
| 0485.html.txt | 5/5/2002 | 10:24:28 AM | 9 kb |
| 0490.html.txt | 5/5/2002 | 10:24:18 AM | 9 kb |
| 0495.html.txt | 5/5/2002 | 10:24:10 AM | 9 kb |
| 0500.html.txt | 5/5/2002 | 10:23:54 AM | 9 kb |
| 0505.html.txt | 5/5/2002 | 10:23:46 AM | 9 kb |
| 0510.html.txt | 5/5/2002 | 10:23:32 AM | 9 kb |
| 0515.html.txt | 5/5/2002 | 10:23:22 AM | 9 kb |
| 0520.html.txt | 5/5/2002 | 10:23:12 AM | 9 kb |
| 0525.html.txt | 5/5/2002 | 10:23:02 AM | 9 kb |
| 0530.html.txt | 5/5/2002 | 10:22:52 AM | 9 kb |
| 0535.html.txt | 5/5/2002 | 10:22:38 AM | 9 kb |
| 0540.html.txt | 5/5/2002 | 10:22:24 AM | 9 kb |
| 0545.html.txt | 5/5/2002 | 10:22:10 AM | 9 kb |
| 0550.html.txt | 5/5/2002 | 10:21:58 AM | 9 kb |
| 0555.html.txt | 5/3/2002 | 11:30:42 AM | 9 kb |
| 0560.html.txt | 5/5/2002 | 10:32:30 AM | 9 kb |
| 0565.html.txt | 5/5/2002 | 10:33:50 AM | 9 kb |
| 0570.html.txt | 5/5/2002 | 10:32:02 AM | 9 kb |
| 0575.html.txt | 5/5/2002 | 10:31:48 AM | 9 kb |
| 0580.html.txt | 5/5/2002 | 10:31:42 AM | 9 kb |
| 0585.html.txt | 5/5/2002 | 10:31:32 AM | 9 kb |
| 0590.html.txt | 5/5/2002 | 10:31:22 AM | 9 kb |
| 0595.html.txt | 5/5/2002 | 10:33:40 AM | 9 kb |
| 0600.html.txt | 5/5/2002 | 10:30:52 AM | 9 kb |
| 0605.html.txt | 5/5/2002 | 10:30:40 AM | 9 kb |
| 0610.html.txt | 5/5/2002 | 10:30:32 AM | 9 kb |
| 0615.html.txt | 5/5/2002 | 10:30:24 AM | 9 kb |
| 0620.html.txt | 5/5/2002 | 10:30:14 AM | 9 kb |
| 0625.html.txt | 5/5/2002 | 10:30:04 AM | 9 kb |
| 0630.html.txt | 5/5/2002 | 10:29:56 AM | 9 kb |
| 0635.html.txt | 5/5/2002 | 10:29:48 AM | 9 kb |
| 0640.html.txt | 5/5/2002 | 10:29:38 AM | 9 kb |
| 0645.html.txt | 5/5/2002 | 10:29:28 AM | 9 kb |
| 0650.html.txt | 5/5/2002 | 10:29:18 AM | 9 kb |
| 0655.html.txt | 5/5/2002 | 10:29:04 AM | 9 kb |
| 0660.html.txt | 5/5/2002 | 10:28:54 AM | 9 kb |
| 0665.html.txt | 5/5/2002 | 10:28:40 AM | 9 kb |
| 0670.html.txt | 5/5/2002 | 10:28:22 AM | 9 kb |
| 0675.html.txt | 5/5/2002 | 10:28:12 AM | 9 kb |
| 0680.html.txt | 5/5/2002 | 10:28:02 AM | 9 kb |
| 0685.html.txt | 5/5/2002 | 10:27:48 AM | 9 kb |
| 0700.html.txt | 5/3/2002 | 11:30:40 AM | 9 kb |
| 0702.html.txt | 5/5/2002 | 10:52:50 AM | 9 kb |
| 0704.html.txt | 5/5/2002 | 10:52:40 AM | 9 kb |
| 0706.html.txt | 5/5/2002 | 10:52:28 AM | 9 kb |
| 0708.html.txt | 5/5/2002 | 10:52:16 AM | 9 kb |
| 0710.html.txt | 5/5/2002 | 10:52:06 AM | 9 kb |
| 0712.html.txt | 5/5/2002 | 10:51:18 AM | 9 kb |
| 0714.html.txt | 5/5/2002 | 10:53:36 AM | 9 kb |
| 0716.html.txt | 5/5/2002 | 10:48:38 AM | 9 kb |
| 0718.html.txt | 5/5/2002 | 10:48:24 AM | 9 kb |
| 0720.html.txt | 5/5/2002 | 10:48:12 AM | 9 kb |
| 0722.html.txt | 5/5/2002 | 10:47:58 AM | 9 kb |
| 0724.html.txt | 5/5/2002 | 10:47:44 AM | 9 kb |
| 0726.html.txt | 5/5/2002 | 10:47:32 AM | 9 kb |

-continued

| Directory of CD | | | |
|---|---|---|---|
| 0728.html.txt | 5/5/2002 | 10:47:18 AM | 9 kb |
| 0730.html.txt | 5/5/2002 | 10:46:58 AM | 9 kb |
| 0732.html.txt | 5/5/2002 | 10:46:14 AM | 9 kb |
| 0734.html.txt | 5/5/2002 | 10:46:00 AM | 9 kb |
| 0736.html.txt | 5/5/2002 | 10:45:44 AM | 9 kb |
| 0738.html.txt | 5/5/2002 | 10:45:30 AM | 9 kb |
| 0740.html.txt | 5/5/2002 | 10:45:08 AM | 9 kb |
| 0742.html.txt | 5/5/2002 | 10:44:50 AM | 9 kb |
| 0744.html.txt | 5/5/2002 | 10:44:28 AM | 9 kb |
| 0748.html.txt | 5/5/2002 | 10:44:06 AM | 9 kb |
| 0750.html.txt | 5/5/2002 | 10:43:36 AM | 9 kb |
| 0752.html.txt | 5/5/2002 | 10:43:08 AM | 9 kb |
| 0760.html.txt | 5/5/2002 | 2:36:28 PM | 9 kb |
| 0761.html.txt | 5/5/2002 | 2:35:10 PM | 9 kb |
| 0762.html.txt | 5/5/2002 | 2:31:06 PM | 9 kb |
| 0764.html.txt | 5/5/2002 | 2:29:10 PM | 9 kb |
| 0768.html.txt | 5/5/2002 | 2:25:02 PM | 9 kb |
| 0770.html.txt | 5/5/2002 | 2:23:12 PM | 9 kb |
| 0800.html.txt | 5/4/2002 | 2:16:16 PM | 9 kb |
| 0801.html.txt | 5/5/2002 | 11:01:40 AM | 9 kb |
| 0802.html.txt | 5/5/2002 | 11:01:28 AM | 9 kb |
| 0803.html.txt | 5/5/2002 | 11:01:14 AM | 9 kb |
| 0804.html.txt | 5/5/2002 | 11:01:00 AM | 9 kb |
| 0806.html.txt | 5/5/2002 | 11:00:50 AM | 9 kb |
| 0808.html.txt | 5/5/2002 | 11:00:40 AM | 9 kb |
| 0810.html.txt | 5/5/2002 | 11:00:28 AM | 9 kb |
| 0811.html.txt | 5/5/2002 | 11:00:14 AM | 9 kb |
| 0812.html.txt | 5/5/2002 | 11:00:00 AM | 9 kb |
| 0820.html.txt | 5/5/2002 | 10:59:46 AM | 9 kb |
| 0822.html.txt | 5/5/2002 | 10:59:32 AM | 9 kb |
| 0823.html.txt | 5/5/2002 | 10:59:20 AM | 9 kb |
| 0840.html.txt | 5/5/2002 | 10:59:04 AM | 9 kb |
| 0842.html.txt | 5/5/2002 | 10:58:52 AM | 9 kb |
| 0844.html.txt | 5/5/2002 | 10:58:40 AM | 9 kb |
| 0850.html.txt | 5/5/2002 | 10:58:30 AM | 9 kb |
| 0856.html.txt | 5/5/2002 | 10:58:20 AM | 9 kb |
| 0858.html.txt | 5/5/2002 | 10:57:10 AM | 9 kb |
| 0860.html.txt | 5/5/2002 | 10:57:00 AM | 9 kb |
| 0862.html.txt | 5/5/2002 | 10:56:44 AM | 9 kb |
| 0864.html.txt | 5/5/2002 | 11:04:18 AM | 9 kb |
| 0866.html.txt | 5/5/2002 | 10:56:14 AM | 9 kb |
| 0870.html.txt | 5/5/2002 | 10:56:02 AM | 9 kb |
| 0871.html.txt | 5/5/2002 | 10:55:48 AM | 9 kb |
| 0872.html.txt | 5/5/2002 | 10:55:24 AM | 9 kb |
| 0874.html.txt | 5/5/2002 | 10:55:12 AM | 9 kb |
| CHANGES.html.txt | 5/5/2002 | 2:43:02 PM | 9 kb |
| index.html.txt | 5/6/2002 | 6:21:42 AM | 19 kb |
| START.html.txt | 5/5/2002 | 11:06:10 AM | 5 kb |
| Temporary$$$143794625.html.txt | 5/2/2002 | 2:51:06 AM | 9 kb |
| Temporary$$$2182231531.html.txt | 5/5/2002 | 4:41:34 AM | 9 kb |
| Temporary$$$3182251468.html.txt | 5/5/2002 | 4:41:54 AM | 9 kb |
| workpack.html.txt | 5/9/2002 | 2:29:48 PM | 60 kb |
| Folder listing of\SNS\FieldTeamSight\ | | | |
| content.asp.txt | 7/18/2002 | 1:51:56 AM | 3 kb |
| gadget.asp.txt | 7/18/2002 | 1:52:24 AM | 1 kb |
| Folder listing of\SNS\FosheePresentation\ | | | |
| css\ | 12/4/2003 | 9:57:26 AM | 4 kb |
| actailflowrate.asp.txt | 3/24/2003 | 4:11:37 AM | 2 kb |
| actailflowrate.cdl.txt | 3/24/2003 | 4:10:23 AM | 1 kb |
| actailflowrate2.asp.txt | 3/24/2003 | 4:16:42 AM | 2 kb |
| actailflowrate2.cdl.txt | 3/24/2003 | 4:14:51 AM | 1 kb |
| actualpotential.asp.txt | 3/24/2003 | 8:18:01 AM | 2 kb |
| actualpotential.cdl.txt | 3/24/2003 | 8:17:19 AM | 2 kb |
| actualpotential2.asp.txt | 3/24/2003 | 8:13:25 AM | 2 kb |
| actualpotential2.cdl.txt | 3/24/2003 | 8:10:52 AM | 2 kb |
| basecase.asp.txt | 3/24/2003 | 4:07:16 AM | 2 kb |
| basecase.cdl.txt | 3/24/2003 | 3:00:21 AM | 2 kb |
| BaseCaseFS.asp.txt | 3/25/2003 | 10:00:56 AM | 4 kb |
| bhhi.asp.txt | 3/24/2003 | 4:11:33 AM | 2 kb |
| bhhi.cdl.txt | 3/24/2003 | 3:03:26 AM | 2 kb |
| bhlo.asp.txt | 3/24/2003 | 7:34:48 AM | 2 kb |
| bhlo.cdl.txt | 3/24/2003 | 3:00:59 AM | 2 kb |
| BoultonHHiWobbe.asp.txt | 3/25/2003 | 10:11:59 AM | 5 kb |
| BoultonHLoWobbe.asp.txt | 3/25/2003 | 10:11:41 AM | 5 kb |
| cashflow.asp.txt | 3/24/2003 | 4:16:50 AM | 2 kb |
| cashflow.cdl.txt | 3/24/2003 | 3:15:10 AM | 2 kb |
| cashflow2.asp.txt | 3/24/2003 | 4:16:46 AM | 2 kb |

-continued

| Directory of CD | | | |
|---|---|---|---|
| cashflow2.cdl.txt | 3/24/2003 | 3:34:28 AM | 2 kb |
| DeliveryPressure.asp.txt | 3/25/2003 | 10:12:05 AM | 4 kb |
| DeliveryPressurefs.asp.txt | 3/24/2003 | 7:39:16 AM | 1 kb |
| delopt.asp.txt | 3/24/2003 | 4:11:29 AM | 2 kb |
| delopt.cdl.txt | 3/24/2003 | 3:06:28 AM | 2 kb |
| gadget.asp.txt | 3/24/2003 | 9:00:09 AM | 1 kb |
| Graphs.asp.txt | 3/24/2003 | 4:26:32 AM | 14 kb |
| HiWobbePopUp.asp.txt | 3/25/2003 | 10:16:51 AM | 4 kb |
| LoWobbePopUp.asp.txt | 3/25/2003 | 10:16:40 AM | 4 kb |
| Folder listing of\SNS\FosheePresentation\css\ | | | |
| bip.css.txt | 3/24/2003 | 9:01:37 AM | 4 kb |
| Folder listing of\SNS\HRSight\ | | | |
| content.asp.txt | 6/27/2003 | 1:46:31 AM | 9 kb |
| gadget.asp.txt | 6/27/2003 | 1:07:19 AM | 1 kb |
| Folder listing of\SNS\HSESight\ | | | |
| library\ | 12/4/2003 | 9:57:53 AM | 1 kb |
| content.asp.txt | 6/27/2003 | 4:50:43 AM | 10 kb |
| DSHEC_charter_link.asp.txt | 6/27/2003 | 6:52:36 AM | 1 kb |
| gadget.asp.txt | 6/26/2003 | 7:13:49 AM | 1 kb |
| HSEPlanLink.asp.txt | 6/27/2003 | 6:53:22 AM | 1 kb |
| ISClink.asp.txt | 6/27/2003 | 6:50:57 AM | 1 kb |
| qualityPolicyLink.asp.txt | 6/27/2003 | 6:52:59 AM | 1 kb |
| STOPLink.asp.txt | 6/27/2003 | 6:53:38 AM | 1 kb |
| Folder listing of\SNS\HSESight\library\ | | | |
| ptincludes.asp.txt | 6/27/2003 | 4:20:17 AM | 1 kb |
| Folder listing of\SNS\ideas\ | | | |
| admin\ | 12/4/2003 | 9:59:40 AM | 69 kb |
| css\ | 12/4/2003 | 9:59:14 AM | 7 kb |
| conn.inc.txt | 5/20/2003 | 4:29:20 AM | 1 kb |
| details.asp.txt | 5/12/2003 | 6:31:08 AM | 4 kb |
| gadget.asp.txt | 5/19/2003 | 2:30:56 AM | 3 kb |
| ideas.bkp.txt | 5/16/2003 | 6:59:49 AM | 1,297 kb |
| mainstyle6.css.txt | 7/18/2002 | 2:03:22 AM | 19 kb |
| map.asp.txt | 5/20/2003 | 5:03:57 AM | 7 kb |
| moc.bkp.txt | 5/8/2003 | 9:10:01 AM | 4,824 kb |
| objects.asp.txt | 5/19/2003 | 9:25:37 AM | 7 kb |
| ptincludes.asp.txt | 12/11/2002 | 3:53:49 AM | 1 kb |
| Folder listing of\SNS\ideas\admin\ | | | |
| a_map_location_apply.asp.txt | 7/18/2002 | 2:18:32 AM | 1 kb |
| addmodel.asp.txt | 8/14/2002 | 1:11:22 AM | 6 kb |
| addobject.asp.txt | 5/14/2003 | 2:39:47 AM | 7 kb |
| addobjecttype.asp.txt | 8/14/2002 | 1:12:16 AM | 4 kb |
| adminprefs.asp.txt | 5/7/2003 | 1:00:02 PM | 6 kb |
| default.asp.txt | 3/7/2003 | 9:45:28 AM | 1 kb |
| delmodel.asp.txt | 8/14/2002 | 1:15:20 AM | 3 kb |
| delobject.asp.txt | 8/14/2002 | 1:17:02 AM | 4 kb |
| delobjecttype.asp.txt | 8/14/2002 | 1:15:30 AM | 3 kb |
| editmodel.asp.txt | 8/14/2002 | 1:15:08 AM | 5 kb |
| editobject.asp.txt | 8/14/2002 | 1:11:54 AM | 8 kb |
| editobjecttype.asp.txt | 8/14/2002 | 1:12:06 AM | 4 kb |
| list.asp.txt | 3/7/2003 | 9:25:18 AM | 1 kb |
| maintainmodels.asp.txt | 8/14/2002 | 1:11:06 AM | 3 kb |
| maintainobjects.asp.txt | 8/14/2002 | 1:15:44 AM | 4 kb |
| maintainobjecttypes.asp.txt | 8/14/2002 | 1:15:54 AM | 3 kb |
| map_adminroutines.js.txt | 7/3/2002 | 7:20:12 AM | 5 kb |
| ptincludes.asp.txt | 8/14/2002 | 5:16:40 AM | 1 kb |
| Folder listing of\SNS\ideas\css\ | | | |
| calendar.css.txt | 4/11/2002 | 7:09:52 AM | 1 kb |
| RC.css.txt | 3/13/2003 | 8:51:02 AM | 5 kb |
| Folder listing of\SNS\Launchpad\ | | | |
| ICA\ | 12/4/2003 | 10:00:22 AM | 4 kb |
| dims.ica.txt | 6/26/2003 | 6:49:50 AM | 1 kb |
| dss.ica.txt | 6/26/2003 | 6:50:19 AM | 1 kb |
| gadget.asp.txt | 7/8/2003 | 4:37:01 AM | 1 kb |
| launchme.asp.txt | 6/26/2003 | 7:28:17 AM | 1 kb |
| profile.ica.txt | 6/26/2003 | 7:30:12 AM | 1 kb |
| ptincludes.asp.txt | 12/11/2002 | 3:53:49 AM | 1 kb |
| Folder listing of\SNS\Launchpad\ICA\ | | | |
| casing_seat.ica.txt | 6/27/2003 | 2:40:04 AM | 1 kb |
| compass.ica.txt | 6/27/2003 | 2:40:56 AM | 1 kb |
| dims.ica.txt | 6/26/2003 | 6:49:52 AM | 1 kb |
| dss.ica.txt | 6/26/2003 | 6:50:20 AM | 1 kb |
| profile.ica.txt | 6/26/2003 | 6:51:00 AM | 1 kb |
| stresscheck.ica.txt | 6/27/2003 | 2:41:24 AM | 1 kb |

-continued

Directory of CD

| | | | |
|---|---|---|---|
| towcs_prod_accounting.ica.txt | 6/27/2003 | 2:44:36 AM | 1 kb |
| wellplan.ica.txt | 6/25/2003 | 8:15:38 AM | 1 kb |
| Folder listing of \SNS\ LeadershipDiscussion\ | | | |
| gadget.asp.txt | 8/14/2002 | 5:37:30 AM | 1 kb |
| Folder listing of \SNS\ MaintenanceTeamSight\ | | | |
| CMCosts\ | 12/4/2003 | 10:03:45 AM | 24 kb |
| Compliance\ | 12/4/2003 | 10:03:39 AM | 33 kb |
| css\ | 12/4/2003 | 10:03:33 AM | 9 kb |
| FailureCost\ | 12/4/2003 | 10:03:25 AM | 22 kb |
| library\ | 12/4/2003 | 10:03:13 AM | 6 kb |
| manHours\ | 12/4/2003 | 10:31:32 AM | 60 kb |
| Ratio\ | 12/4/2003 | 10:31:57 AM | 15 kb |
| tempold 26-06-2003\ | 12/4/2003 | 10:02:34 AM | 312 kb |
| TotalCosts\ | 12/4/2003 | 10:00:52 AM | 27 kb |
| content.asp.txt | 8/1/2003 | 4:53:35 AM | 15 kb |
| gadget.asp.txt | 5/29/2003 | 3:28:58 AM | 1 kb |
| LOSPictureLink.asp.txt | 8/1/2003 | 4:58:41 AM | 1 kb |
| Folder listing of \SNS\ MaintenanceTeamSight\CMCosts\ | | | |
| costbycomplex.asp.txt | 6/26/2003 | 8:07:18 AM | 12 kb |
| costbySats.asp.txt | 6/26/2003 | 8:07:19 AM | 12 kb |
| Folder listing of \SNS\ MaintenanceTeamSight\Compliance\ | | | |
| CMComplianceHours.asp.txt | 6/26/2003 | 9:20:41 AM | 16 kb |
| PPMComplianceHours.asp.txt | 6/26/2003 | 8:07:31 AM | 17 kb |
| Folder listing of \SNS\ MaintenanceTeamSight\css\ | | | |
| calendar.css.txt | 4/11/2002 | 7:09:52 AM | 1 kb |
| specsheet.css.txt | 6/12/2002 | 3:11:52 AM | 8 kb |
| Folder listing of \SNS\ MaintenanceTeamSight\FailureCost\ | | | |
| FailurecostbyCause.asp.txt | 6/27/2003 | 7:38:40 AM | 12 kb |
| FailurecostbyLocation.asp.txt | 6/27/2003 | 7:47:34 AM | 10 kb |
| Folder listing of \SNS\ MaintenanceTeamSight\library\ | | | |
| connection.asp.txt | 2/27/2003 | 2:01:44 PM | 1 kb |
| functions.asp.txt | 6/26/2003 | 8:07:49 AM | 4 kb |
| ptincludes.asp.txt | 12/11/2002 | 5:48:35 AM | 1 kb |
| Folder listing of \SNS\ MaintenanceTeamSight\manHours\ | | | |
| admin\ | 12/4/2003 | 10:31:39 AM | 7 kb |
| compmanhrs.asp.txt | 6/26/2003 | 8:07:59 AM | 12 kb |
| MaintSuppyDemand.asp.txt | 6/26/2003 | 8:08:00 AM | 13 kb |
| PMWorkloadHistandPlan.asp.txt | 6/26/2003 | 9:07:50 AM | 12 kb |
| TotalMaintBacklog.asp.txt | 6/26/2003 | 8:08:01 AM | 16 kb |
| Folder listing of \SNS\ MaintenanceTeamSight\manHours\admin\ | | | |
| action_adminManHrs.asp.txt | 2/26/2003 | 8:44:31 AM | 2 kb |
| adminManHrs.asp.txt | 2/26/2003 | 9:04:44 AM | 5 kb |
| AvailableHours.asp.txt | 8/12/2002 | 7:46:48 AM | 1 kb |
| Folder listing of \SNS\ MaintenanceTeamSight\Ratio\ | | | |
| ratioCDl.cdl.txt | 9/5/2002 | 2:03:54 AM | 2 kb |
| RatioCMPMM.asp.txt | 6/26/2003 | 8:08:06 AM | 13 kb |
| Folder listing of \SNS\ MaintenanceTeamSight\ tempold 26-06-2003\ | | | |
| CMCosts\ | 12/4/2003 | 10:03:04 AM | 28 kb |
| Compliance\ | 12/4/2003 | 10:02:54 AM | 59 kb |
| css\ | 12/4/2003 | 10:02:47 AM | 9 kb |
| FailureCost\ | 12/4/2003 | 10:02:40 AM | 17 kb |
| library\ | 12/4/2003 | 10:02:26 AM | 37 kb |
| manHours\ | 12/4/2003 | 10:01:53 AM | 90 kb |
| Ratio\ | 12/4/2003 | 10:01:38 AM | 15 kb |
| TotalCosts\ | 12/4/2003 | 10:01:19 AM | 40 kb |
| content.asp.txt | 6/25/2003 | 7:53:44 AM | 15 kb |
| gadget.asp.txt | 5/29/2003 | 3:28:58 AM | 1 kb |
| Folder listing of \SNS\ MaintenanceTeamSight\TotalCosts\ | | | |
| costbyComplex.asp.txt | 6/26/2003 | 8:08:13 AM | 12 kb |
| costbySats.asp.txt | 6/26/2003 | 8:08:13 AM | 13 kb |
| totcost.cdl.txt | 11/28/2002 | 8:34:53 AM | 2 kb |
| Folder listing of \SNS\ NewSNSAssetChokeModel\ | | | |

-continued

| Directory of CD | | | | |
|---|---|---|---|---|
| admin\ | 12/4/2003 | 10:05:52 AM | 68 | kb |
| css\ | 12/4/2003 | 10:06:04 AM | 1 | kb |
| images\ | 12/4/2003 | 10:05:17 AM | 27 | kb |
| ackthis.asp.txt | 12/17/2002 | 8:14:12 AM | 5 | kb |
| assetchokemenu.css.txt | 6/28/2002 | 7:16:29 AM | 1 | kb |
| assetchokemenu.js.txt | 11/13/2002 | 3:27:59 AM | 4 | kb |
| calendar.asp.txt | 11/1/2002 | 9:57:04 AM | 6 | kb |
| charts.asp.txt | 7/2/2003 | 8:57:50 AM | 36 | kb |
| clearthis.asp.txt | 12/17/2002 | 8:14:45 AM | 1 | kb |
| compressorenvelope.asp.txt | 6/10/2003 | 4:42:12 AM | 106 | kb |
| conn.inc.txt | 11/8/2002 | 4:35:28 AM | 1 | kb |
| conn__expert.inc.txt | 7/29/2003 | 5:39:01 AM | 1 | kb |
| Copy of satoverview.asp.txt | 12/10/2002 | 2:55:42 AM | 11 | kb |
| esdpsdstatus.asp.txt | 8/16/2002 | 2:17:53 AM | 7 | kb |
| expert.asp.txt | 12/12/2002 | 7:33:35 AM | 3 | kb |
| gadget.asp.txt | 5/19/2003 | 1:56:41 AM | 4 | kb |
| map.asp.txt | 12/11/2002 | 9:10:18 AM | 7 | kb |
| moreinfo.asp.txt | 7/29/2003 | 6:21:43 AM | 7 | kb |
| notfound.asp.txt | 7/17/2002 | 9:32:49 AM | 1 | kb |
| openv.asp.txt | 8/25/2003 | 3:32:02 AM | 9 | kb |
| pipestatus.asp.txt | 8/8/2002 | 3:32:22 AM | 6 | kb |
| ptincludes.asp.txt | 12/11/2002 | 3:53:49 AM | 1 | kb |
| satoverview.asp.old.txt | 12/11/2002 | 5:19:40 AM | 1 | kb |
| satoverview.asp.txt | 9/1/2003 | 9:24:51 AM | 24 | kb |
| satoverviewold.asp.txt | 5/27/2003 | 5:05:45 AM | 12 | kb |
| toolbar.asp.txt | 5/19/2003 | 3:13:30 AM | 7 | kb |
| toolbarnew.asp.txt | 12/11/2002 | 7:47:28 AM | 6 | kb |
| uptimeavailability.asp.txt | 9/9/2003 | 12:58:45 AM | 33 | kb |
| uptimeavailability2.asp.txt | 8/28/2003 | 3:44:38 AM | 31 | kb |
| viscount.asp.txt | 5/27/2003 | 7:15:29 AM | 1 | kb |
| wellstatus.asp.txt | 9/9/2003 | 12:26:39 AM | 8 | kb |
| Folder listing of\SNS\ | | | | |
| NewSNSAssetChokeModel\admin\ | | | | |
| a__map__location__apply.asp.txt | 7/18/2002 | 2:18:31 AM | 1 | kb |
| addmodel.asp.txt | 8/14/2002 | 1:11:20 AM | 6 | kb |
| addobject.asp.txt | 8/14/2002 | 1:11:35 AM | 7 | kb |
| addobjecttype.asp.txt | 8/14/2002 | 1:12:15 AM | 4 | kb |
| adminprefs.asp.txt | 3/7/2003 | 9:54:18 AM | 6 | kb |
| default.asp.txt | 3/7/2003 | 9:45:26 AM | 1 | kb |
| delmodel.asp.txt | 8/14/2002 | 1:15:18 AM | 3 | kb |
| delobject.asp.txt | 8/14/2002 | 1:17:01 AM | 4 | kb |
| delobjecttype.asp.txt | 8/14/2002 | 1:15:28 AM | 3 | kb |
| editmodel.asp.txt | 8/14/2002 | 1:15:07 AM | 5 | kb |
| editobject.asp.txt | 8/14/2002 | 1:11:53 AM | 8 | kb |
| editobjecttype.asp.txt | 8/14/2002 | 1:12:04 AM | 4 | kb |
| list.asp.txt | 3/7/2003 | 9:25:16 AM | 1 | kb |
| maintainmodels.asp.txt | 8/14/2002 | 1:11:05 AM | 3 | kb |
| maintainobjects.asp.txt | 8/14/2002 | 1:15:43 AM | 4 | kb |
| maintainobjecttypes.asp.txt | 8/14/2002 | 1:15:53 AM | 3 | kb |
| map__adminroutines.js.txt | 7/3/2002 | 7:20:10 AM | 5 | kb |
| ptincludes.asp.txt | 8/14/2002 | 5:16:38 AM | 1 | kb |
| Folder listing of\SNS\ | | | | |
| NewSNSAssetChokeModel\css\ | | | | |
| calendar.css.txt | 4/11/2002 | 7:09:52 AM | 1 | kb |
| Folder listing of\SNS\ | | | | |
| NewSNSAssetChokeModel\images\ | | | | |
| css\ | 12/4/2003 | 10:04:52 AM | 1 | kb |
| Folder listing of\SNS\ | | | | |
| NewSNSAssetChokeModel\images\css\ | | | | |
| calendar.css.txt | 9/5/2002 | 2:17:10 AM | 1 | kb |
| Folder listing of\SNS\PlanningSight\ | | | | |
| content.asp.txt | 7/18/2002 | 1:38:40 AM | 3 | kb |
| gadget.asp.txt | 7/18/2002 | 1:39:14 AM | 1 | kb |
| Folder listing of\SNS\ | | | | |
| ProcessOptimisation\ | | | | |
| old\ | 12/4/2003 | 10:07:47 AM | 30 | kb |
| assetchokemenu.js.txt | 5/16/2003 | 3:37:32 AM | 4 | kb |
| calendar.asp.txt | 5/22/2003 | 3:27:59 AM | 4 | kb |
| calendar.css.txt | 4/7/2003 | 10:10:44 AM | 1 | kb |
| calendar.js.txt | 4/8/2003 | 3:14:47 AM | 1 | kb |
| calFrame.asp.txt | 5/22/2003 | 3:28:45 AM | 4 | kb |
| conn.inc.txt | 5/12/2003 | 4:59:02 AM | 1 | kb |
| gadget.asp.txt | 5/16/2003 | 3:33:59 AM | 4 | kb |
| presentation.asp.txt | 5/27/2003 | 8:22:01 AM | 1 | kb |
| processopt.asp.txt | 8/25/2003 | 5:04:32 AM | 22 | kb |
| ptincludes.asp.txt | 12/11/2002 | 3:53:49 AM | 1 | kb |
| sandconstraints.asp.txt | 5/21/2003 | 4:42:20 AM | 1 | kb |

-continued

Directory of CD

| | | | |
|---|---|---|---|
| stylesheet.css.txt | 5/22/2003 | 8:43:50 AM | 2 kb |
| testing.asp.txt | 5/12/2003 | 2:17:44 AM | 1 kb |
| turbine.asp.txt | 5/21/2003 | 4:42:01 AM | 1 kb |
| Folder listing of\SNS\ProcessOptimisation\old\ | | | |
| flowgraph.asp.txt | 5/12/2003 | 2:48:48 AM | 6 kb |
| gadget. asp.txt | 5/6/2003 | 4:41:28 AM | 1 kb |
| percentgraph.asp.txt | 5/12/2003 | 3:37:43 AM | 8 kb |
| processopt.asp.txt | 5/8/2003 | 6:13:53 AM | 10 kb |
| stylesheet.css.txt | 4/22/2003 | 9:15:27 AM | 1 kb |
| ve-7F.tmp.txt | 4/18/2003 | 9:05:21 AM | 4 kb |
| vssver.scc.txt | 5/6/2003 | 4:46:49 AM | 1 kb |
| Folder listing of\SNS\RTOPortalLinks\ | | | |
| gadget.asp.txt | 8/14/2002 | 5:37:13 AM | 3 kb |
| Folder listing of\SNS\scmdelivery\ | | | |
| css\ | 12/4/2003 | 10:08:30 AM | 1 kb |
| calendar.asp.txt | 3/6/2003 | 9:43:05 AM | 7 kb |
| conn.inc.txt | 9/4/2002 | 4:22:56 AM | 1 kb |
| deliveryanalysis.asp.txt | 3/27/2003 | 9:05:59 AM | 12 kb |
| gadget.asp.txt | 9/19/2002 | 9:20:00 AM | 1 kb |
| ptincludes.asp.txt | 12/12/2002 | 5:33:54 AM | 1 kb |
| vendordeliveryanalysis.asp.txt | 3/27/2003 | 9:05:42 AM | 7 kb |
| Folder listing of\SNS\scmdelivery\css\ | | | |
| calendar.css.txt | 4/11/2002 | 7:09:52 AM | 1 kb |
| Folder listing of\SNS\SCMSight\ | | | |
| content.asp.txt | 3/6/2003 | 9:35:45 AM | 20 kb |
| gadget.asp.txt | 2/24/2003 | 10:03:59 AM | 1 kb |
| Folder listing of\SNS\SIRMessages\ | | | |
| c_sir\ | 12/4/2003 | 9:38:18 AM | 455 kb |
| gadget.asp.txt | 12/11/2002 | 7:53:05 AM | 3 kb |
| ptincludes.asp.txt | 12/12/2002 | 7:05:27 AM | 1 kb |
| Folder listing of\SNS\SIRMessages\c_sir\ | | | |
| SIR\ | 12/4/2003 | 10:14:29 AM | 455 kb |
| Folder listing of\SNS\SIRMessages\c_sir\SIR\ | | | |
| admin\ | 12/4/2003 | 10:14:46 AM | 71 kb |
| checkDate.js.txt | 11/1/2002 | 4:47:10 AM | 3 kb |
| checkDateTime.js.txt | 11/1/2002 | 4:40:39 AM | 4 kb |
| common.js.txt | 12/9/2002 | 7:27:08 AM | 4 kb |
| deleteAffectedField.asp.txt | 11/28/2002 | 5:38:23 AM | 1 kb |
| editSIRtracking.asp.txt | 12/11/2002 | 10:32:34 AM | 8 kb |
| editTrackingEntry.asp.txt | 10/1/2003 | 2:25:07 AM | 9 kb |
| email.asp.txt | 11/30/2002 | 7:24:12 AM | 8 kb |
| functions.asp.txt | 11/28/2002 | 8:38:48 AM | 10 kb |
| initialInput.asp.txt | 8/14/2003 | 7:02:09 AM | 14 kb |
| KPIExemptionPrintable.asp.txt | 12/11/2002 | 11:10:43 AM | 6 kb |
| main.asp.txt | 5/27/2003 | 6:22:12 AM | 31 kb |
| MSU.asp.txt | 12/11/2002 | 11:48:49 AM | 6 kb |
| newTrackingEntry.asp.txt | 10/1/2003 | 2:27:46 AM | 7 kb |
| PMRA.asp.txt | 12/11/2002 | 12:06:13 PM | 6 kb |
| RCA.asp.txt | 12/12/2002 | 3:45:32 AM | 6 kb |
| reportDTCont.asp.txt | 2/19/2003 | 9:39:17 AM | 10 kb |
| reportDTLocation.asp.txt | 12/12/2002 | 4:16:09 AM | 9 kb |
| reportGenerator.asp.txt | 12/12/2002 | 4:23:50 AM | 13 kb |
| reportIssues.asp.txt | 12/12/2002 | 6:39:44 AM | 17 kb |
| reportKPIExemption.asp.txt | 12/12/2002 | 4:49:06 AM | 11 kb |
| reportPercentAvail.asp.txt | 12/12/2002 | 4:55:17 AM | 7 kb |
| reportPortalDTCont.asp.txt | 2/19/2003 | 10:11:02 AM | 11 kb |
| reportPortalLosses.asp.txt | 6/27/2003 | 4:05:16 AM | 12 kb |
| reportProdLoss.asp.txt | 12/12/2002 | 5:13:49 AM | 10 kb |
| reportRecurringEvent.asp.txt | 12/12/2002 | 5:43:51 AM | 13 kb |
| reportRespAsset.asp.txt | 12/12/2002 | 5:55:22 AM | 10 kb |
| reportTabular.asp.txt | 5/27/2003 | 6:28:12 AM | 11 kb |
| reporttotalASPerf.asp.txt | 5/27/2003 | 6:26:11 AM | 22 kb |
| saveAffectedField.asp.txt | 11/28/2002 | 5:48:10 AM | 1 kb |
| saveDoc.asp.txt | 11/28/2002 | 5:48:15 AM | 1 kb |
| saveInitialInput.asp.txt | 12/12/2002 | 6:05:44 AM | 3 kb |
| saveIssues.asp.txt | 12/12/2002 | 6:35:57 AM | 1 kb |
| saveKPIdoc.asp.txt | 11/28/2002 | 5:49:47 AM | 1 kb |
| saveKPIReport.asp.txt | 11/28/2002 | 5:50:05 AM | 3 kb |
| saveSIRdetails.asp.txt | 11/28/2002 | 5:50:11 AM | 4 kb |
| saveSIRtracking.asp.txt | 12/12/2002 | 6:41:11 AM | 1 kb |
| saveTrackingEntry.asp.txt | 11/28/2002 | 5:50:21 AM | 4 kb |
| sir.css.txt | 11/19/2002 | 7:32:28 AM | 7 kb |
| SIRDetails.asp.txt | 12/13/2002 | 3:28:39 AM | 22 kb |
| sirMessages.asp.txt | 11/28/2002 | 5:50:32 AM | 2 kb |
| sqlServer.asp.txt | 12/20/2002 | 9:26:12 AM | 3 kb |

-continued

| Directory of CD | | | | |
|---|---|---|---|---|
| TC.asp.txt | 12/12/2002 | 8:27:22 AM | 6 | kb |
| trackingAll.asp.txt | 12/12/2002 | 8:48:49 AM | 23 | kb |
| viewKPIExemption.asp.txt | 12/12/2002 | 9:58:43 AM | 8 | kb |
| viewSIRDetails.asp.txt | 12/12/2002 | 11:18:39 AM | 18 | kb |
| Folder listing of\SNS\ SIRMessages\c_sir\SIR\admin\ | | | | |
| actual.asp.txt | 12/5/2002 | 5:04:26 AM | 2 | kb |
| admin.asp.txt | 12/9/2002 | 12:51:51 PM | 3 | kb |
| affectedFields.asp.txt | 12/9/2002 | 12:51:07 PM | 3 | kb |
| AssetFunctionalGroup.asp.txt | 12/9/2002 | 12:50:23 PM | 2 | kb |
| Causecategory.asp.txt | 12/9/2002 | 12:48:24 PM | 2 | kb |
| Choice.asp.txt | 12/9/2002 | 12:47:43 PM | 2 | kb |
| choiceDbField.asp.txt | 12/9/2002 | 12:46:59 PM | 2 | kb |
| choiceJobTitle.asp.txt | 12/9/2002 | 12:46:25 PM | 2 | kb |
| choicepeople.asp.txt | 12/9/2002 | 12:45:44 PM | 2 | kb |
| dailyAvailability.asp.txt | 12/23/2002 | 4:53:43 AM | 4 | kb |
| FunctionalResponsibility.asp.txt | 12/9/2002 | 12:44:02 PM | 2 | kb |
| goals.asp.txt | 12/9/2002 | 12:41:55 PM | 3 | kb |
| groupDbField.asp.txt | 12/9/2002 | 12:39:51 PM | 2 | kb |
| groupJobTitle.asp.txt | 10/2/2003 | 9:10:33 AM | 3 | kb |
| groupPeople.asp.txt | 12/9/2002 | 12:38:43 PM | 2 | kb |
| jobtitle.asp.txt | 12/9/2002 | 12:37:33 PM | 2 | kb |
| locations.asp.txt | 12/9/2002 | 12:31:43 PM | 4 | kb |
| lossCategory.asp.txt | 12/9/2002 | 12:31:12 PM | 3 | kb |
| mailgroups.asp.txt | 10/2/2003 | 9:03:40 AM | 5 | kb |
| people.asp.txt | 12/9/2002 | 12:27:46 PM | 5 | kb |
| ResponsibleFunction.asp.txt | 12/9/2002 | 12:27:37 PM | 2 | kb |
| saveAssetFunctionalGroup.asp.txt | 12/5/2002 | 5:06:55 AM | 1 | kb |
| savecausecategory.asp.txt | 12/5/2002 | 5:06:59 AM | 1 | kb |
| saveDailyAvailability.asp.txt | 12/5/2002 | 5:08:44 AM | 1 | kb |
| saveFunctionalResponsibility.asp.txt | 12/5/2002 | 5:07:09 AM | 1 | kb |
| savegas.asp.txt | 12/5/2002 | 5:07:13 AM | 1 | kb |
| savegoals.asp.txt | 12/5/2002 | 5:07:18 AM | 1 | kb |
| savejobtitle.asp.txt | 12/5/2002 | 5:07:22 AM | 1 | kb |
| saveLocation.asp.txt | 11/30/2002 | 9:52:15 AM | 1 | kb |
| saveLosscategory.asp.txt | 12/5/2002 | 5:07:30 AM | 1 | kb |
| savepeople.asp.txt | 12/9/2002 | 12:25:04 PM | 1 | kb |
| saveResponsibleFunction.asp.txt | 12/5/2002 | 5:04:22 AM | 1 | kb |
| Folder listing of\SNS\ SNSAssetChokeModel\ | | | | |
| admin\ | 12/4/2003 | 10:16:42 AM | 68 | kb |
| css\ | 12/4/2003 | 10:16:18 AM | 1 | kb |
| images\ | 12/4/2003 | 10:16:12 AM | 27 | kb |
| ackthis.asp.txt | 12/17/2002 | 8:14:12 AM | 5 | kb |
| assetchokemenu.css.txt | 6/28/2002 | 7:16:29 AM | 1 | kb |
| assetchokemenu.js.txt | 11/13/2002 | 3:27:59 AM | 4 | kb |
| calendar.asp.txt | 11/1/2002 | 9:57:04 AM | 6 | kb |
| charts.asp.txt | 7/2/2003 | 8:57:50 AM | 36 | kb |
| clearthis.asp.txt | 12/17/2002 | 8:14:45 AM | 1 | kb |
| compressorenvelope.asp.txt | 6/10/2003 | 4:42:12 AM | 106 | kb |
| conn.inc (1).inc.txt | 7/29/2003 | 5:39:01 AM | 1 | kb |
| conn.inc (2).txt | 11/8/2002 | 4:35:28 AM | 1 | kb |
| Copy of satoverview.asp.txt | 12/10/2002 | 2:55:42 AM | 11 | kb |
| esdpsdstatus.asp.txt | 8/16/2002 | 2:17:53 AM | 7 | kb |
| expert.asp.txt | 12/12/2002 | 7:33:35 AM | 3 | kb |
| gadget.asp.txt | 9/25/2003 | 12:57:37 AM | 4 | kb |
| map.asp.txt | 12/11/2002 | 9:10:18 AM | 7 | kb |
| moreinfo.asp.txt | 7/29/2003 | 6:21:43 AM | 7 | kb |
| notfound.asp.txt | 7/17/2002 | 9:32:49 AM | 1 | kb |
| openv.asp.txt | 8/25/2003 | 3:32:02 AM | 9 | kb |
| pipestatus.asp.txt | 8/8/2002 | 3:32:22 AM | 6 | kb |
| ptincludes.asp.txt | 12/11/2002 | 3:53:49 AM | 1 | kb |
| satoverview.asp.old.txt | 12/11/2002 | 5:19:40 AM | 1 | kb |
| satoverview.asp.txt | 9/30/2003 | 4:28:04 AM | 24 | kb |
| satoverviewold.asp.txt | 5/27/2003 | 5:05:45 AM | 12 | kb |
| toolbar.asp.txt | 5/19/2003 | 3:13:30 AM | 7 | kb |
| toolbarnew.asp.txt | 12/11/2002 | 7:47:28 AM | 6 | kb |
| uptimeavailability.asp.txt | 9/25/2003 | 1:31:04 AM | 33 | kb |
| uptimeavailability2.asp.txt | 8/28/2003 | 3:44:38 AM | 31 | kb |
| viscount.asp.txt | 5/27/2003 | 7:15:29 AM | 1 | kb |
| wellstatus.asp.txt | 9/30/2003 | 3:48:21 AM | 8 | kb |
| Folder listing of\SNS\ SNSAssetChokeModel\admin\ | | | | |
| a_map_location_apply.asp.txt | 7/18/2002 | 2:18:31 AM | 1 | kb |
| addmodel.asp.txt | 8/14/2002 | 1:11:20 AM | 6 | kb |
| addobject.asp.txt | 8/14/2002 | 1:11:35 AM | 7 | kb |
| addobjecttype.asp.txt | 8/14/2002 | 1:12:15 AM | 4 | kb |

-continued

| Directory of CD | | | |
|---|---|---|---|
| adminprefs.asp.txt | 3/7/2003 | 9:54:18 AM | 6 kb |
| default.asp.txt | 3/7/2003 | 9:45:26 AM | 1 kb |
| delmodel.asp.txt | 8/14/2002 | 1:15:18 AM | 3 kb |
| delobject.asp.txt | 8/14/2002 | 1:17:01 AM | 4 kb |
| delobjecttype.asp.txt | 8/14/2002 | 1:15:28 AM | 3 kb |
| editmodel.asp.txt | 8/14/2002 | 1:15:07 AM | 5 kb |
| editobject.asp.txt | 8/14/2002 | 1:11:53 AM | 8 kb |
| editobjecttype.asp.txt | 8/14/2002 | 1:12:04 AM | 4 kb |
| list.asp.txt | 3/7/2003 | 9:25:16 AM | 1 kb |
| maintainmodels.asp.txt | 8/14/2002 | 1:11:05 AM | 3 kb |
| maintainobjects.asp.txt | 8/14/2002 | 1:15:43 AM | 4 kb |
| maintainobjecttypes.asp.txt | 8/14/2002 | 1:15:53 AM | 3 kb |
| map_adminroutines.js.txt | 7/3/2002 | 7:20:10 AM | 5 kb |
| ptincludes.asp.txt | 8/14/2002 | 5:16:38 AM | 1 kb |
| Folder listing of \SNS\ SNSAssetChokeModel\css\ | | | |
| calendar.css.txt | 4/11/2002 | 7:09:52 AM | 1 kb |
| Folder listing of \SNS\ SNSAssetChokeModel\images\ | | | |
| css\ | 12/4/2003 | 10:16:00 AM | 1 kb |
| Folder listing of \SNS\ SNSAssetChokeModel\images\css\ | | | |
| calendar.css.txt | 9/5/2002 | 2:17:10 AM | 1 kb |
| Folder listing of \SNS\SNSDashboard\ | | | |
| conn.inc.txt | 11/12/2002 | 8:36:27 AM | 1 kb |
| gadget.asp.txt | 6/25/2003 | 6:54:02 AM | 11 kb |
| javamap.asp.txt | 1/16/2003 | 10:13:58 AM | 8 kb |
| javamaptest.asp.txt | 1/16/2003 | 10:13:58 AM | 8 kb |
| Folder listing of \SNS\SNSHelp\ | | | |
| whdata\ | 12/4/2003 | 10:17:40 AM | 27 kb |
| whgdata\ | 12/4/2003 | 10:18:15 AM | 218 kb |
| whxdata\ | 12/4/2003 | 10:18:45 AM | 28 kb |
| About_Communities.htm.txt | 6/19/2003 | 8:57:35 AM | 5 kb |
| Asset_Performance_Metrics.htm.txt | 6/20/2003 | 3:31:44 AM | 5 kb |
| banner.asp.txt | 6/24/2003 | 9:14:29 AM | 2 kb |
| Coming_Soon.htm.txt | 6/24/2003 | 1:41:47 AM | 5 kb |
| Conoco SNS Portal Help.log.txt | 1/8/2003 | 7:41:18 AM | 5 kb |
| Creating_Your_Home_Page.htm.txt | 6/17/2003 | 8:51:05 AM | 5 kb |
| cshdat_robohelp.htm.txt | 6/25/2003 | 2:15:16 AM | 6 kb |
| cshdat_webhelp.htm.txt | 6/25/2003 | 2:15:30 AM | 6 kb |
| default.skn.txt | 1/23/2002 | 4:35:02 AM | 9 kb |
| Discussion_Board.htm.txt | 1/8/2003 | 7:41:14 AM | 4 kb |
| Editing_and_Deleting_Pages.htm.txt | 6/19/2003 | 6:47:01 AM | 5 kb |
| eHelp.xml.txt | 12/17/2002 | 9:52:34 AM | 1 kb |
| ehlpdhtm.js.txt | 9/5/2002 | 9:16:32 AM | 120 kb |
| gadget.asp.txt | 1/7/2003 | 9:13:02 AM | 1 kb |
| help_style.css.txt | 6/17/2003 | 8:59:35 AM | 1 kb |
| help_style_ns.css.txt | 1/8/2003 | 7:41:15 AM | 1 kb |
| KBR_Operations_Knowledge_Capture.htm.txt | 6/20/2003 | 9:22:57 AM | 5 kb |
| Logging_in_for_the_first_time.htm.txt | 6/16/2003 | 8:57:58 AM | 4 kb |
| Loss_Summary_Graph.htm.txt | 1/8/2003 | 7:41:14 AM | 4 kb |
| Maintenance_Team.htm.txt | 6/19/2003 | 4:18:17 AM | 4 kb |
| Navigating_the_Sidebar_Gadgets.htm.txt | 6/19/2003 | 7:24:40 AM | 4 kb |
| Portal_overview.htm.txt | 6/16/2003 | 4:33:32 AM | 9 kb |
| Portal_User_Help.htm.txt | 1/8/2003 | 7:41:14 AM | 5 kb |
| Production_Optimisation.htm.txt | 6/20/2003 | 8:11:51 AM | 4 kb |
| Production_Performance_Model.htm.txt | 6/20/2003 | 4:06:52 AM | 4 kb |
| ptincludes.asp.txt | 12/11/2002 | 3:53:49 AM | 1 kb |
| Shutdown_Incident_Reporting.htm.txt | 6/20/2003 | 4:25:24 AM | 5 kb |
| SIR_The_Shutdown_Incident_Register.htm.txt | 6/20/2003 | 8:59:08 AM | 4 kb |
| SNS_Help.htm.txt | 6/24/2003 | 9:10:50 AM | 5 kb |
| SNS_Help_csh.htm.txt | 6/25/2003 | 2:15:50 AM | 2 kb |
| SNS_Help_rhc.htm.txt | 6/25/2003 | 2:15:59 AM | 2 kb |
| Supply_Chain_Management.htm.txt | 6/20/2003 | 8:10:35 AM | 4 kb |
| The_Choke_Model.htm.txt | 1/8/2003 | 7:41:14 AM | 5 kb |
| The_Documents_Directory.htm.txt | 1/8/2003 | 7:41:14 AM | 4 kb |
| The_Real_Time_Operations_Screen.htm.txt | 6/17/2003 | 4:24:10 AM | 5 kb |
| titanium.skn.txt | 2/27/2002 | 3:56:22 AM | 10 kb |
| Traffic_Light_System_for_Facilities_Status.htm.txt | 1/8/2003 | 7:41:14 AM | 5 kb |
| Troubleshooting.htm.txt | 1/8/2003 | 7:41:14 AM | 6 kb |
| Uptime_and_Availability.htm.txt | 1/8/2003 | 7:41:14 AM | 4 kb |
| Using_the_Tile_Zone.htm.txt | 6/17/2003 | 9:06:16 AM | 6 kb |

-continued

Directory of CD

| | | | |
|---|---|---|---|
| Using_the_Tool_Buttons.htm.txt | 6/20/2003 | 3:53:26 AM | 7 kb |
| Welcome_to_the_RTO_Portal.htm.txt | 1/8/2003 | 7:41:14 AM | 7 kb |
| Well_Status.htm.txt | 1/8/2003 | 7:41:15 AM | 4 kb |
| whcsh_home.htm.txt | 1/8/2003 | 7:41:16 AM | 12 kb |
| whcshdata.htm.txt | 6/25/2003 | 2:16:06 AM | 2 kb |
| Where_to_get_more_help.htm.txt | 1/8/2003 | 7:41:15 AM | 5 kb |
| whfbody.htm.txt | 1/8/2003 | 7:41:16 AM | 1 kb |
| whfdhtml.htm.txt | 1/8/2003 | 7:41:16 AM | 1 kb |
| whfform.htm.txt | 1/8/2003 | 7:41:16 AM | 3 kb |
| whfhost.js.txt | 1/8/2003 | 7:41:16 AM | 19 kb |
| whform.js.txt | 1/8/2003 | 7:41:17 AM | 5 kb |
| whframes.js.txt | 1/8/2003 | 7:41:17 AM | 2 kb |
| whgbody.htm.txt | 1/8/2003 | 7:41:16 AM | 1 kb |
| whgdef.htm.txt | 1/8/2003 | 7:41:16 AM | 3 kb |
| whgdhtml.htm.txt | 1/8/2003 | 7:41:16 AM | 4 kb |
| whghost.js.txt | 1/8/2003 | 7:41:17 AM | 6 kb |
| whhost.js.txt | 1/8/2003 | 7:41:16 AM | 24 kb |
| whibody.htm.txt | 1/8/2003 | 7:41:16 AM | 9 kb |
| whidhtml.htm.txt | 1/8/2003 | 7:41:16 AM | 1 kb |
| whiform.htm.txt | 1/8/2003 | 7:41:16 AM | 2 kb |
| whihost.js.txt | 1/8/2003 | 7:41:17 AM | 11 kb |
| whlang.js.txt | 1/8/2003 | 7:41:16 AM | 11 kb |
| whmozemu.js.txt | 1/8/2003 | 7:41:17 AM | 2 kb |
| whmsg.js.txt | 1/8/2003 | 7:41:18 AM | 2 kb |
| whnjs.htm.txt | 6/25/2003 | 2:15:40 AM | 1 kb |
| whphost.js.txt | 1/8/2003 | 7:41:16 AM | 12 kb |
| whproj.htm.txt | 1/8/2003 | 7:41:16 AM | 1 kb |
| whproj.js.txt | 1/8/2003 | 7:41:16 AM | 1 kb |
| whproj.xml.txt | 1/8/2003 | 7:41:16 AM | 1 kb |
| whproxy.js.txt | 1/8/2003 | 7:41:16 AM | 1 kb |
| whres.xml.txt | 1/8/2003 | 7:41:16 AM | 11 kb |
| whskin_banner.htm.txt | 1/8/2003 | 7:41:16 AM | 2 kb |
| whskin_blank.htm.txt | 1/8/2003 | 7:41:16 AM | 1 kb |
| whskin_frmset01.htm.txt | 1/8/2003 | 7:41:17 AM | 4 kb |
| whskin_frmset010.htm.txt | 1/8/2003 | 7:41:17 AM | 2 kb |
| whskin_homepage.htm.txt | 1/8/2003 | 7:41:17 AM | 5 kb |
| whskin_info.htm.txt | 1/8/2003 | 7:41:16 AM | 1 kb |
| whskin_mbars.htm.txt | 1/8/2003 | 7:41:17 AM | 2 kb |
| whskin_papplet.htm.txt | 1/8/2003 | 7:41:17 AM | 10 kb |
| whskin_pdhtml.htm.txt | 1/8/2003 | 7:41:16 AM | 2 kb |
| whskin_pickup.htm.txt | 1/8/2003 | 7:41:16 AM | 6 kb |
| whskin_plist.htm.txt | 1/8/2003 | 7:41:17 AM | 6 kb |
| whskin_tbars.htm.txt | 6/24/2003 | 9:01:27 AM | 4 kb |
| whst_topics.xml.txt | 1/8/2003 | 7:41:12 AM | 3 kb |
| whstart.js.txt | 1/8/2003 | 7:41:16 AM | 9 kb |
| whstub.js.txt | 1/8/2003 | 7:41:18 AM | 3 kb |
| whtbar.js.txt | 1/8/2003 | 7:41:16 AM | 45 kb |
| whtdhtml.htm.txt | 6/20/2003 | 2:25:31 AM | 1 kb |
| whthost.js.txt | 1/8/2003 | 7:41:16 AM | 30 kb |
| whtopic.js.txt | 1/8/2003 | 7:41:16 AM | 16 kb |
| whutils.js.txt | 1/8/2003 | 7:41:17 AM | 11 kb |
| whver.js.txt | 1/8/2003 | 7:41:17 AM | 1 kb |
| Folder listing of \SNS\SNSHelp\whdata\ | | | |
| whftdata.js.txt | 1/8/2003 | 7:41:17 AM | 1 kb |
| whftdata0.htm.txt | 1/8/2003 | 7:41:17 AM | 2 kb |
| whfts.htm.txt | 1/8/2003 | 7:41:16 AM | 1 kb |
| whfts.js.txt | 1/8/2003 | 7:41:17 AM | 1 kb |
| whfwdata.js.txt | 1/8/2003 | 7:41:17 AM | 1 kb |
| whfwdata0.htm.txt | 1/8/2003 | 7:41:17 AM | 15 kb |
| whgdata.js.txt | 1/8/2003 | 7:41:17 AM | 1 kb |
| whglo.htm.txt | 1/8/2003 | 7:41:16 AM | 1 kb |
| whglo.js.txt | 1/8/2003 | 7:41:17 AM | 1 kb |
| whidata.js.txt | 1/8/2003 | 7:41:17 AM | 2 kb |
| whidx.htm.txt | 1/8/2003 | 7:41:16 AM | 1 kb |
| whidx.js.txt | 1/8/2003 | 7:41:17 AM | 1 kb |
| whtdata.js.txt | 1/8/2003 | 7:41:17 AM | 1 kb |
| whtdata0.htm.txt | 6/19/2003 | 9:19:33 AM | 2 kb |
| whtoc.htm.txt | 1/8/2003 | 7:41:16 AM | 1 kb |
| whtoc.js.txt | 1/8/2003 | 7:41:17 AM | 1 kb |
| Folder listing of \SNS\SNSHelp\whgdata\ | | | |
| whlstf0.htm.txt | 1/8/2003 | 7:41:17 AM | 20 kb |
| whlstf1.htm.txt | 1/8/2003 | 7:41:17 AM | 19 kb |
| whlstf2.htm.txt | 1/8/2003 | 7:41:17 AM | 21 kb |
| whlstf3.htm.txt | 1/8/2003 | 7:41:17 AM | 19 kb |
| whlstf4.htm.txt | 1/8/2003 | 7:41:17 AM | 20 kb |
| whlstf5.htm.txt | 1/8/2003 | 7:41:17 AM | 8 kb |
| whlstfl0.htm.txt | 1/8/2003 | 7:41:17 AM | 3 kb |

-continued

Directory of CD

| | | | | |
|---|---|---|---|---|
| whlstfl1.htm.txt | 1/8/2003 | 7:41:17 AM | 3 | kb |
| whlstfl10.htm.txt | 1/8/2003 | 7:41:17 AM | 2 | kb |
| whlstfl11.htm.txt | 1/8/2003 | 7:41:17 AM | 3 | kb |
| whlstfl12.htm.txt | 1/8/2003 | 7:41:17 AM | 2 | kb |
| whlstfl13.htm.txt | 1/8/2003 | 7:41:17 AM | 3 | kb |
| whlstfl14.htm.txt | 1/8/2003 | 7:41:17 AM | 3 | kb |
| whlstfl15.htm.txt | 1/8/2003 | 7:41:17 AM | 3 | kb |
| whlstfl16.htm.txt | 1/8/2003 | 7:41:17 AM | 3 | kb |
| whlstfl17.htm.txt | 1/8/2003 | 7:41:17 AM | 3 | kb |
| whlstfl18.htm.txt | 1/8/2003 | 7:41:17 AM | 2 | kb |
| whlstfl19.htm.txt | 1/8/2003 | 7:41:17 AM | 2 | kb |
| whlstfl2.htm.txt | 1/8/2003 | 7:41:17 AM | 3 | kb |
| whlstfl20.htm.txt | 1/8/2003 | 7:41:17 AM | 2 | kb |
| whlstfl21.htm.txt | 1/8/2003 | 7:41:17 AM | 2 | kb |
| whlstfl3.htm.txt | 1/8/2003 | 7:41:17 AM | 2 | kb |
| whlstfl4.htm.txt | 1/8/2003 | 7:41:17 AM | 3 | kb |
| whlstfl5.htm.txt | 1/8/2003 | 7:41:17 AM | 3 | kb |
| whlstfl6.htm.txt | 1/8/2003 | 7:41:17 AM | 3 | kb |
| whlstfl7.htm.txt | 1/8/2003 | 7:41:17 AM | 3 | kb |
| whlstfl8.htm.txt | 1/8/2003 | 7:41:17 AM | 3 | kb |
| whlstfl9.htm.txt | 1/8/2003 | 7:41:17 AM | 2 | kb |
| whlstg0.htm.txt | 1/8/2003 | 7:41:17 AM | 2 | kb |
| whlsti0.htm.txt | 1/8/2003 | 7:41:17 AM | 2 | kb |
| whlstt0.htm.txt | 1/8/2003 | 7:41:17 AM | 3 | kb |
| whlstt1.htm.txt | 1/8/2003 | 7:41:17 AM | 4 | kb |
| whlstt2.htm.txt | 1/8/2003 | 7:41:17 AM | 6 | kb |
| whlstt3.htm.txt | 1/8/2003 | 7:41:17 AM | 4 | kb |
| whlstt4.htm.txt | 1/8/2003 | 7:41:17 AM | 4 | kb |
| whlstt5.htm.txt | 1/8/2003 | 7:41:17 AM | 4 | kb |
| whnvf30.htm.txt | 1/8/2003 | 7:41:16 AM | 1 | kb |
| whnvf31.htm.txt | 1/8/2003 | 7:41:16 AM | 1 | kb |
| whnvf32.htm.txt | 1/8/2003 | 7:41:16 AM | 1 | kb |
| whnvt33.htm.txt | 1/8/2003 | 7:41:16 AM | 1 | kb |
| whnvl31.htm.txt | 1/8/2003 | 7:41:16 AM | 3 | kb |
| whnvl32.htm.txt | 1/8/2003 | 7:41:16 AM | 4 | kb |
| whnvl33.htm.txt | 1/8/2003 | 7:41:16 AM | 2 | kb |
| whnvp30.htm.txt | 6/24/2003 | 8:39:14 AM | 1 | kb |
| whnvp31.htm.txt | 1/8/2003 | 7:41:16 AM | 1 | kb |
| whnvp32.htm.txt | 1/8/2003 | 7:41:16 AM | 1 | kb |
| whnvp33.htm.txt | 1/8/2003 | 7:41:16 AM | 1 | kb |
| whnvt30.asp.txt | 6/24/2003 | 2:50:28 AM | 2 | kb |
| whnvt30.htm.txt | 6/16/2003 | 8:10:32 AM | 3 | kb |
| whnvt31.htm.txt | 1/8/2003 | 7:41:16 AM | 2 | kb |
| whnvt32.htm.txt | 1/8/2003 | 7:41:16 AM | 2 | kb |
| whnvt33.htm.txt | 1/8/2003 | 7:41:16 AM | 2 | kb |
| Folder listing of\SNS\SNSHelp\whxdata\ | | | | |
| whftdata0.xml.txt | 1/8/2003 | 7:41:17 AM | 2 | kb |
| whfts.xml.txt | 1/8/2003 | 7:41:16 AM | 1 | kb |
| whfwdata0.xml.txt | 1/8/2003 | 7:41:17 AM | 23 | kb |
| whglo.xml.txt | 1/8/2003 | 7:41:16 AM | 1 | kb |
| whidx.xml.txt | 1/8/2003 | 7:41:16 AM | 1 | kb |
| whtdata0.xml.txt | 6/20/2003 | 8:20:14 AM | 3 | kb |
| whtoc.xml.txt | 1/8/2003 | 7:41:16 AM | 1 | kb |
| Folder listing of\SNS\SnsProductionEfficiency\ | | | | |
| admin\ | 12/4/2003 | 10:25:56 AM | 17 | kb |
| css\ | 12/4/2003 | 10:25:49 AM | 1 | kb |
| calendar.asp.txt | 11/1/2002 | 9:57:04 AM | 6 | kb |
| ChartFile2.asp.txt | 7/5/2002 | 9:56:52 AM | 2 | kb |
| ChartFile2.cdl.txt | 2/17/2003 | 7:20:52 AM | 1 | kb |
| ChartFile2.html.txt | 2/17/2003 | 7:50:23 AM | 2 | kb |
| conn.inc.txt | 8/1/2003 | 7:08:22 AM | 1 | kb |
| Copy of productionefficiency.asp.txt | 9/24/2003 | 3:12:09 AM | 35 | kb |
| prodeffic.asp.txt | 2/14/2003 | 3:23:06 AM | 1 | kb |
| productionefficiency.asp.txt | 9/29/2003 | 2:19:04 AM | 35 | kb |
| productionefficiencynew.asp.txt | 8/1/2003 | 7:35:11 AM | 35 | kb |
| productionefficiencytest.asp.txt | 9/24/2003 | 2:50:58 AM | 37 | kb |
| productionefficiencytest2.asp.txt | 9/24/2003 | 6:00:52 AM | 34 | kb |
| ptincludes.asp.txt | 12/11/2002 | 5:48:35 AM | 1 | kb |
| Folder listing of\SNS\SnsProductionEfficiency\admin\ | | | | |

-continued

| Directory of CD | | | | |
|---|---|---|---|---|
| images\ | 12/4/2003 | 10:26:25 AM | 3 | kb |
| addyear.asp.txt | 2/24/2003 | 7:22:42 AM | 1 | kb |
| productionpotential.asp.txt | 3/4/2003 | 8:19:50 AM | 13 | kb |
| Folder listing of\SNS\SnsProductionEfficiency\admin\images\ | | | | |
| Folder listing of\SNS\SnsProductionEfficiency\css\ | | | | |
| calendar.css.txt | 4/11/2002 | 7:09:52 AM | 1 | kb |
| Folder listing of\SNS\SNSSubsurfaceModel\ | | | | |
| admin\ | 12/4/2003 | 10:28:11 AM | 68 | kb |
| css\ | 12/4/2003 | 10:28:18 AM | 1 | kb |
| ICA\ | 12/4/2003 | 10:28:32 AM | 4 | kb |
| images\ | 12/4/2003 | 10:27:46 AM | 47 | kb |
| assetchokemenu.css.txt | 6/28/2002 | 7:16:30 AM | 1 | kb |
| assetchokemenu.js.txt | 11/13/2002 | 3:28:00 AM | 4 | kb |
| calendar.asp.txt | 11/1/2002 | 9:57:06 AM | 6 | kb |
| cdmenu.asp.txt | 6/30/2003 | 12:54:36 AM | 2 | kb |
| conn.inc.txt | 5/25/2003 | 5:47:24 AM | 1 | kb |
| gadget.asp.txt | 5/19/2003 | 1:56:42 AM | 4 | kb |
| map.asp.txt | 5/25/2003 | 5:39:08 AM | 7 | kb |
| nominationmodel.asp.txt | 5/23/2003 | 3:21:58 PM | 11 | kb |
| notfound.asp.txt | 7/17/2002 | 9:32:50 AM | 1 | kb |
| ptincludes.asp.txt | 12/11/2002 | 3:53:49 AM | 1 | kb |
| toolbar.asp.txt | 5/19/2003 | 3:13:32 AM | 7 | kb |
| welllife.asp.txt | 6/30/2003 | 12:55:35 AM | 5 | kb |
| wellmodel.asp.txt | 5/23/2003 | 5:00:08 PM | 9 | kb |
| Folder listing of\SNS\SNSSubsurfaceModel\admin\ | | | | |
| a_map_location_apply.asp.txt | 7/18/2002 | 2:18:32 AM | 1 | kb |
| addmodel.asp.txt | 8/14/2002 | 1:11:22 AM | 6 | kb |
| addobject.asp.txt | 8/14/2002 | 1:11:36 AM | 7 | kb |
| addobjecttype.asp.txt | 8/14/2002 | 1:12:16 AM | 4 | kb |
| adminprefs.asp.txt | 3/7/2003 | 9:54:20 AM | 6 | kb |
| default.asp.txt | 3/7/2003 | 9:45:28 AM | 1 | kb |
| delmodel.asp.txt | 8/14/2002 | 1:15:20 AM | 3 | kb |
| delobject.asp.txt | 8/14/2002 | 1:17:02 AM | 4 | kb |
| delobjecttype.asp.txt | 8/14/2002 | 1:15:30 AM | 3 | kb |
| editmodel.asp.txt | 8/14/2002 | 1:15:08 AM | 5 | kb |
| editobject.asp.txt | 8/14/2002 | 1:11:54 AM | 8 | kb |
| editobjecttype.asp.txt | 8/14/2002 | 1:12:06 AM | 4 | kb |
| list.asp.txt | 3/7/2003 | 9:25:18 AM | | kb |
| maintainmodels.asp.txt | 8/14/2002 | 1:11:06 AM | 3 | kb |
| maintainobjects.asp.txt | 8/14/2002 | 1:15:44 AM | 4 | kb |
| maintainobjecttypes.asp.txt | 8/14/2002 | 1:15:54 AM | 3 | kb |
| map_adminroutines.js.txt | 7/3/2002 | 7:20:12 AM | 5 | kb |
| ptincludes.asp.txt | 8/14/2002 | 5:16:40 AM | 1 | kb |
| Folder listing of\SNS\SNSSubsurfaceModel\css\ | | | | |
| calendar.css.txt | 4/11/2002 | 7:09:52 AM | 1 | kb |
| Folder listing of\SNS\SNSSubsurfaceModel\ICA\ | | | | |
| casing_seat.ica.txt | 6/27/2003 | 2:40:04 AM | 1 | kb |
| compass.ica.txt | 6/27/2003 | 2:40:56 AM | 1 | kb |
| dims.ica.txt | 6/26/2003 | 6:49:52 AM | 1 | kb |
| dss.ica.txt | 6/26/2003 | 6:50:20 AM | 1 | kb |
| profile.ica.txt | 6/26/2003 | 6:51:00AM | 1 | kb |
| stresscheck.ica.txt | 6/27/2003 | 2:41:24 AM | 1 | kb |
| towcs_prod_accounting.ica.txt | 6/27/2003 | 2:44:36 AM | 1 | kb |
| wellplan.ica.txt | 6/25/2003 | 8:15:38 AM | 1 | kb |
| Folder listing of\SNS\SNSSubsurfaceModel\images\ | | | | |
| css\ | 12/4/2003 | 10:27:30 AM | 1 | kb |
| Folder listing of\SNS\SNSSubsurfaceModel\images\css\ | | | | |
| calendar.css.txt | 9/5/2002 | 2:17:10 AM | 1 | kb |
| Folder listing of\SNS\SNSTelephoneList\ | | | | |
| addcontact.asp.txt | 8/14/2002 | 4:43:35 AM | 4 | kb |
| commprefs.asp.txt | 8/13/2002 | 5:19:40 AM | 5 | kb |
| conn.inc.txt | 8/14/2002 | 5:12:35 AM | 1 | kb |
| deletecontact.asp.txt | 8/14/2002 | 4:45:16 AM | 1 | kb |
| editcontact.asp.txt | 8/14/2002 | 5:01:21 AM | 5 | kb |
| gadget.asp.txt | 8/13/2002 | 5:01:18 AM | 1 | kb |
| ptincludes.asp.txt | 8/14/2002 | 5:16:38 AM | 1 | kb |
| search.asp.txt | 8/13/2002 | 5:10:40 AM | 5 | kb |
| Folder listing of\SNS\SNSWellStatusTicker\ | | | | |

-continued

| Directory of CD | | | | |
|---|---|---|---|---|
| admin\ | 12/4/2003 | 10:30:06 AM | 67 | kb |
| conn.inc.txt | 10/29/2002 | 10:08:24 AM | 1 | kb |
| default.asp.txt | 12/11/2002 | 4:18:12 AM | 10 | kb |
| default2.asp.txt | 12/11/2002 | 4:26:48 AM | 10 | kb |
| gadget.asp.txt | 7/11/2002 | 5:19:35 AM | 1 | kb |
| ptincludes.asp.txt | 12/12/2002 | 5:57:51 AM | 1 | kb |
| Folder listing of\SNS\ | | | | |
| SNSWellStatusTicker\admin\ | | | | |
| addfield.asp.txt | 12/11/2002 | 4:25:52 AM | 3 | kb |
| addmodel.asp.txt | 12/11/2002 | 4:27:16 AM | 6 | kb |
| addsat.asp.txt | 12/11/2002 | 4:30:25 AM | 4 | kb |
| addwell.asp.txt | 12/11/2002 | 4:38:23 AM | 6 | kb |
| adminprefs.asp.txt | 12/11/2002 | 4:41:27 AM | 5 | kb |
| delfield.asp.txt | 12/11/2002 | 4:49:14 AM | 4 | kb |
| delmodel.asp.txt | 12/11/2002 | 4:50:25 AM | 4 | kb |
| delsat.asp.txt | 12/11/2002 | 5:05:08 AM | 4 | kb |
| delwell.asp.txt | 12/11/2002 | 5:18:09 AM | 6 | kb |
| editfield.asp.txt | 12/11/2002 | 5:20:34 AM | 3 | kb |
| editsat.asp.txt | 12/11/2002 | 5:22:18 AM | 4 | kb |
| editwell.asp.txt | 12/11/2002 | 5:24:41 AM | 6 | kb |
| maintainfields.asp.txt | 7/25/2002 | 6:25:22 AM | 3 | kb |
| maintainsatellites.asp.txt | 7/26/2002 | 2:00:43 AM | 5 | kb |
| maintainwells.asp.txt | 7/26/2002 | 2:53:01 AM | 5 | kb |
| Folder listing of\SNS\ | | | | |
| ValueOpportunityRegister\ | | | | |
| 0001.asp.txt | 8/13/2003 | 4:16:45 PM | 4 | kb |
| 0002.asp.txt | 8/14/2003 | 10:32:10 AM | 3 | kb |
| 0003.asp.txt | 8/13/2003 | 1:53:17 PM | 3 | kb |
| 0004.asp.txt | 8/14/2003 | 10:36:36 AM | 3 | kb |
| 0005.asp.txt | 8/14/2003 | 10:14:53 AM | 3 | kb |
| 0006.asp.txt | 8/13/2003 | 5:12:57 PM | 3 | kb |
| gadget.asp.txt | 8/13/2003 | 3:30:12 PM | 1 | kb |
| register.asp.txt | 8/19/2003 | 3:04:07 AM | 5 | kb |

BACKGROUND

This invention relates to an apparatus, method and system facilitating decision-making in connection with the management of assets, and more particularly to real time operations and maintenance decisions in connection with assets, such as, for example, petroleum and/or petrochemical production facilities.

SUMMARY OF THE INVENTION

Apparatus for real time production process asset management, access portal based systems for facilitating decision-making in connection with management of enterprise assets, methods of real time process asset management, and methods of real time performance management are disclosed. The invention enables: real time decision making information delivery to the functional teams that support an asset; a line of sight management performance model to facilitate the visibility and clarity of team performance; practical performance analysis tools that extract information in real time from the process control system and other sources of asset data for translation into actionable information; and a real time interactive schematic environment.

In one embodiment, the present invention provides an apparatus for real time process asset management. The apparatus includes a distributed control system to receive readings from facility sensor devices and transmit control signals to actuated elements to monitor and control the process, and a process parameter data historical database interfaced with the distributed control system. An expert system is interfaced with the historical database to generate expert status and trend reports on uptime, production status, production loss, equipment loss, equipment performance, or any combination thereof. An access portal, such as an Internet or web-based portal, for example, is provided for displaying the expert trend reports to a user. A work management system is provided to schedule a corrective work procedure to equipment or system of the production process in response to a request to resolve a production loss from the access portal. The expert system can include logic rules or algorithms for generating expert reports such as alerts. The apparatus can include a knowledge capture tool to update failure logic rules in the expert system. A telecommunication device can be linked to the expert system to transmit the expert alerts or other reports to a remote user. The access portal can include a graphical user interface to display the expert reports and to input requests to resolve the expert alerts or other reports.

Another embodiment of the invention is an apparatus for real time process asset management. The apparatus includes a distributed control system to receive readings from facility sensor devices and transmit control signals to actuated elements to monitor and control the process, and a process parameter data historical database interfaced with the distributed control system. An expert system is interfaced with the historical database to generate and transmit expert status reports to a user interface device, and expert trend reports to a user via an access portal. A work management system is provided to schedule a corrective work procedure to equipment or system of the process in response to a request to resolve production loss via the access portal. The expert system can include calculation instructions and logic algorithms to report statistical data selected from the group consisting of uptime, production status, production loss, equipment loss, equipment performance, and the like, or any combination thereof. The user interface device can include telecommunication equipment. The expert system is desirably linked to one or more input devices for real time data selected from the group consisting of engineering analysis, operations loss, process capacities, and the like, and combinations thereof. The engineering analysis data can include equipment and system performance data. A process simulation model can be linked to the expert system for the process capacities data. A reservoir simulation model can be linked to the expert system to provide reservoir capacities data. The access portal can include a graphical user interface to display the expert trend reports and to input the requests to resolve production losses.

Another embodiment of the invention includes apparatus for real time process asset management. The apparatus can include a distributed control system to receive readings from facility sensor devices and transmit control signals to actuated elements to monitor and control the process, and a process parameter data historical database interfaced with the distributed control system. An expert system is interfaced with the historical database to generate and transmit process variance reports to a user interface device, and optimization opportunity reports to an access portal. A work management system is provided to schedule an optimization procedure to equipment or system of the process in response to a request to adjust an operating parameter sent via the access portal. The expert system can include logic rules or algorithms for process or production optimization. A process simulation model can be interfaced with the expert system for updating the expert system with simulation data. The apparatus can include an input device for process engineering model data and configuration information to adjust the process simulation model, production optimization logic rules or algorithms in the expert system, and the like, or a combination thereof. The apparatus can additionally include an input device for process engineering model data and configuration information to adjust logic rules and algorithms in the expert system. The user interface device can include telecommunication equipment.

Another embodiment provides a system for facilitating decision-making in connection with management of enterprise assets. The system includes a real time expert decision support module, an access portal for user access to the real time expert decision support module, and a navigation table accessible via the access portal providing a clear line of sight through the enterprise. The navigation table can include a first dimension of grouping attributes comprising planning, actions, and results, and a second dimension of grouping attributes can comprise people, equipment, and cost, for the purpose of grouping access to tools associated with the support module. The planning group can provide access to maintenance tactics and strategy tools, the actions group to defect elimination and loss prevention tools, and the results group to facilities, maintenance, and production performance tools, and the like. The navigation table can include access to an operations knowledge capture tool. The operations knowledge capture tool can include a database of information collated on process equipment items and respective recorded system defects, containing engineering and operational experiences of causes and effects of the system defects. The operations knowledge capture tool can include a database filter based upon a selective combination of two or more of system, manufacturer, sub-system, and defect. The recorded systems defect data can include symptoms, severity, consequence, detection mechanism, and the like, or any combination thereof. It is desirable that the recorded systems defect data also include data selected from the group consisting of defect occurrence frequency, logic rule frequency, rules, recommended remedial actions, report recipient, miscellaneous comments, and the like, and any combination thereof. The operations knowledge capture tool is can be associated with an updating tool to populate the database with data selected from the group consisting of shutdown incident report data, vendor data, expert knowledge, and the like, and combinations thereof.

The navigation table can also include access to a shutdown incident report register tool, including access to information from shutdown incident reports selected from the group consisting of report number, time back, functional responsibility, date raised, product lost, fault found, loss category, cost, corrective action, sent to, cause category, asset focal point, source location, independent service contractor loss, outstanding action, maintenance work request, time down, responsible asset, review process, explanation of problem, explanation of event, close out, and the like, and any combination thereof. The shutdown incident report register tool can alternatively or additionally provide access to tools selected from the group consisting of administration, shutdown incident report generation, root cause analysis, maintenance strategy, planned maintenance routines, technical changes, report generator, and the like, and any combination thereof. The shutdown incident report templates can be defined via the administration tool. The shutdown incident report generation tool can be operable to generate a shutdown incident report including data selected from the group consisting of person generating, person sent, loss category, independent service contractor loss, cause category, responsible asset, explanation of event, source location, time down, and the like, and any combination thereof. The root cause analysis tool can be operable to generate a shutdown incident report including data selected from the group consisting of date raised, focal person, execute root-cause-analysis-preventive-corrective-maintenance (RCA-PCM) date, recommended corrective action, actions completion date, cost benefit analysis, approval or rejection date, planned execution details, implementation date, close out date, and the like, and any combination thereof. The maintenance strategy tool can be operable to generate a shutdown incident report including data selected from the group consisting of date raised, execute root cause analysis and preventative care maintenance date, strategy number, action completed date, cost benefit analysis, execution planned date, execution implemented date, close out date, and the like, and any combination thereof. The maintenance routines tool can be operable to generate a shutdown incident report including data from the group consisting of date raised, execute root cause analysis and preventative care maintenance date, strategy number, action completed date, cost benefit analysis, execution planned date, execution implemented date, close out date, and the like, and any combination thereof. The technical changes tool can be operable to generate a shutdown incident report including data selected from the group consisting of date raised, execute root cause analysis and preventative care maintenance date, strategy number, action completed date, cost benefit analysis, execution planned date, execution implemented date, close out date, and the like, and any combination thereof. The report generation tool can be operable to generate a report including data selected from the group consisting of total asset shutdown performance, downtime by cause categories for source locations date range, downtime by source locations date range, downtime by loss category for responsible asset date range, production loss by functional responsibility date range, recurring events date range, shutdown incident report date range, issues report date range, and the like, and any combination thereof.

The people grouping can include tools selected from the group consisting of preventative maintenance workload, history and plan, maintenance supply and demand, critical actions register, idea database, action log, preventative maintenance compliance, ratio of preventative maintenance to corrective maintenance work, productivity, corrective performance, man hours expended, total maintenance backlog, completion of defect elimination action, and the like, and any combination thereof. The equipment grouping can include tools selected from the group consisting of operations knowledge capture, real time influence diagram, criticality assessment, RAM simulation potential, equipment strategy matrix, equipment database, equipment performance, critical equipment status, crane status, shutdown incident register, shutdown incident reports, asset performance metrics, top failures by cause, top failures by location, and the like, and any combination thereof. The cost grouping can include tools selected from the group consisting of maintenance budget, maintenance key performance indicators, maintenance budget control process, total maintenance costs, maintenance budget tracking, corrective maintenance costs, maintenance key performance indicators tracking, and the like, and any combination thereof.

The access portal of the system can include a home page with access to tools selected from the group consisting of asset performance metrics, leadership team, maintenance, supply chain management, planning, well operation, human resources, emergency response, field team, facilities, engineering and construction, and the like, and any combination thereof. The access portal can include a display geographically representative of a production process, and can also include an asset performance tool. The asset performance tool can be operable to provide real time asset statistical data selected from the group consisting of production rate, deferment, uptime, availability, and the like, and any combination thereof. The asset performance tool can be operable to access tools selected from the group of infrastructure overview, choke model, status, traffic light system, production performance, expert system, satellite overview, shutdown incident report, compressor envelope, uptime and availability, loss summary, and the like, and any combination thereof. The infrastructure overview tool can generate a pictorial overview of the respective assets for a selected field of production process assets. The choke model tool can report flow of production along a supply chain. The status tool can report real-time status of an asset. The traffic light system can display availability and efficiency of an asset. The production performance tool can display the potential and actual production performance of the selected complex. The expert system tool can display defect alarms and recommended actions. The satellite overview tool can display production flow rate over time.

The shutdown incident report tool of the system can provide access to tools selected from the group consisting of administration, shutdown incident report generation, root cause analysis, maintenance strategy, planned maintenance routines, technical changes, report generator, and the like, and any combination thereof. The compressor envelope tool can display compressor status performance and envelope map showing current operating points on the map. The uptime and availability tool can display uptime and availability of an asset expressed as a percentage over a user selected period. The loss summary tool is operable to generate a summary of shutdown incident report information with respect to production losses for a selected asset and detail losses attributable to an independent service contractor and deferred production for the asset.

Another embodiment of the invention is a method of real time process asset management. The method includes the steps of: (a) operating a production process with a distributed control system for receiving readings from facility sensor devices and transmitting control signals to actuated elements to monitor and control the production process; (b) interfacing the distributed control system with a process parameter data historical database; (c) exchanging process data between the historical database and an expert system for generating expert alerts to notify a user of alert status; (d) transmitting instructions to the distributed control system for initiating an automated corrective action in response to one or more of the expert alerts; (e) updating failure logic rules in the expert system; (f) transmitting a corrective action request to a work management system in response to one or more of the expert alerts; (g) performing a corrective work procedure on equipment or system of the process in response to the corrective action request; and (h) repeating steps (a) through (g) on a real time basis. The expert system can include logic rules and algorithms for generating the expert alerts. Updating the failure logic rules can include capturing knowledge from failure analysis. One or more of the expert alerts can include remote user notification via a telecommunication device. One or more of the expert alerts can include notification via an access portal graphical user interface. The transmission of the corrective action request to the work management system can include generating a request to resolve one or more of the expert alerts via the access portal.

In another embodiment, the present invention provides a method of real time process asset management, including the steps of: (a) operating a process with a distributed control system for receiving readings from facility sensor devices and transmitting control signals to actuated elements to monitor and control the process; (b) interfacing the distributed control system with a process parameter data historical database; (c) exchanging process data between the historical database and an expert system for generating expert status and trend reports on uptime, production status, production loss, equipment loss, equipment performance, or the like, or any combination thereof; (d) updating equipment, system, operations loss, and process capacity data in the expert system; (e) transmitting a corrective action request to a work management system in response to one or more of the expert reports; (f) performing a corrective work procedure to equipment or system of the production process in response to the corrective action request; and (g) repeating steps (a) through (f) on a real time basis. The expert system can include calculation instructions and logic algorithms for generating the expert reports. The updated data in the expert system can include engineering analysis, production loss reporting, simulation model output, and the like, or a combination thereof. The method can include delivery of the expert reports to a remote user via a telecommunication device. The method can also include display of one or more of the expert reports in a line of sight format via an access portal graphical user interface. The method can additionally include sending a request to resolve production loss via the access portal to a workflow engine for root cause analysis, issue resolution, and the like, or a combination thereof, to generate the corrective action request to the work management system.

Another embodiment of the invention is a method of real time process asset management, including the steps of: (a) operating a process with a distributed control system for receiving readings from facility sensor devices and transmitting control signals to actuated elements to monitor and control the production process; (b) interfacing the distributed control system with a process parameter data historical database; (c) exchanging process data between the historical database and an expert system for generating expert reports to notify a user of report status; (d) transmitting instructions to the distributed control system for initiating an automated corrective action in response to one or more of the expert reports; (e) updating logic rules for process optimization in the expert system; (f) transmitting an optimization action request to a work management system in response to one or more of the expert reports; (g) performing an optimization procedure to equipment or system of the production process in response to the optimization action request; and (h) repeating (a) through (g) on a real time basis. The expert system can include logic rules or algorithms for process or production optimization. The method can also include exchanging simulation data between the expert system and a process simulation model. Additionally, the method can include adjusting processing parameters between the process simulation model and process engineering model data. The method can also include adjusting optimization parameters between the expert system and the process engineering model data. One or more of the expert reports can include production variance data. The production variance data can be transmitted to a remote user via a telecommunication device. The one or more of the expert reports can include optimization opportunities. The optimization opportunities can be transmitted to a user via an access portal graphical user interface. The transmission of the optimization action request to the work management system can include generating a request to adjust operating parameters via the access portal.

A further embodiment is a method of real time performance management, including the steps of: (a) interfacing an enterprise system database with one or more functional system databases and a user interface; (b) exchanging data between the enterprise system database and an expert system for calculating performance metrics of the enterprise functions; (c) exchanging data between the expert system and the one or more functional databases; (d) building a functional group performance model for use by the expert system; (e) sending status reports from the expert system to a user; (f) displaying a trend reports via a line of sight access portal graphical user interface; (g) transmitting a request to resolve function group performance issues via the access portal to a workflow engine for the respective functional group; (h) sending a corrective action request from the workflow engine to a work management system; and (i) repeating (a) through (h) on a real time basis.

The expert system can include logic rules and algorithms for generating the expert reports. The logic rules updating step can include capturing knowledge from functional group performance. One or more of the expert reports can include remote user notification via a telecommunication device, and additionally or alternately notification via an access portal graphical user interface.

The access portal can include a navigation table comprising a first dimension of grouping attributes comprising planning, actions, and results, and a second dimension of grouping attributes comprising people, equipment, and cost, for the purpose of grouping access to tools associated with the support module. The planning group can provide access to maintenance tactics and strategy tools, the actions group to defect elimination and loss prevention tools, and the results group to facilities, maintenance, and production performance tools.

The navigation table can include access to an operations knowledge capture tool, which can include a database of information collated on process equipment items and respective recorded system defects, containing engineering and operational experiences of causes and effects of the system defects, and the like. The operations knowledge capture tool can include a database filter based upon a selective combination of two or more of system, manufacturer, sub-system, and defect. The recorded systems defect data can include symptoms, severity, consequence, detection mechanism, and the like, or any combination thereof, and can additionally or alternately include data selected from the group consisting of defect occurrence frequency, logic rule frequency, rules, recommended remedial actions, report recipient, miscellaneous comments, and any combination thereof. The method can further include using an updating tool associated with the operations knowledge capture tool to populate the enterprise database with data selected from the group consisting of shutdown incident report data, vendor data, expert knowledge, and the like, and combinations thereof.

The navigation table in the method can also include access to a shutdown incident report register tool. The shutdown incident report register tool can include access to information from shutdown incident reports selected from the group consisting of report number, time back, functional responsibility, date raised, product lost, fault found, loss category, cost, corrective action, sent to, cause category, asset focal point, source location, independent service contractor loss, outstanding action, maintenance work request, time down, responsible asset, review process, explanation of problem, explanation of event, close out, and the like, and any combination thereof. The shutdown incident report register tool can provide access to tools selected from the group consisting of administration, shutdown incident report generation, root cause analysis, maintenance strategy, planned maintenance routines, technical changes, report generator, and the like, and any combination thereof. The method can also include the step of defining shutdown incident report templates via the administration tool. The method can include operating the shutdown incident report generation tool to generate a shutdown incident report including data selected from the group consisting of person generating, person sent, loss category, independent service contractor loss, cause category, responsible asset, explanation of event, source location, time down, and the like, and any combination thereof. The method can include operating the root cause analysis tool to generate a shutdown incident report including data selected from the group consisting of date raised, focal person, execute root-cause-analysis-preventive-corrective-maintenance (RCA-PCM) date, recommended corrective action, actions completion date, cost benefit analysis, approval or rejection date, planned execution details, implementation date, close out date, and any combination thereof. The method can further include operating the maintenance strategy tool to generate a shutdown incident report including data selected from the group consisting of date raised, execute root cause analysis and preventative care maintenance date, strategy number, action completed date, cost benefit analysis, execution planned date, execution implemented date, close out date, and the like, and any combination thereof. The method can include operating the maintenance routines tool to generate a shutdown incident report including data from the group consisting of date raised, execute root cause analysis and preventative care maintenance date, strategy number, action completed date, cost benefit analysis, execution planned date, execution implemented date, close out date, and the like, and any combination thereof. The method can also include operating the technical changes tool to generate a shutdown incident report including data from the group consisting of date raised, execute root cause analysis and preventative care maintenance date, strategy number, action completed date, cost benefit analysis, execution planned date, execution implemented date, close out date, and the like, and any combination thereof.

The method can also include operating the report generation tool to generate a report including data from the group consisting of total asset shutdown performance, downtime by cause categories for source locations date range, downtime by source locations date range, downtime by loss category for responsible asset date range, production loss by functional responsibility date range, recurring events date range, shutdown incident report date range, issues report date range, and the like, and any combination thereof.

The people grouping can include tools selected from the group consisting of preventative maintenance workload, history and plan, maintenance supply and demand, critical actions register, idea database, action log, preventative maintenance compliance, ratio of preventative maintenance to corrective maintenance work, productivity, corrective performance, man hours expended, total maintenance backlog, completion of defect elimination action, and the like and any combination thereof. The equipment grouping can include tools selected from the group consisting of operations knowledge capture, real time influence diagram, criticality assessment, RAM simulation potential, equipment strategy matrix, equipment database, equipment performance, critical equipment status, crane status, shutdown incident register, shutdown incident reports, asset performance metrics, top failures by cause, top failures by location, and the like, and any combination thereof. The cost grouping can include tools selected from the group consisting of maintenance budget, maintenance key performance indicators, maintenance budget control process, total maintenance costs, maintenance budget tracking, corrective maintenance costs, maintenance key performance indicators tracking, and the like, and any combination thereof.

The method can also include accessing, via a home page of the access portal, tools selected from the group of asset performance metrics, leadership team, maintenance, supply chain management, planning, well operation, human resources, emergency response, field team, facilities, engineering and construction, and the like, and any combination thereof. The method can include displaying a geographical representation of the process on the access portal.

The access portal can include an asset performance tool. The method can also include providing real time asset statistical data selected from the group of production rate, deferment, uptime, availability, and the like, and any combination thereof, via the asset performance tool. The method can also include operating the asset performance tool to access tools selected from the group of infrastructure overview, choke model, status, traffic light, production performance, expert, satellite overview, shutdown incident report, compressor envelope, uptime and availability, loss summary, and the like, and any combination thereof.

The method can include operating the infrastructure overview tool to generate a pictorial overview of the respective asset for a selected production process area, the choke model tool to generate the flow of production along a supply chain, the status tool to generate real-time status of an asset, the traffic light tool to generate availability and efficiency of an asset, the production performance tool to generate the potential and actual production performance of a selected production process area, and/or the satellite overview tool to report production flow rate over time. The method can include generating defect alarms and recommended actions via the expert tool. The shutdown incident report tool can provide access to tools selected from the group consisting of administration, shutdown incident report generation, root cause analysis, maintenance strategy, planned maintenance routines, technical changes, report generator, and the like, and any combination thereof. The method can include operating the compressor envelope tool to generate a compressor status performance and envelope map showing a current operating point on the map, operating the uptime and availability tool to generate the uptime and availability of an asset expressed as a percentage over a user selected period, and/or operating the loss summary tool to generate a summary of shutdown incident report information with respect to production losses for a selected asset and detail losses attributable to an independent service contractor and deferred production for the respective asset. The transmission of the corrective action request to the work management system can include generating a request to resolve one or more of the expert alerts via the access portal.

BRIEF DESCRIPTION OF THE DRAWINGS

FIG. 2 is a chart of typical sources and uses of data according to an embodiment of the invention.

FIG. 6 is one example of the knowledge capture display according to an embodiment of the invention.

FIG. 7 is a display screen for an example of the operations decision support portal that integrates the operations support functions and processes according to an embodiment of the invention.

FIG. 11 is a display screen for an example of a web-enabled system for manually recording loss causation through a shutdown incident reporting process.

FIG. 13 is a display screen illustrating an example of compression performance in terms of real time process data against compressor operating envelopes.

DETAILED DESCRIPTION OF THE INVENTION

Figure 1:
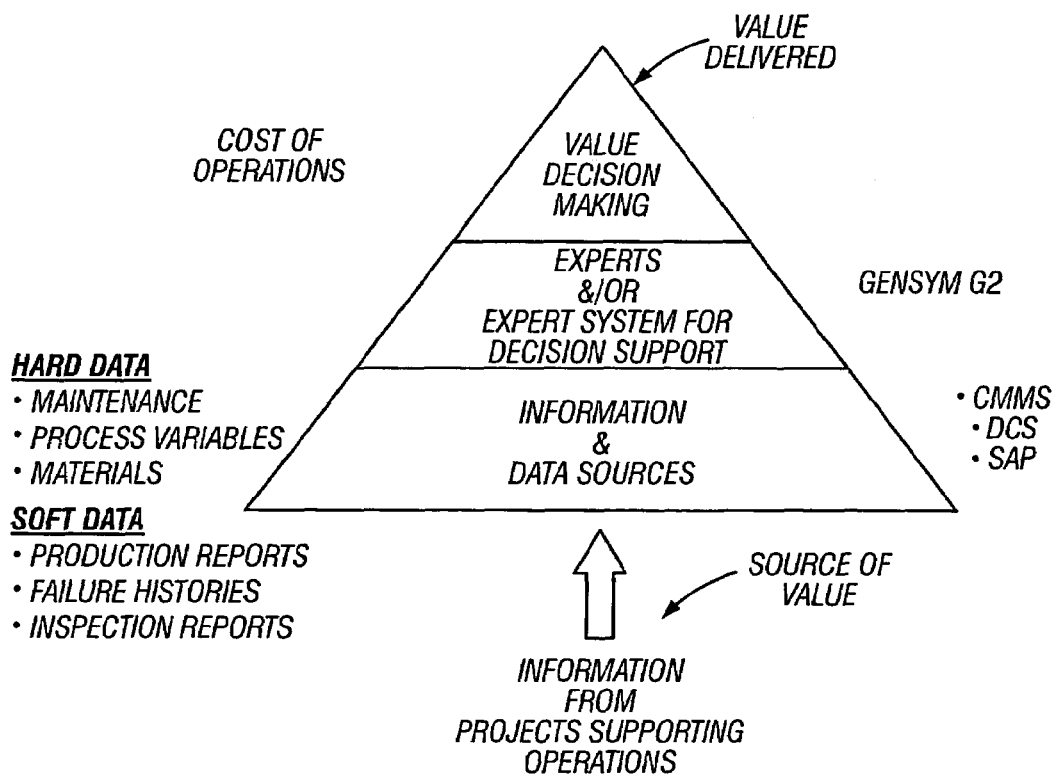
FIG. 1 is a schematic diagram showing one relationship between the source and delivery of value in the context of the present invention.

The real time operations support provided in one embodiment comprises a portal-based decision support process, knowledge management and asset performance monitoring system for the effective operations and maintenance of an asset. The system facilitates a line of sight through an organization, from the asset performance goals to the actions that deliver them at various levels and across various functions within the organization. It is desirable that the levels and functions are substantially or essentially comprehensive. The system provides for the analysis and display of performance metrics and supporting actions by personnel with the appropriate access profile, thereby providing the production process for an operation to be readily viewed and managed.

In one embodiment, the system comprises an integrated asset operation and maintenance management process, which can be delivered "real time" through an access portal technology medium. Non-limiting examples of an access portal medium can include: a "web" portal, such as one utilizing the Internet or an intranet; wired or wireless telecommunications technology; public, private or personal communication systems; and the like. In the present application the term "web portal" will mean an access portal into or within the invention and is not limited to only an Internet type of access portal unless specified.

An "asset" includes any production, processing, transportation or manufacturing facility in the industries selected from: oil and gas; petrochemical and refining; power utilities; pulp and paper; commercial and specialty chemicals; and the like. The asset has sources of data that are used to effectively describe the performance of the asset in terms of cost, throughput, uptime, energy efficiency, product quality, operational conditions and the like. A non-limiting list of sources of data can include control systems, operational parameter readings (manual, electronic, pneumatic, etc.) or databases associated with enterprise management systems. In the prior art, these data sources were invariably used independently and not brought into one common system or grouping of systems in order to view, monitor and/or evaluate the performance of the assets, as well as the functional groups that support the assets.

In one embodiment the present invention provides real time operations support analysis algorithms and data extraction processes that leverage the reservoir of data that exists in production facility supervisory control systems and client enterprise management systems. These applications can extract key performance information, including production loss or deferment, and loss causation information, as well as equipment uptime performance. The extraction and presentation of these performance metrics facilitates improved decision-making within operations and maintenance support teams. Real time asset performance information gathered from control systems and other information sources can be brought together in the line of sight management system, which can be designed to be the operations and maintenance support control panel or dashboard. The access portal technology enables a real time access medium for production and maintenance management information. The benefits that the present invention provides to a support organization include the capability for focusing support team efforts on value-based decisions and the measurement of their alignment with asset goals. Asset performance can be viewed from any authorized workstation with access, thereby enabling subject matter experts to support operations, regardless of their physical location.

The present invention can provide significant value to an operation, especially with the engagement of local operations and maintenance teams associated with the asset. Embodiments of the present invention can provide, in some cases, as much as 30 percent in cost reductions through reduced operating and maintenance staff needs as well as reduced equipment repair expenses. Uptime improvements of, for example, 3 to 8 percent can be achieved, depending on the reliability of the operation.

Another aspect of the invention includes a "clear line of sight" of operating performance in terms of uptime, availability and cost on a real time basis throughout the organization from senior management to workfront levels and across various functions. Within the present application the term "clear line of sight" shall mean the ability of various personnel within an organization to view, with proper access and authorization, operations and maintenance data, status reports and other information relating to an asset. Significant value can be realized by each function in the support organization that can observe and measure their performance on a real time basis. The alignment and clear line of sight through an organization provided by the invention can deliver a reduction in the level of resources required to provide the support function and at the same time can improve the work product. A fully aligned organization is one that applies the right resource, at the right time to the point of need for an operation, and has high efficiency.

The present invention can provide the distinct benefits of showing the relationships between cross-functions that support an asset and building a clear picture of how the organization can align actions to goals. The line of sight model enables each support function group to measure its performance to suit the overall business goals and introduces significant rigor to the process.

The present invention provides the ability to significantly improve the performance of an operating facility by having access to performance information that drives effective facility improvements. The system can push information to the user, as opposed to an information pull by the user, so that time is not wasted searching for the information needed for decisions. Effective asset optimization can be facilitated from a presentation format that is not traditionally available.

With the present invention, the capture of knowledge of asset operation from operating and maintenance staff can facilitate the retention of enterprise operating knowledge. The value this can deliver is multifold and may include the opportunity to reduce the number of operating staff because the operations and maintenance knowledge base is accessible to personnel and systems throughout the organization, such as, an expert in a particular field or an embedded "expert" built within the operating system. Another value is the matching of an understanding of the failure potential with the delivery of mitigation measures to prevent recurrences. This is particularly the case in maintenance and operating related knowledge that might be held in memory by enterprise or operations personnel in the prior, art methodologies, but is not more permanently captured for future use.

The present invention can provide more consistent operations through the use of expert systems that employ captured knowledge and technical experts embedded in control systems. By capturing knowledge from mature operators and facility personnel and then combining it with process technical knowledge, the present invention facilitates retention of operational and asset process knowledge and consistent application over the life of the asset.

The present invention provides defect-elimination processes and tools to reduce corrective maintenance work activity and associated costs. The preventative maintenance decisions facilitated by the present invention can focus both technical and operating resources to reduce production losses and deferments. These can be reflected in the revenues from improved production volumes. Cost improvements can also be realized through improved equipment life and lower maintenance needs. Use of real time loss and cost information can often justify asset improvements more effectively and enhance performance.

The present invention can optimize maintenance activity for proactive and planned maintenance. The expert systems provide intelligence on equipment and system condition to generate maintenance activity by condition, in addition to any strictly calendar-based maintenance activity. The use of condition-based mechanical integrity analysis can reduce equipment inspection costs, equipment failure incidents, and the associated business and personnel risks.

The present invention facilitates the following implementation mechanisms and returns: (1) it can be differentiated from other asset management systems for large engineering and maintenance support projects that are based on long term asset performance; (2) significant front end activity and conceptual studies associated with projects for improving asset and enterprise operations can be enhanced by the use of supervisory control systems information; (3) it can deliver focused business improvement for support functions in enterprise operations; (4) it provides a system that can be serviced and improved by maintenance experts; (5) it provides the ability to feed equipment reliability and performance knowledge into new facility and process designs to deliver more reliable projects; (6) it can be included as part of an engineering, procurement and construction project for a new asset, or as a retrofit for existing assets; and (7) it can provide a benchmarking database of equipment performance knowledge for use in requests for proposals, project bids, or for use by a third party.

A significant reservoir of data exists for operating assets and facilities across industries including for example, oil and gas, petrochemical and refining, power generation and utilities, pulp and paper, commercial and specialty chemicals, and the like. These industries are hereinafter referred to as "process industries" or "production process industries," and the operating assets and facilities as "process assets" or "production process assets." The key objectives and focuses of one embodiment of the invention include the knowledge-based extraction of information from several disparate sources and the transformation into actionable information across functional groups that support an asset, process, or manufacturing plant or facility, as shown in FIG. 1.

Typical sources of data that are available within an operation and the potential use of that data information delivery according to an embodiment of the invention are shown in FIG. 2. Data information comes in various types with different values and applications for each type of data. The needs necessary to make each decision regarding a piece of data also vary. Real time operations also vary depending upon the type of data and its value and application.

Figure 3:
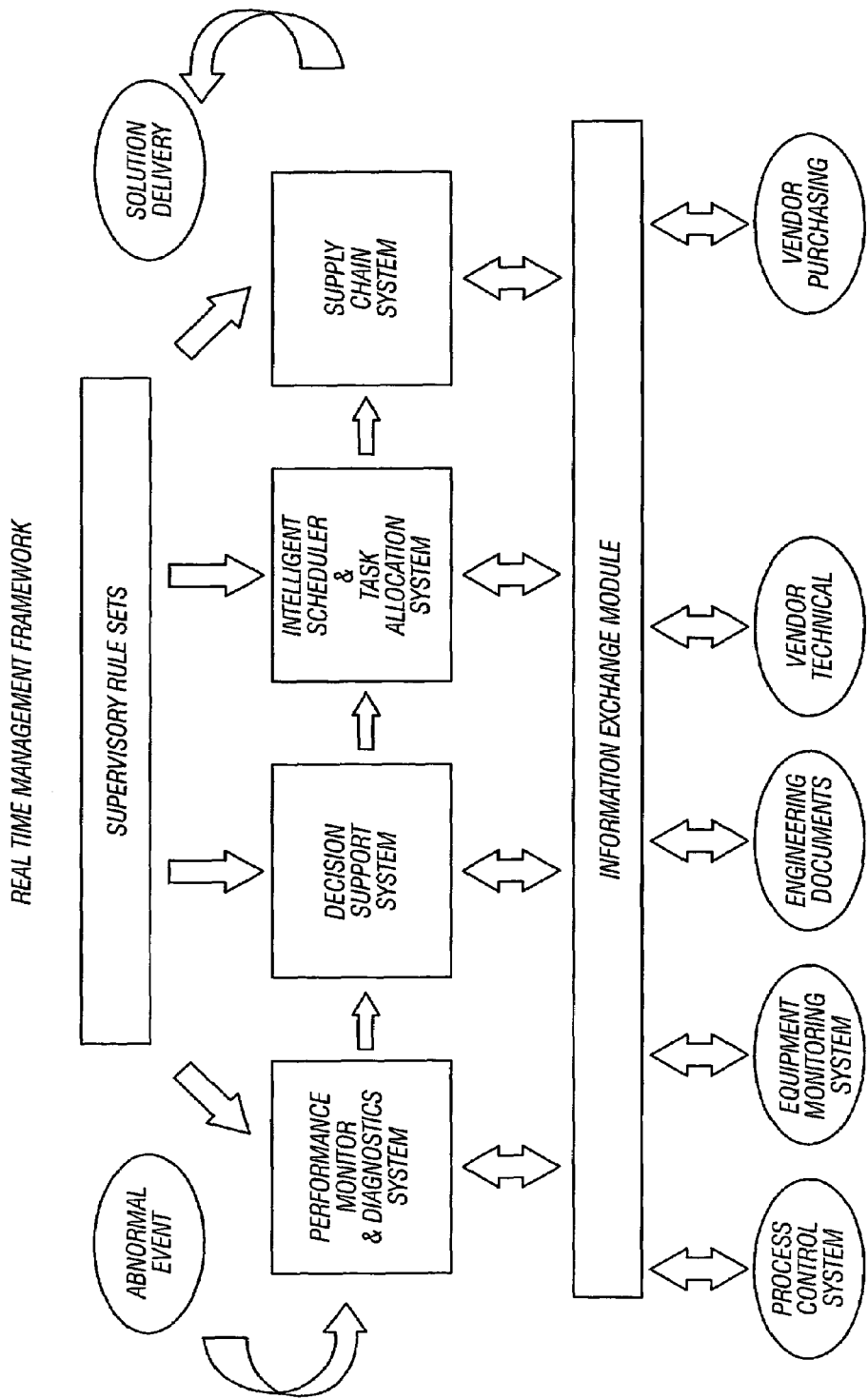
FIG. 3 is a schematic diagram of the basic elements and framework for an embodiment of the invention.

The basic elements and framework for an embodiment of the system architecture of the invention are outlined in FIG. 3. The main elements for delivering a solution for an abnormal operating event, e.g. from a pump failure to a process or equipment parameter deviation, can include: performance monitoring and diagnostic systems module, including expert systems, for example; a decision support module, including expert systems; an intelligent scheduling and work management/task allocation module; a supply chain management module; an information exchange module; and a supervisory rule set manager. This gives an overview of the main elements at a very high level. Implementation of each element can require several methods and software tools depending on the particular systems an operation uses to manage various aspects of the asset or enterprise. However, the information necessary to manage an event through to a solution can be made available through access portal technology for functional work groups that support and manage the particular asset. The access portal technology implementation language can include, but is not limited to, JAVA, C/C++, PERL, XML, HTML, HTMLS, Flash, ASP, and other internet-based languages. The access portal may also be done as a hardware implementation or by other access means.

Information about an asset can exist in multiple sources and systems, including process control systems, enterprise management systems, computerized maintenance management systems (CMMS), technical and engineering document management systems, vendor data including both procurement and technical vendor data, equipment monitoring systems, logistics tracking systems, individual staff applications, and so on. This information can be relative to timeframes that are very short to time frames of a year or more in duration. Illustrative examples are: less than a second for some online vibration monitoring equipment; months for engine oil analysis data, one year for infrared surveys of electrical systems; and 5 years or more for internal inspection of a vessel during a facility maintenance turnaround. These various timeframes, and the time involved to compile, analyze, manipulate and act on the information can be considered "real time" within the context of the present invention. In the prior art, the information in these disparate sources are not brought into one location and presented to the organization in a manner that shows the overall picture and cross-functional relationships, and as such the prior art methodology can create silos of inefficiency in an organization that put roadblocks in the path of improving organizational performance and understanding of the asset management processes.

According to an embodiment of the present invention, the real time support process and system facilitates the coordination and alignment of cross-functional support, such as through web technology, and delivers a consistent way of performing asset management processes and measuring their effectiveness on a real time scale. One such process, that is an important part of an operation, is the maintenance process known as defect elimination, which addresses how the maintenance and technical groups systematically eliminate equipment problems in a process plant or manufacturing asset. The purpose of defect elimination is to introduce and create sustainable reliability of equipment and deliver the maximum product and process uptime in the manufacturing asset to ensure maximum revenue. This is simply an example of one asset management process in an operation within the maintenance function of the organization, provided for the purpose of illustration and not intended to limit the scope of the invention to other asset management functions.

Figure 4:
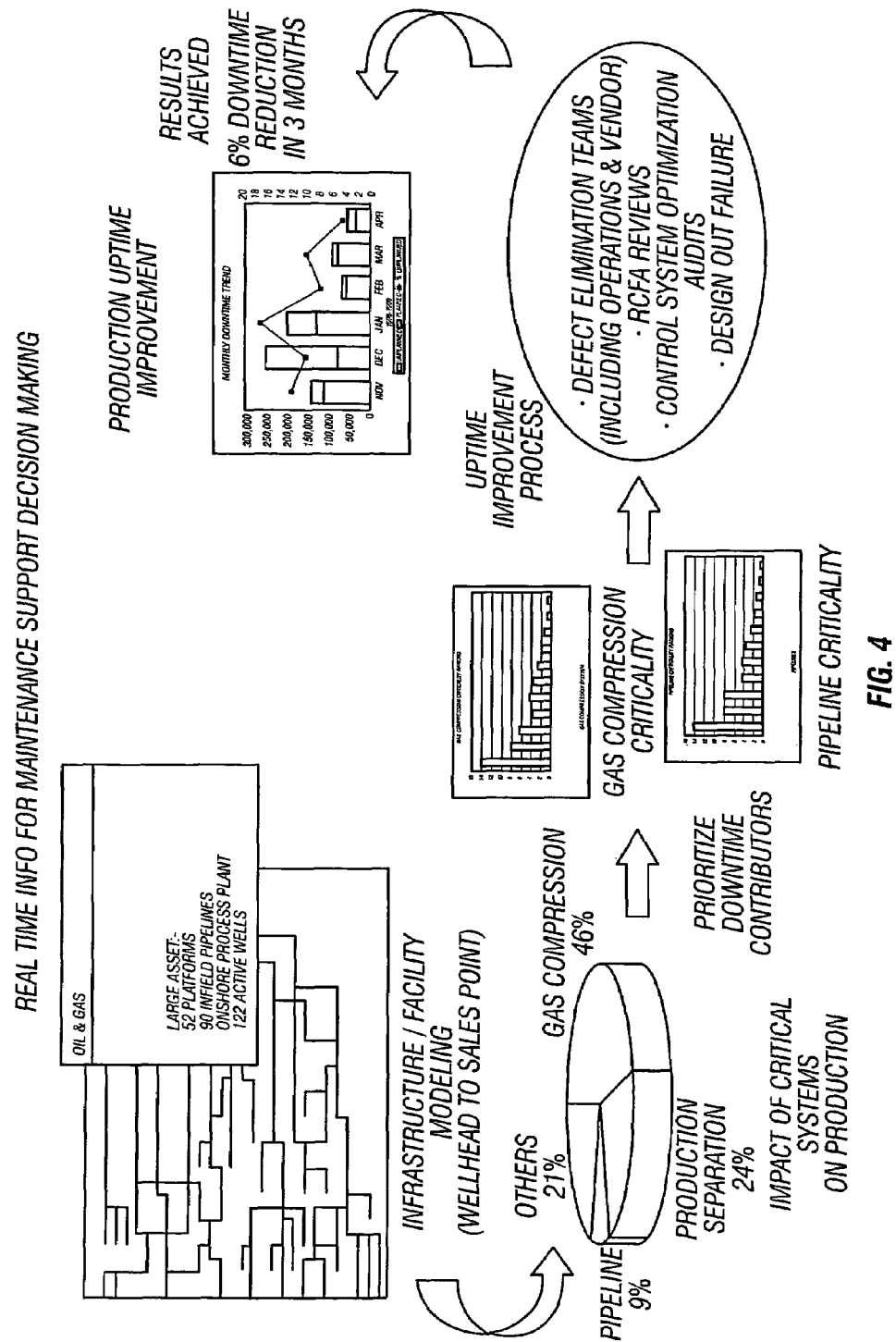
FIG. 4 schematically outlines one embodiment of the use of the invention for eliminating defects and improving uptime performance of an asset.

FIG. 4 outlines a part of the process in eliminating defects and improving uptime performance of an asset in one embodiment of the invention. It illustrates the initial planning and strategic definition that can be used to successfully conduct reliability performance improvements. By taking information from a field or plant and transforming that information into meaningful charts and graphs, defect elimination teams have a better understanding of what problems have occurred, root cause failure analysis reviews can be performed, control system optimization procedures audits can be performed, and the design out of failure can be performed. In the prior art, most of these steps are manual. In contrast, the real time operations support of the present invention can deliver consistent performance reporting in the decision process, extracted on a real time basis from multiple data sources. The present invention provides the information that is required to make the decisions in such a way so as to shorten the time between the abnormal event and the solution delivery. The present invention can also facilitate the uniform delivery of the right amount of information provided across several different operations to make consistent, quality decisions and analysis of the abnormal event.

The schematic of FIG. 4 shows an example of a reliability analysis at the front-end of the process determining the priorities associated with critical plant components and systems. These priorities can determine the relative impact that the components and systems have on delivery of a product and are used to focus the elimination of equipment defects to impact production. The ability to measure real time product loss (sometimes called "deferment") and downtime accelerates and improves the effectiveness of the defect elimination process undertaken by the maintenance group. The process of analyzing data to determine areas of focus can now be performed in real time and the results presented for action.

Traditionally, the analysis of operational data to deliver uptime and loss causation information is a manual process, however, real time operations support in this embodiment of the invention provides the analysis from the appropriate data sources on a real time basis. It also allows the standardization of the analysis process to give a consistent approach over several operations and a basis for benchmarking equipment and system performance.

The definition of "real time" is important in the description of the present invention because the type of decision support system used depends on the nature of, and the speed required to make the decisions regarding the system supports. Certain operational decisions fall into broad and generalized timeframes depending on the nature of the decision and the particular function the decision supports. Relevant timeframes can be less than one second in length for certain aspects of an operation, such as for example, the rotational speed (rpm) of an operating motor or turbine. Timeframes of hours, days, or months can be relevant for other aspects of an operation, for example weekly spot measurements or monthly corrosion monitoring. Timeframes of up to a year or more can be relevant for inspections that require entering a piece of equipment, which might only be possible during a complete facility shutdown. Each of these timeframes can be considered "real time" in context with the present invention. People experts and/or machine experts can be used to translate the data to actionable information and make the appropriate decisions. The time involved to gather, compile, analyze, manipulate and respond to the data can all be considered to be within a "real time" process within the scope of the present invention.

Figure 5:
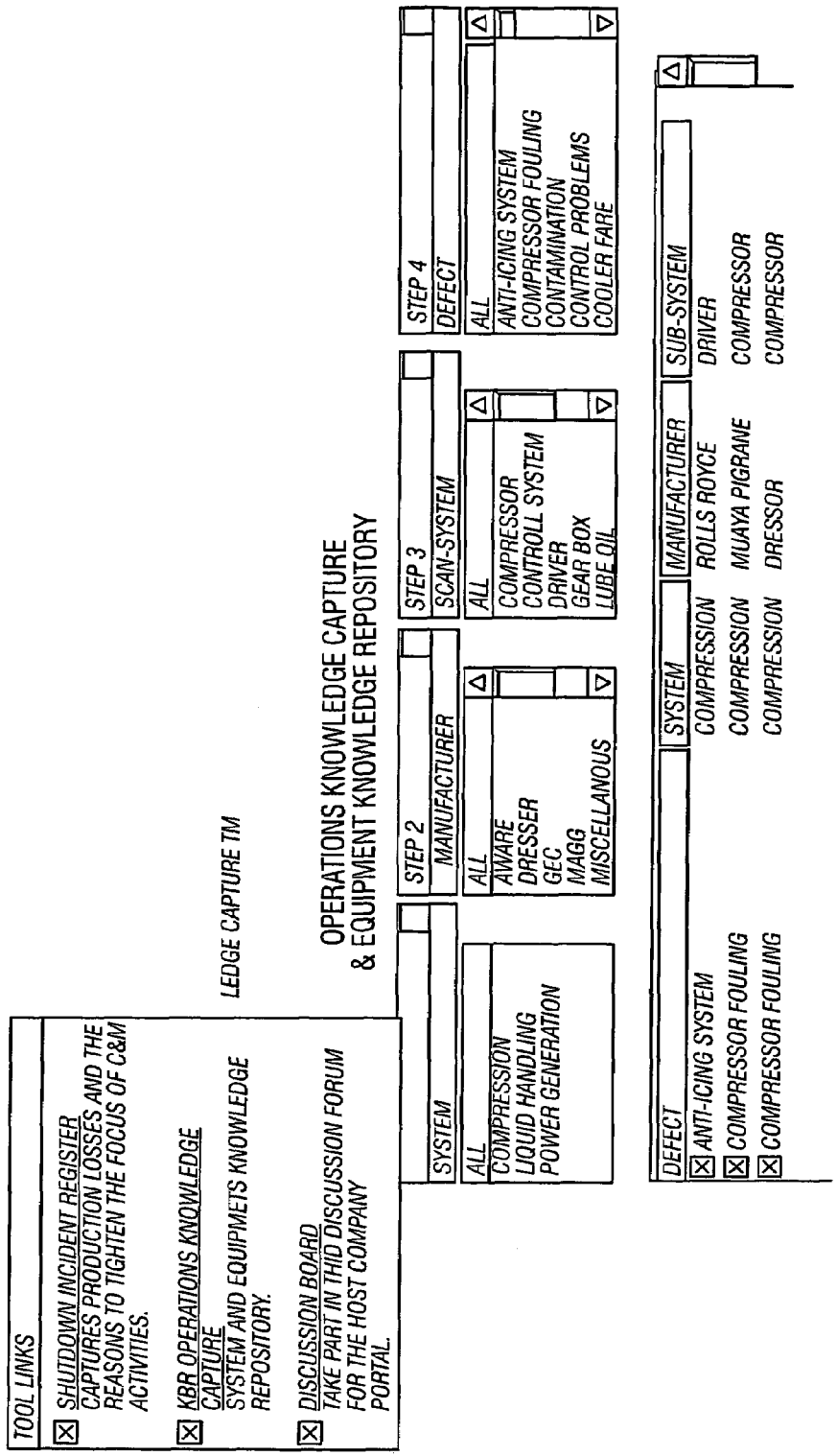
FIG. 5 is one example of a display screen used to show the knowledge capture tool according to an embodiment of the invention.

In the present invention, production-related decisions can be made on a real time basis. True real time decision-making in producing operations are typically associated with production control related decisions. These can be made either by the supervisory process control system or by operators that use the information presented by the control systems. The decisions on a level over and above regulatory and automated control can be determined by the operator and to a large extent are dependent upon operator competence and plant process stability. Decisions can be made ranging from seconds to as much as 24 hours or more, in response to a process parameter excursion, or to an abnormal situation when a process upset occurs. The focus of the present real time operations support in this context is to improve the quality and integrity of production decisions by the use of so-called machine experts or expert systems. The use of expert system technology is well known in the art and has been applied to the process industries, as well as more diverse applications in, for example, the medical sector. However, one embodiment of the present invention provides a knowledge capture process that engages technical support and maintenance staff, as well as operating staff. This process enables the structured capture of process facility, systems and equipment abnormal trends and potential failure mechanisms for use in expert systems that make use of process control systems. FIG. 5 shows an exemplary display for the knowledge capture process, which includes choices for the user to select a combination of which systems, manufacturers, sub-systems, and defects are to be captured. This process also allows for a user to quickly and efficiently search for data regarding a particular asset.

FIG. 6 is one example of the knowledge capture display according to one embodiment of the invention. The display is made up of three main components: an overview, symptoms of defect, and other or miscellaneous information. The overview component shows which system is involved, who the manufacturer of the asset is, the work breakdown structure (or type of asset), the objective of the asset, and the cause of a recorded defect. The symptoms of defect component shows the symptom the asset is presenting, the severity of the defect, the consequence of the defect, and the detection mechanism utilized to find the defect. The miscellaneous information component shows the defect occurrence frequency, the frequency of the logic rule application, the logic rule applied, what action to take, the recipient of the defect report or alarm, and miscellaneous comments.

Since the response of the plant process under small excursions and abnormal conditions is usually predictable, it is possible to use the control and logic capability of an expert system to replace the human intervention of the operator. The machine expert also has the ability to respond more consistently to abnormal conditions where the response typically has heretofore relied on the operator competence and ability. There are also the limits an operator will place on the process performance, based on the level of confidence the operator has in managing the process under certain process conditions. The supervisory control system also has the ability to control and manage multiple process variables, but more consistently and at wider technical limits than the human operator, to allow optimal process system performance.

The benefits of allowing the machine expert to replace certain operator functions include: (1) Improved operational integrity by ensuring consistent decision making under abnormal conditions and optimization of the response to process excursions and upsets; (2) Operation of the process at levels closer to the technical limits of the plant process and the associated production increases and energy efficiency; and (3) Improved process stability from the use of multi-variable control technology to manage production processes that are very dynamic in nature and difficult to optimize with human intervention.

According to embodiments of the present invention, operations support related decisions can also be made with real time decision-based information. The vast majority of decisions made in operations and maintenance support in the prior art are done by people in the plant operations maintenance team and by operational technical support staff. The decisions are usually associated with actions that need to be taken in response to an equipment failure or an aspect of equipment underperformance. These decisions are generally made on a real time basis in connection with facility operations in a relevant time frame of less than a second to one or more days, maintenance operations in a time frame on the order of from 1 to 90 days, whereas real time engineering decisions generally occur in 3 to 6 months, and reservoir decisions in the case of petroleum production assets in from 6 months to 1 year or more. The emphasis here is on the provision of real time information that promotes the right decisions and value-based actions of corresponding functional support teams. The present invention provides, in one embodiment, a real time, line of sight management process that coordinates the operating support functions and creates alignment across the support functions.

An example of an operations decision support portal that integrates operations support functions and processes is shown in FIG. 7. In this example, available shutdown incident reports are filtered by downtime range, loss category, cause category, independent service contractor loss, who the issue was raised by, the responsible asset, the shutdown incident report status, and the shutdown incident report number. Once the data has been filtered it can be presented in a format such as a table that allows a user to see a shutdown incident report.

Each functional group that supports an operating asset or plant can be represented in the line of sight portal and visible to the whole organization in the asset management model. Presented in this fashion, it demonstrates to an organization that several functional groups are required to support the operation and each have defined roles to play in its performance. Each function has a line of sight management process to guide the impact and delivery contribution of the function to the operation. This is described in the line of sight model for the maintenance function as a typical example. It is however, important to recognize that each support function can have differing and unique line of sight model implementations due to the nature of their asset management processes.

Typical functions that support an operating plant or asset include facility engineering and construction; maintenance; planning and scheduling; health, safety and environmental services; human resources; production operations; manufacturing; supply chain services, e.g. procurement, materials, logistics and so on; field or site operations; operations leadership; subsurface operations and engineering; and the like. Some functions can be specific to an industry and can make the management model differ cross-industry.

Figure 8:
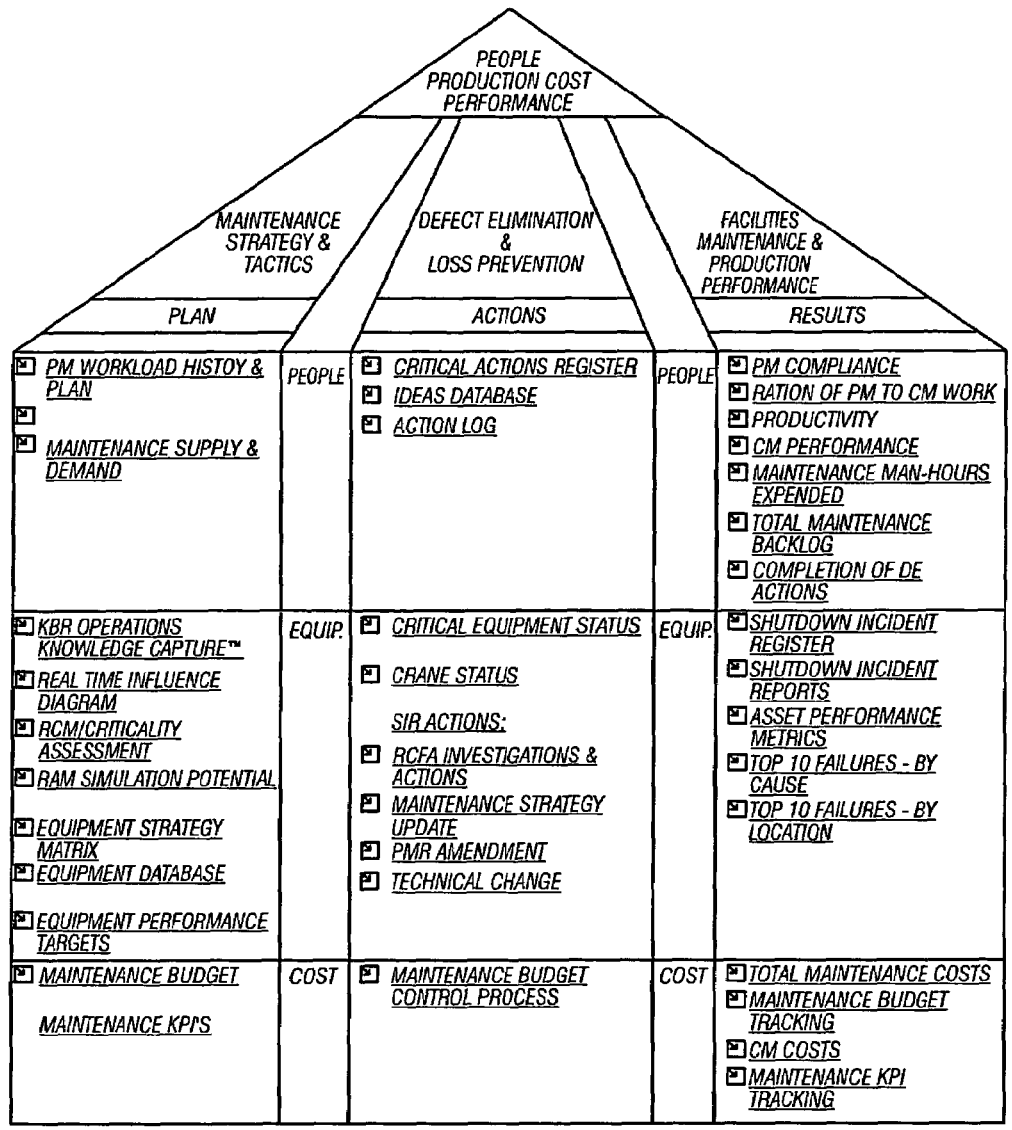
FIG. 8 is a display screen for an example of a line of sight model according to one embodiment of the present invention.

As mentioned, one embodiment of the invention is a line of sight (LOS) model. The portal illustrated in FIG. 8 provides a window to the plant operation and access point to display the real time performance information about each of the support group functions, e.g. maintenance, operations, supply chain, and so on. The plan, real time performance results, and actions to support these are incorporated in a line of sight management model for clear alignment of the support teams. It is different from prior art management models, which usually focus on a continuous improvement cycle of planning, execution, measurement and monitoring.

For each LOS model a facilitated process can be used to develop the appropriate LOS content or the associated functional group. This can be an important part of the overall process of this embodiment of the invention as it dictates the quality and focus of the function. It is at this point that the effectiveness of the LOS for the business functional group is determined, Clear goals are stated for the asset or plant and the functional group is challenged to identify the clear performance measures that can be made to track the achievement of the goals of each of the applicable functions.

In the example of FIG. 8, the maintenance group LOS is depicted. It has three main elements, the plan, the actions and the results, labeled in each column. The plan element includes the strategy and tactics the maintenance group has adopted to manage the maintenance of equipment and the performance of the plant systems. It may include any criticality analysis of equipment and systems, the strategy for maintenance, the annual budget requirements, reliability simulation studies and other relevant staff work that describes the approach, philosophy and plan to manage equipment performance.

The actions element includes the specific actions by the maintenance function in applying corrective steps to improve the performance against the real time results achieved. If there is a variance from target in cost or planned maintenance compliance, or any other of the maintenance metrics, there should be one or more specific actions to bring the metric in line with targeted results.

The results element forms the last leg of the LOS and link to real time information that measures the performance associated with the maintenance function. Typical real time performance information includes uptime and availability of equipment, maintenance support costs and maintenance metrics such as ratio of corrective to preventive maintenance. These are all standard metrics in maintenance and express the outcome of a consistent and appropriate maintenance strategy and philosophy applied to the asset. The way in which results are displayed can be a part of the asset management process and can be important in setting the business measures on the performance of the maintenance teams, as well as the cost of the associated equipment and systems.

Displayed in this way, there is a clear LOS through the maintenance function to the business goals. The asset or plant manager, maintenance manager and other authorized staff can see a clear connection between business, associated functional goals and the actual real time results. This creates a high level of visibility across the business and demonstrates clear actions to improve performance.

Figure 9:
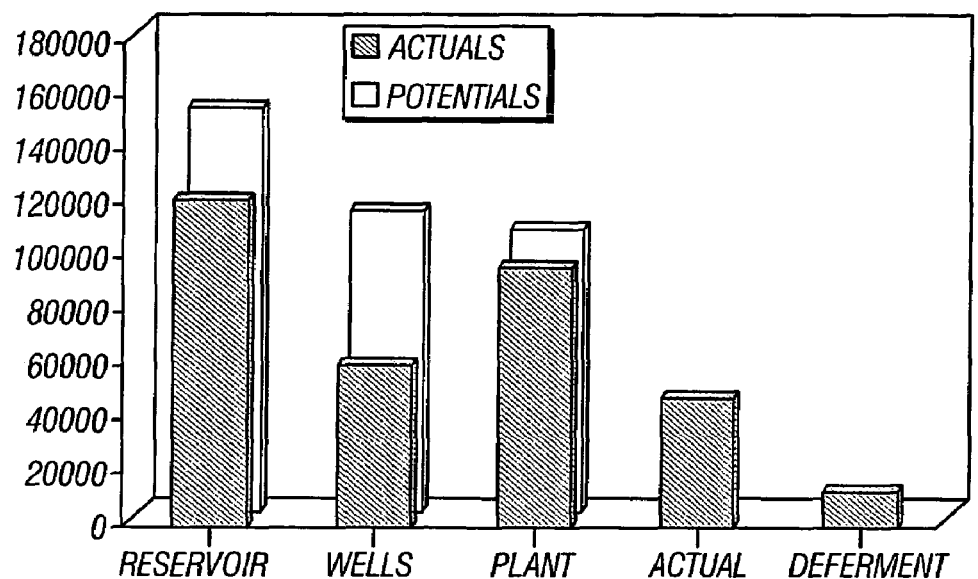
FIG. 9 is a display screen for an example of a production efficiency model applied to an upstream oil and gas asset based on real time information from the process control system associated with the asset.

The system of the present invention also includes in one embodiment a real time production efficiency model. The production efficiency model is one example of metrics for plant performance. The example seen in FIG. 9 is the model applied to an upstream oil and gas asset in which real time information from the process control system is used to construct the production efficiency model. The potential performance and actual real time performance are displayed for the key aspects of the asset: the reservoir, the producing wells, the process plant, the export pipeline and the product sales point. This can be provided real time for all producing fields in a complex asset infrastructure, and gives the teams involved in the support of the operation a clear picture and understanding of where value is lost as the product passes through key elements in the production process or value chain.

The chokes or pinch points in the production process can be measured and a value for the loss or production deferment provided real time. The overall product loss or production deferment value gives the support teams clear information on the value that is being lost and where the loss is occurring. The importance of this is fundamental to the defect elimination process in implementing the maintenance process as well as in guiding resources and efforts in other asset support groups.

Figure 10:
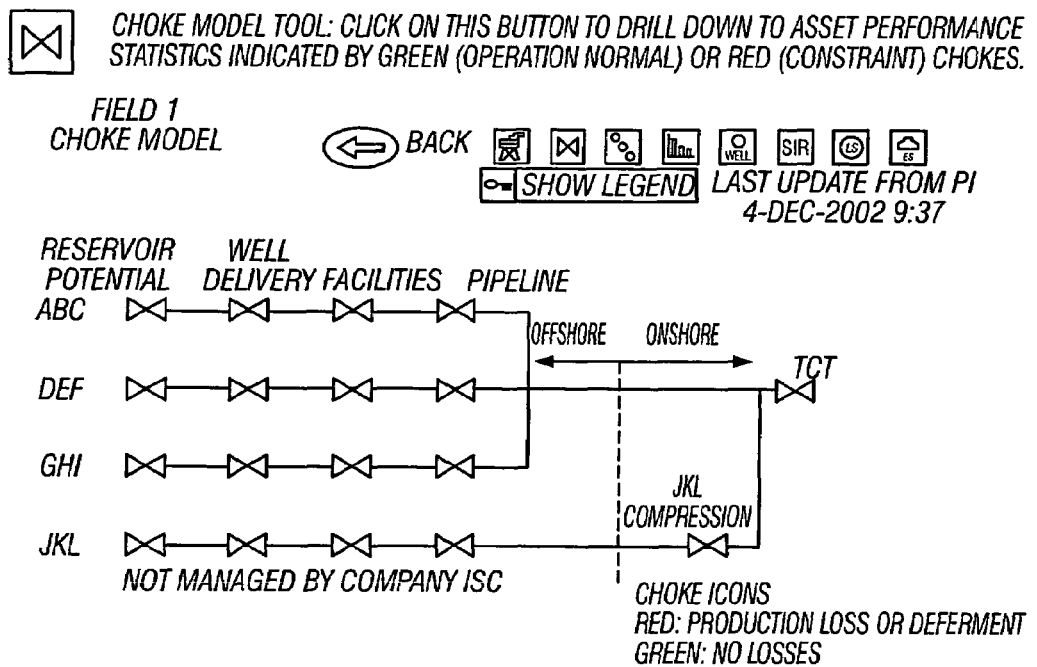
FIG. 10 is one example of the choke model tool according to one embodiment of the invention.

"Loss" in this context is defined as the amount of product lost (or sometimes, deferred) over time and can be expressed as a volume and/or revenue equivalent. In one embodiment of the invention, a choke model tool provides visual and/or data output that shows what the status of the "choke" points in the system are, as seen in FIG. 10. The choke points can, for example, be displayed in green, which indicates that the point is functional and working fine, or in red, which indicates a problem. Examples of reasons for a red choke point can include process or emergency shutdown, unit conditions that restrict production throughput, or not all of the production facilities are available. The choke model tool can show various areas in the process or facilities simultaneously, allowing for an overall view of the production process and identification of problems that have occurred at choke points.

Once the overall plant loss is known, the next most important piece of decision-making information that is required to take relevant action in the LOS model is the determination of the cause of loss. The cause of loss may have the root cause stem from various plant systems and equipment or a combination thereof. This information can be arrived at from two or more alternative paths, such as for example: manual logs of shutdown incidents and the reason for loss recorded by the operator or maintenance staff; or from the control system real time. Each method can have validity in use and can be complimentary sources of loss causation information.

Figure 11:
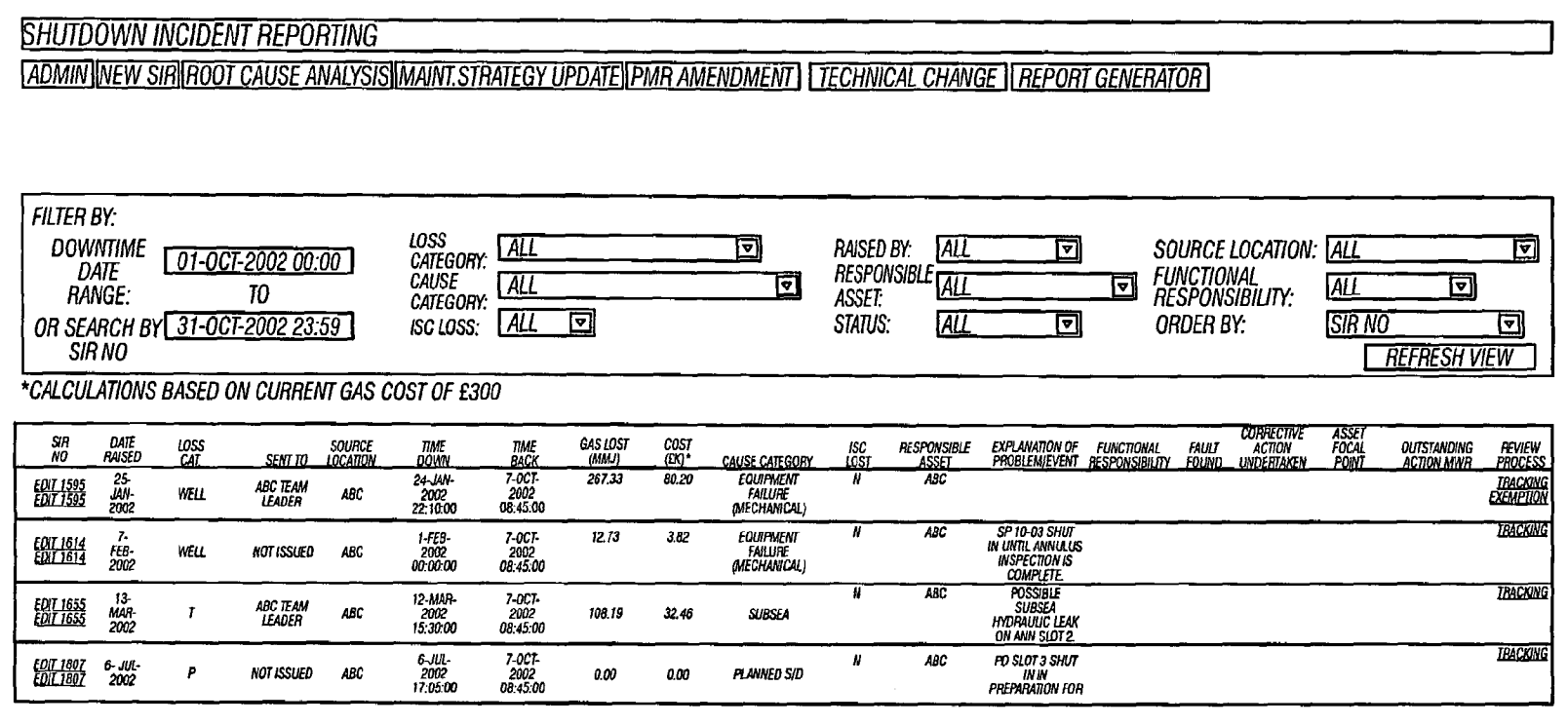

The present invention also provides in one embodiment a web enabled loss causation evaluation process. The recording of loss causation can be made possible through a shutdown incident reporting process, which is performed manually through a web-enabled system as illustrated for one example in FIG. 11. The shutdown incident reporting (SIR) process can have several functions: administration, which allows the shutdown incident report template to be altered; new SIR, which allows for the creation of a new SIR entry; root cause analysis; maintenance strategy update, which allows for an enterprise to change its strategies based upon knowledge captured; preventative maintenance amendment; technical change; and report generation. FIG. 11 also shows that one can filter SIRs by a variety of means and the SIRs and their respective data can be displayed to a user in a reader friendly format such as a table.

Operations staff typically records each incident that results in a loss of production from the asset to capture the time, duration, reason for shutdown, location, product lost, revenue lost and other pertinent information. This library of shutdown incidents is then analyzed and presented in several forms to support actions made by the operations and maintenance staff in eliminating future causes of loss. Any significant losses may require specific root cause failure investigations and actions taken to resolve the problems. These are linked to the LOS model for the maintenance function to demonstrate the management of defect elimination. The shutdown incident register provides details, including but not limited to, the date the shutdown incident was raised, the loss category attributable, the name of the people who were sent the shutdown incident report, the source location of the asset, the time the asset is down, the time when the asset came back online, the production lost, the cost, a cause category, whether or not it is an independent service contractor loss, which asset is responsible and to what complex the loss is to be attributed, an explanation of the problem including factors that may have contributed to the problem, what department is functionally responsible for the asset, the fault found after a root cause analysis, the corrective action taken, the name of the asset focal point, any outstanding action that needs to be taken, review status, close out status, and so on.

In this way, key steps in the maintenance management process and the facilities engineering processes are linked back to the cause of, product loss. The processes linked to the source of loss incident include the root cause failure analysis (RCFA), maintenance strategy revisions as a result of maintenance changes to prevent future loss, maintenance task changes and technical/engineering changes to the physical plant design. The overall process provides the organization with a complete management-of-change process that is fully auditable.

The operations support teams can also increase their level of understanding in the magnitude, source and nature of production losses and thereby improve the effectiveness of the organization in managing the business performance.

Figure 12:
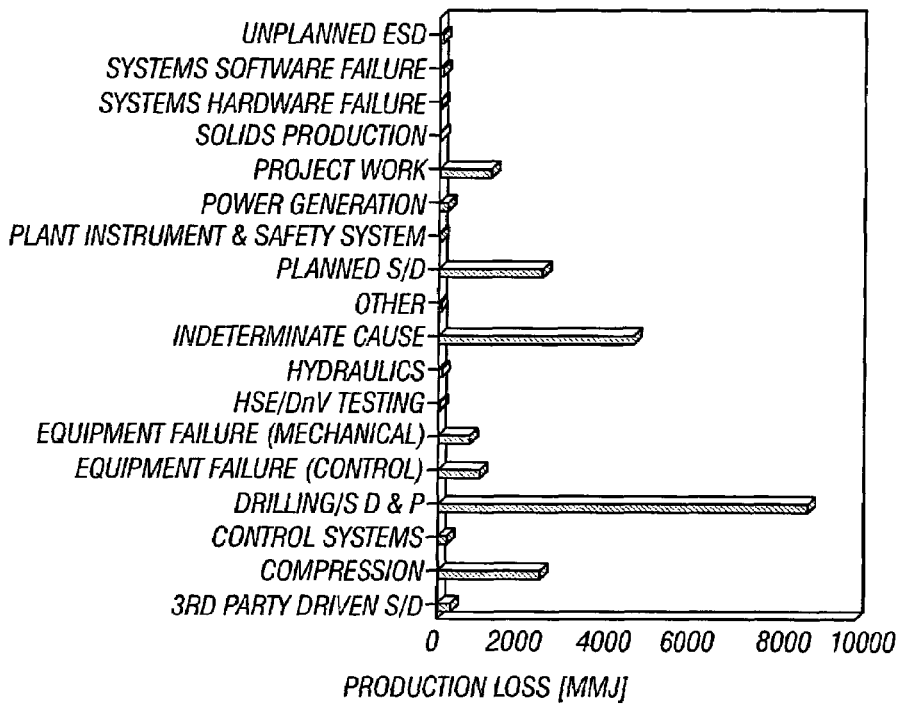
FIG. 12 is a display screen illustrating an example of real time data extraction and processing through specific algorithms to automatically deliver loss causation and facility downtime information.

To compliment the loss causation process, similar information can be generated from the data in the plant process control systems as shown in FIG. 12. This figure shows a graph of downtime contributors for a user-defined period of time and the corresponding production losses. Real time data can be extracted and processed through specific algorithms to deliver loss causation and plant downtime information automatically.

Figure 13:
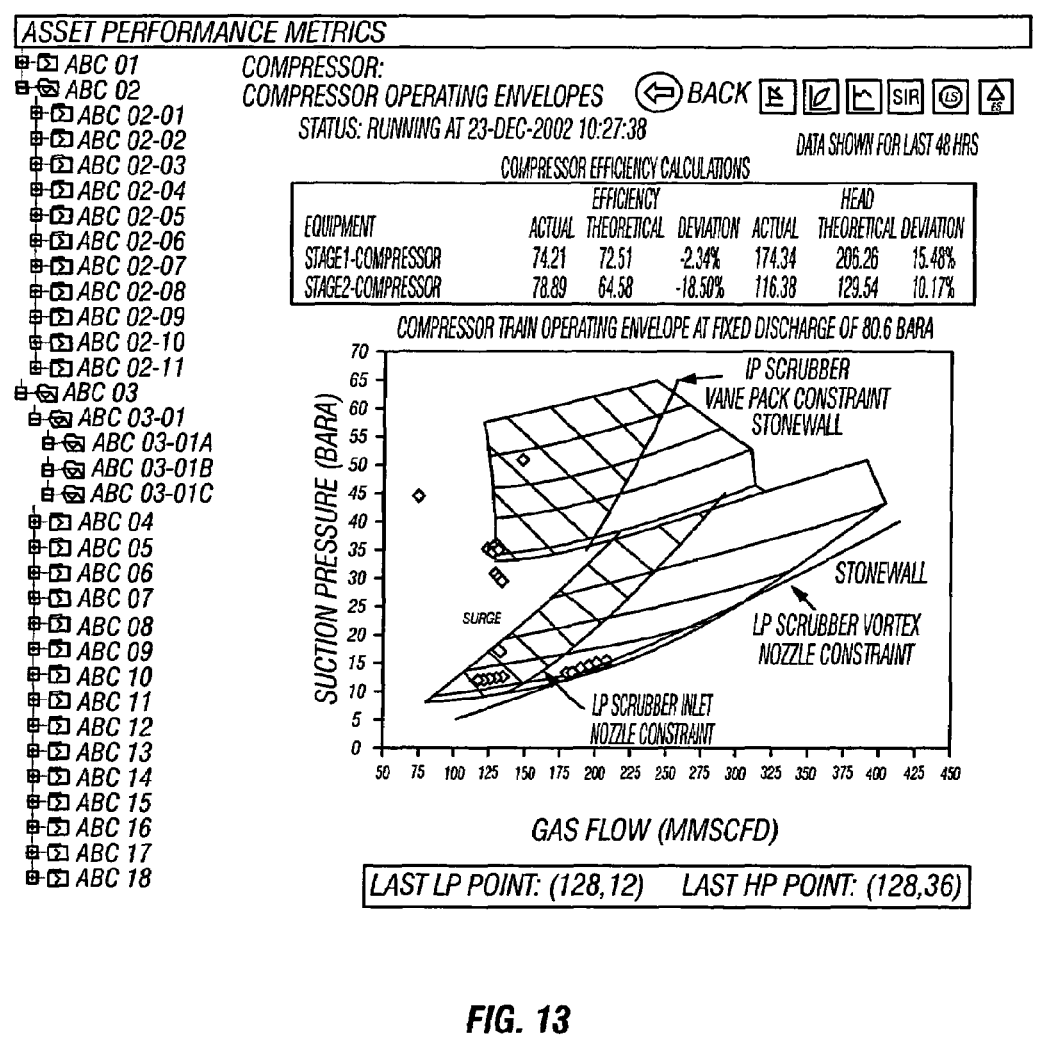

The present invention, in one embodiment, provides real time equipment performance analysis. A further level in the process of real time performance monitoring is done at equipment level. This is based on an understanding of the criticality of key items of equipment or systems in the delivery of uptime performance, such as gas compression in the case of an oil and gas production asset. In the example shown in FIG. 13, the engineering knowledge of the design and operating envelopes of a gas compression system is married with real time process data to deliver a real time depiction of compression performance. The representative graph shows the relation between suction pressure and gas flow for a specific compressor that is chosen by a user through the interface provided. The raw data behind the compressor efficiency are also shown. Any excursion from normal operation or from the point of optimal performance can be registered in the production efficiency model as a loss in product. The importance of this monitoring process is in identifying the relative impact of performance deviations on production loss and associated revenue.

Figure 14:
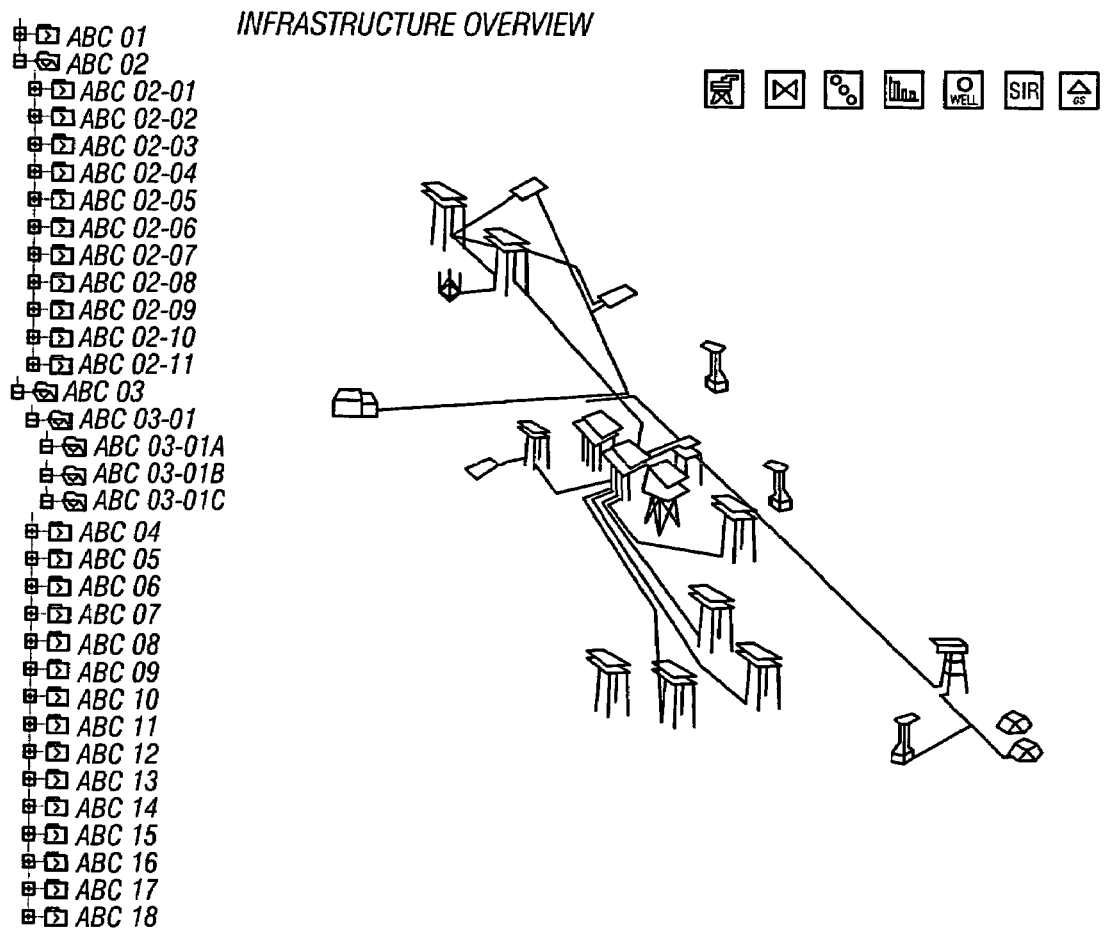
FIG. 14 is a display screen illustrating an example of the linkage of business processes and real time analysis tools to the asset infrastructure in an infrastructure overview format.

The present invention also provides in one embodiment an integrated management process. A facet of real time operations and maintenance support is the ability to link the business support processes and associated decision-making information into an integrated business model, which acts as a guidance system for response to operational problems and variances from normal operation. For example, a link is made from identification of product loss at facility or plant level to the cause or source of the product loss through to the follow-up actions required to solve the problem and determine the root cause failure mechanism. The integration of business processes can be made both in process and information/action links as well as in integration of support function staff located in geographically remote places. FIG. 14 shows an overview display screen demonstrating the linkage of business processes and real time performance analysis tools to the asset infrastructure. A user can select an infrastructure from within the process and view it with this tool. In this representation the assets of an oil field are displayed. Each asset can then be selected to see further data.

An illustrative example is provided to show an application of the present invention. In an oil or gas asset, such as shown in FIG. 14, the production from one of the producing wells can experience an increase in water production, thereby increasing the water and salt content of fluids entering the overall system. Various devices such as wellbore probes or surface water treatment vessels may indicate the increase in water production. Salt contained in the produced fluid can precipitate in the processing vessels and production lines. Salt deposits can interfere with readings such as flow measurement or liquid level indicators in vessels. Entrained salt can be carried over with the gas stream to the gas gathering pipelines, gas processing equipment that may service multiple producing wells such as compressors, dryers and gas treating systems, into the gas sales line and to the distributions system or end user, such as a power generating plant.

In this example, a reservoir engineer assessing the situation in the traditional manner would determine whether the water production could damage the formation or reduce ultimate hydrocarbon recovery. If no production damage is expected, the reservoir engineer may see no need for corrective action. An operator on the production platform may notice an increase in water, but if the facility can handle the additional fluid, he may likewise see no problem. A technician may notice that the salinity of the produced fluids has increased and may take local action to avoid the salting up of instruments, or may question the validity of readings such as the increased liquid level in a water knockout vessel. An increased liquid level can increase the amount of salt and liquid carryover with the produced gas stream, which can collect in the pipeline between the production platform and one of the common compression/treating platforms. A production engineer may notice that a gas compressor on the compression/treating platform is operating at reduced RPM and under higher load than expected, but since still within acceptable ranges, may dismiss it. An operator overseeing the gas sales line may notice that throughput is less than expected, but is within his alarm limits so he is not concerned. Wanting to minimize operating expenses, the gas sales line operator may not add any additional compression. The end user may receive the minimum volume of gas for his facility, and might complain within his organization, but cannot seem to achieve greater flow from the gas sales line, and only hopes that he can make it through his shift without any disturbances.

The occurrences in this example are the result of increased water production from a single well that is being carried over and collecting in the pipeline between the production platform and the common compression/treating platform. However, the increased salt content is unknowingly coating the internals of the compressor. Either the slugging of water from the pipeline between the production platform and the common compression/treating platform, or the salt buildup within the compressor, or a combination of both, could lead to the shut down and/or equipment failure on the common compression/treating platform. The loss of the compression/treating platform can lead to flow surges and possible shut down of the sales pipeline and also of the end user facility, possibly leading to further equipment failure. Due to the restricted throughput on the system, producing wells, compression/treating platforms and other assets would need to be curtailed or shut down. Equipment failures and production interruptions such as these can result in significant economic loss and to an increase in safety related incidents.

The present invention as applied to this example could have pulled the various seemingly unrelated issues into a common system overseeing the overall process. The data such as increased water and salinity, higher liquid levels and reduced compressor efficiency could be analyzed together rather than separately. Historical data and logic rules could be considered and may have warned of a possible salt buildup within the compressor, due to its altered operating conditions, resulting in a relatively minor maintenance action such as water washing the compressor internals. The present invention, through aspects such as choke point analysis and analysis involving multiple variables, could have alerted users of the potential domino effect that was possible and warned of potential operational disruptions from one or more single point failures.

Figure 15:
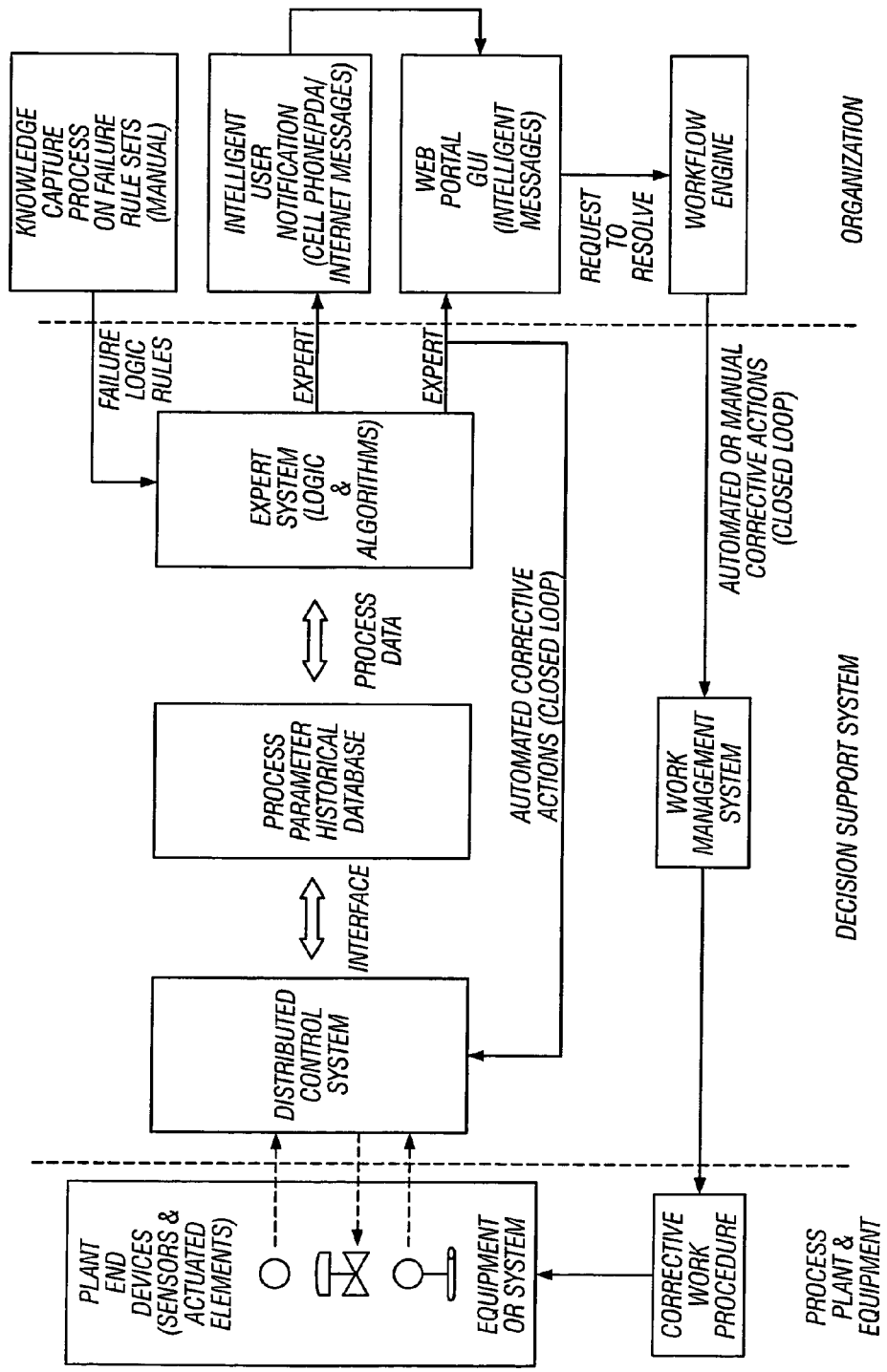
FIG. 15 is a schematic diagram of the basic elements and framework for an embodiment of the real-time expert system.

One example of real time process asset management is shown schematically in FIG. 15. Using data gathered from assets such as devices in the plant or production process and interpreting historical data with an expert system, alerts can be sent to persons in the enterprise that are responsible for those assets. The expert system is made up of rule sets that are based upon knowledge gained either by those working within the enterprise or from outside sources such as vendors. With this system, those responsible for assets are notified of problems or potential problems and can take corrective or preventative action.

Figure 16:
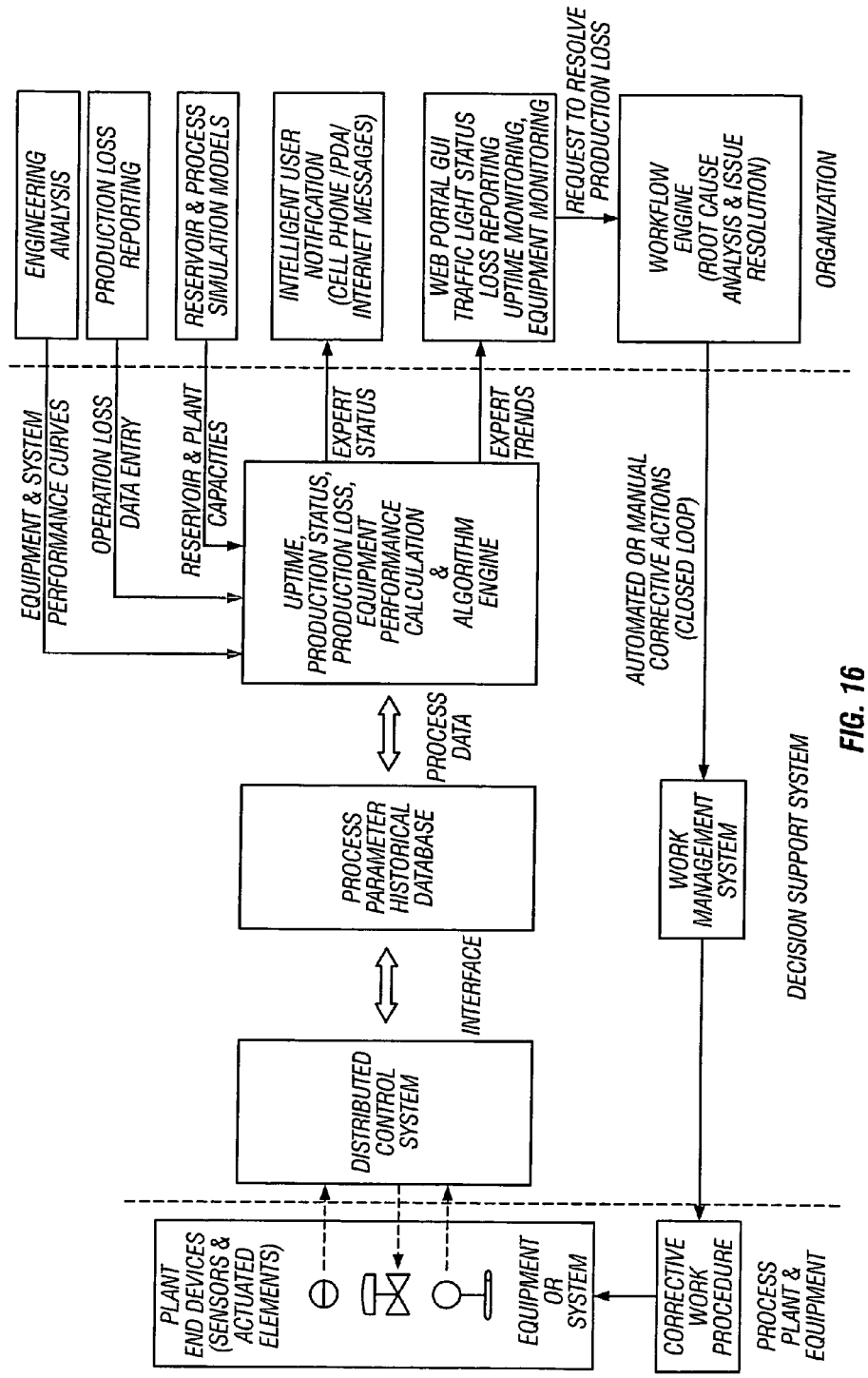
FIG. 16 is a schematic diagram of the basic elements and framework for an embodiment of the real-time production optimizer.

One example of real time asset management is shown schematically in FIG. 16. This example monitors and controls the production process, using data gathered from assets such as devices in the plant or production process, and interpreting historical data with an expert system, to generate and send reports to persons in the enterprise who are responsible for those assets. The expert system is made up of rule sets that are based upon knowledge such as equipment and system performance curves, operation loss data, and reservoir and plant capacities, gained either by those working within the enterprise or from outside sources such as vendors. With this system, those responsible for assets are notified of problems or potential problems and can take corrective or preventative action.

Figure 17:
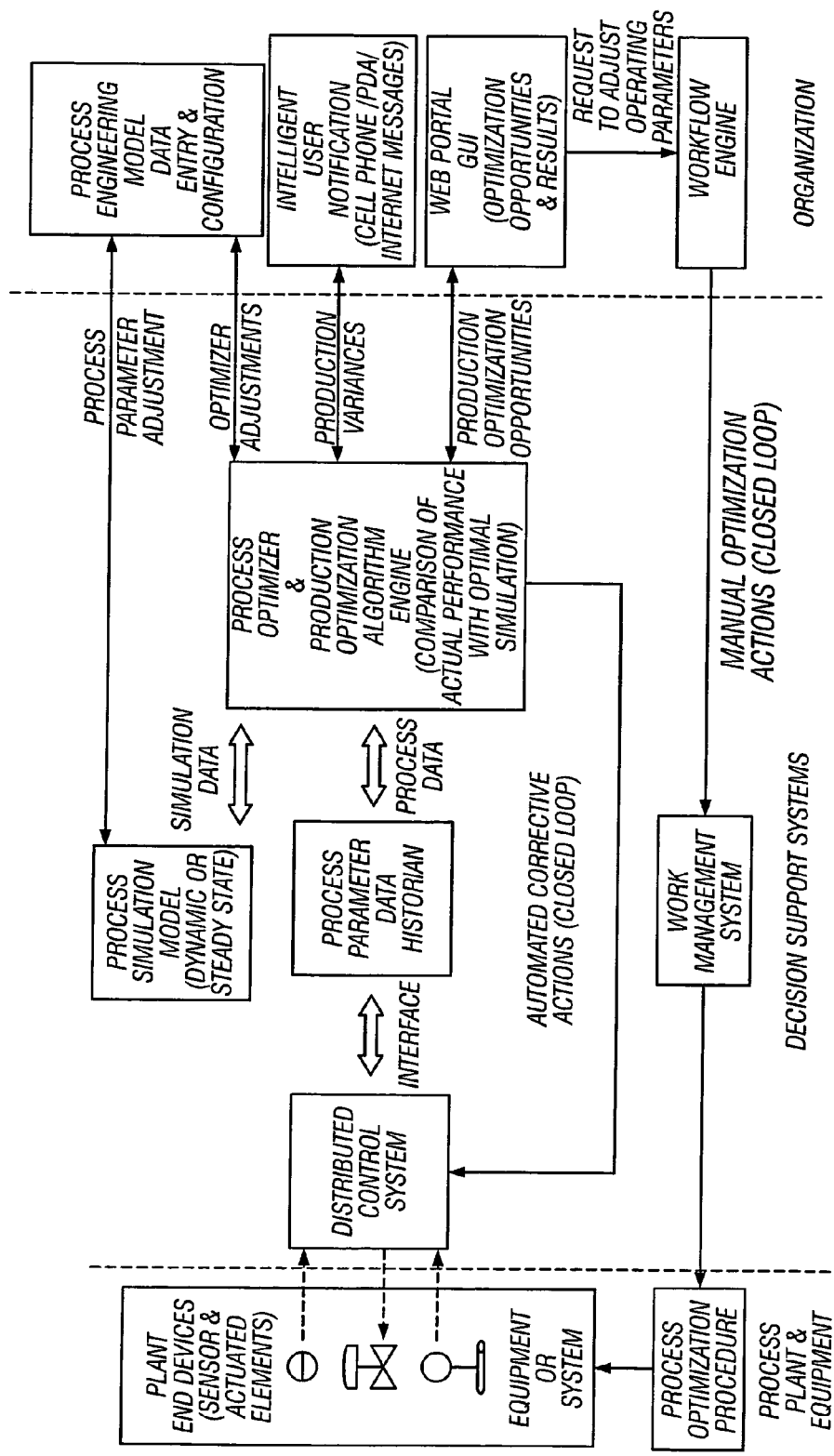
FIG. 17 is a schematic diagram of the basic elements and framework for an embodiment of the real-time production monitoring system.

One example of real time asset optimization is shown schematically in FIG. 17. This example of optimization of a plant process uses data gathered from assets such as devices in the plant or production process and interprets historical data with an expert system to generate and send reports to persons in the enterprise who are responsible for those assets. The expert system is made up of rule sets that are based upon knowledge such as process simulation model data (dynamic or steady state), process engineering model data, and the like, gained either by those working within the enterprise or from outside sources such as vendors. With this system, those responsible for assets are notified of production variances and production optimization opportunities. Once notified of a deviation, proper optimization action can be taken.

Figure 18:
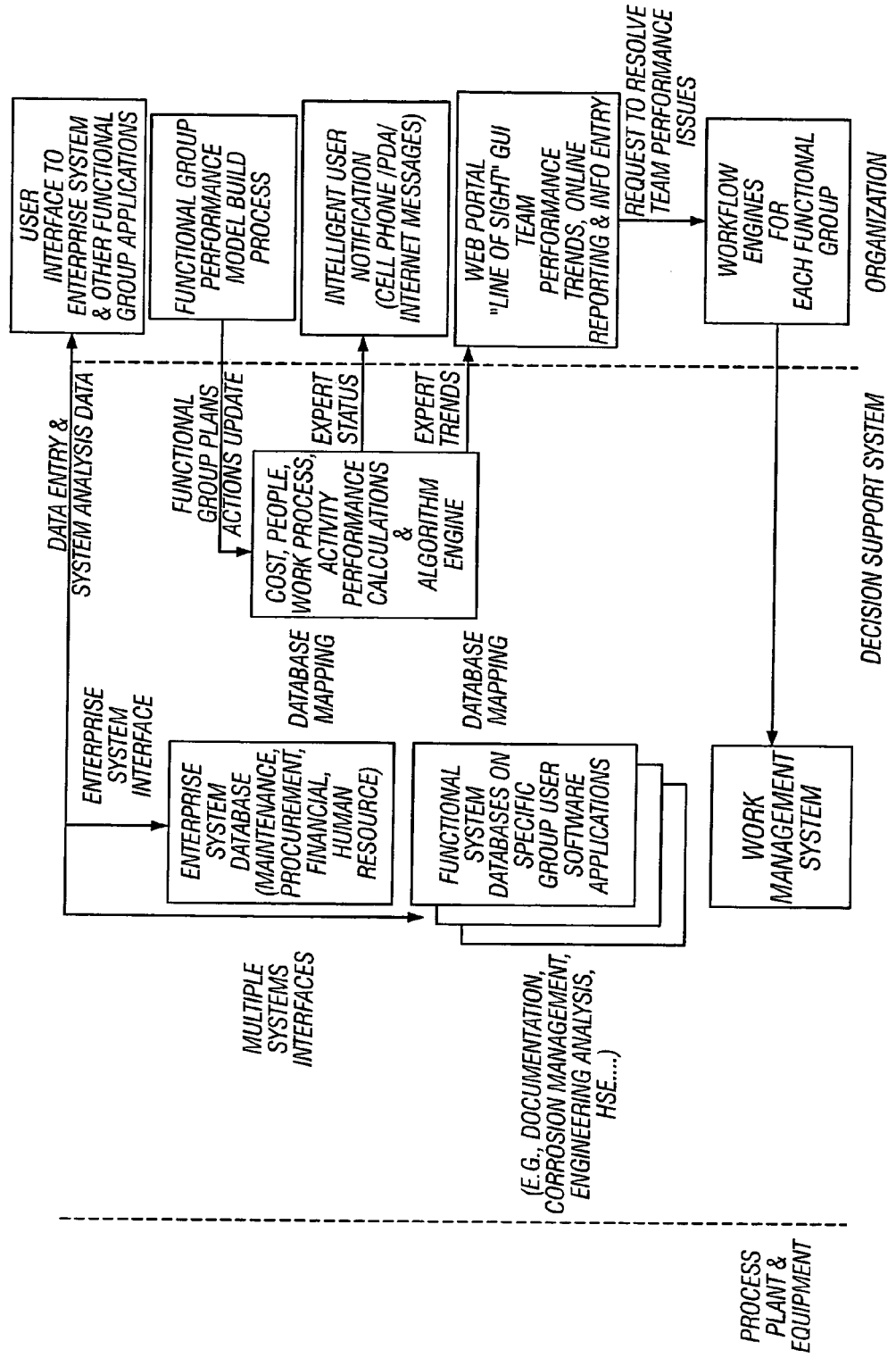
FIG. 18 is a schematic diagram of the basic elements and framework for an embodiment of the real-time performance monitoring system.

One example of real time asset optimization is shown schematically in FIG. 18. This example monitors performance using data gathered from assets such as people, work processes, costs, and the like and interpreting data with an expert system, to generate and send reports to persons in the enterprise who are responsible for those assets. The expert system is made up of rule sets that are based upon knowledge such as enterprise system databases which are updated by group functions, functional system databases on group software applications, and functional group performance models and plans, gained either by those working within the enterprise or from outside sources such as vendors. With this system, those responsible for assets are notified of performance variances, trends, status and the like. Once notified, proper performance resolution action can be taken.

Figures 19, 20:
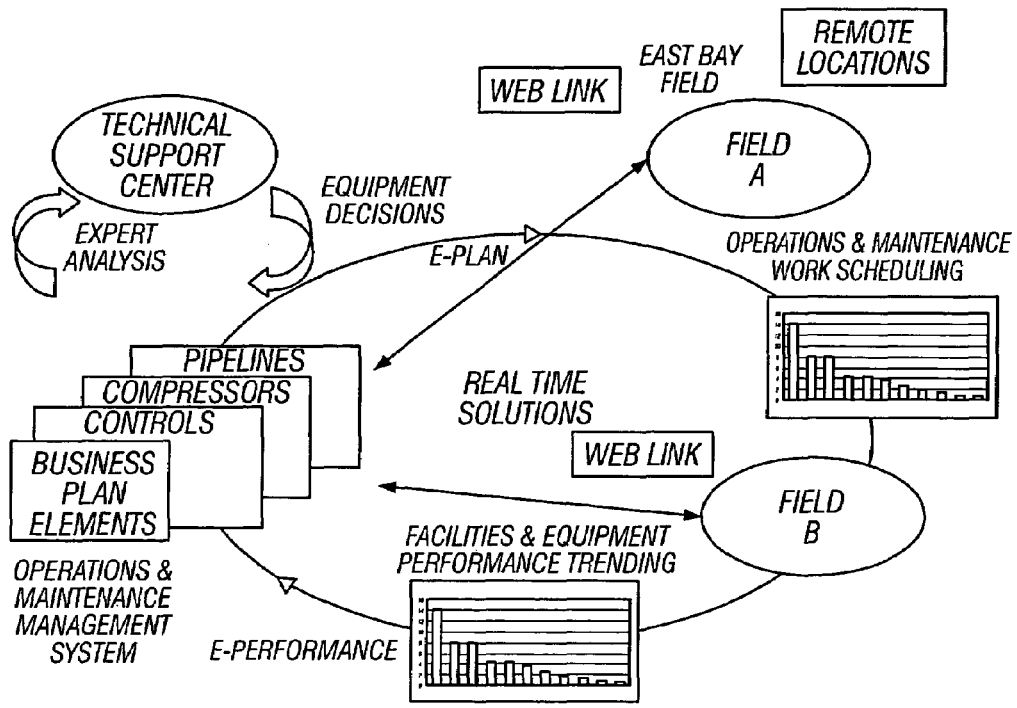
FIG. 19 is an example of a traffic light system used to show the efficiency and availability of platforms according to one embodiment of the invention.
FIG. 20 schematically illustrates an operations and maintenance support process according to one embodiment of the invention.

An exemplary traffic light system definition is shown in FIG. 19. Each traffic light color (red, yellow, and green) can be customized to meet the particular needs of a plant. In this figure the availability and efficiency from the start of a gas day is defined. The real time operations process can include a guidance or navigation capability that highlights where product loss or product variance due to equipment efficiency problem has occurred. The process can include a traffic light indication of plant status where green indicates normal operation, yellow indicates a drop in facility or equipment performance and red indicates a severe drop in performance and/or shutdown of the facility or equipment. This allows the authorized operations support staff, particularly the technical teams and leadership, to focus on the important plant performance issues as they occur. Information of this nature is normally available only to operations staff through the plant process control system and not accessible to the organization as a whole. An important purpose of the traffic light process is to raise the awareness of the organization, other than front line operations staff, of the plant downtime and efficiency problems to generate the right response and effort of support.

Where decisions are made and where support is accessed are important features of the present invention. An important function of real time operations and maintenance support is the ability to deliver technical and commercial solutions to operational issues and abnormal events from anywhere in the world on a continuous 24 hours/day and 7days/week basis. It is desirable to have the ability to use finite specialist and subject matter expertise in specific locations for asset support to any location worldwide in the most economic way. The best use of enterprise resources can thus be brought to any operating problem without the need to mobilize or transport scarce personnel.

An exemplary overall process to support an operation according to one embodiment is shown in FIG. 20. It covers the implementation of the maintenance and operations business plans at system and equipment level, the work management and planning, and the technical and operational support resource experts involvement, as well as the plant performance monitoring and decision support information feedback loop. In real time, data from assets such as pipelines, compressors, etc. can be received by a technical support center and remote locations via an access portal, such as for example, an Internet link. Data from the remote locations can also be seen by the technical support center and other locations allowing for a complete line of sight throughout an organization.

In one embodiment, a real time operations interactive schematic environment is provided for use with the portal. This comprises a software program that allows user to interactively create a process schematic via drag and drop smart graphical objects. The program can be easy to use, menu/wizard driven, and require minimal amount of training to create a schematic.

A process schematic representing a plant or a facility can be developed by selecting smart graphical icons (SGI) from a template and dropping them on to a drawing such as, for example, Microsoft Visio. When an SGI is dragged and dropped on a drawing, the user is prompted to link the SGI to a database that contains information about the particular object. Once this link is established, the program can dynamically retrieve the information from the database and display it, such as via a simple mouse move over and/or a mouse click on the drawing object. The template desirably has a number of pre-defined smart graphical icons such as pumps, vessels, compressors, columns, pipelines, buildings, and so on.

Each SGI has a series of connection points that can be connected via a pipeline object to other objects. These pipeline objects show the connectivity between objects and indicate direction of flow. The pipeline object can also be linked to a database object. There are desirably several special SGIs in the template that enable the user to link the object to a specific or desired attribute in the database such as flow, temperature, or pressure and display the attribute on the drawing.

Once a drawing is created, it can be saved and retrieved at a later date. The drawing can also be saved in an accessible means, such as in a web-enabled format and published on a web server. The drawing then can be viewed via a web browser, such as Microsoft Internet Explorer. This allows other users to view the drawing and dynamically visualize the real time information from a database. In this example a web-enabled system is discussed, the present invention is not limited to this type of access system and can be linked by other means, such as hard wired, wireless, microwave, satellite, or other communications systems can be used.

Figure 21:
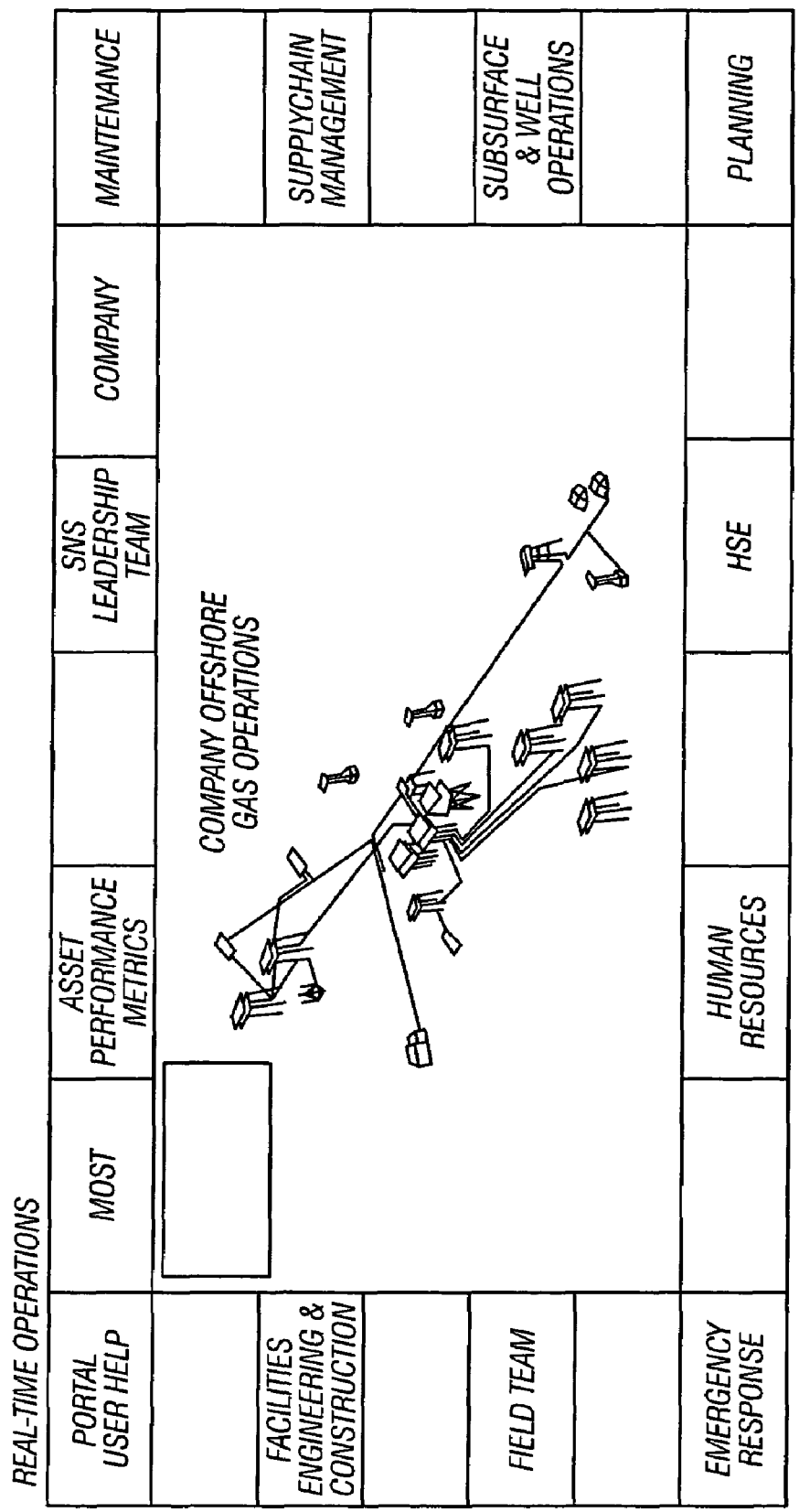
FIG. 21 is a display screen of the starting page according to one embodiment of the invention.

In one embodiment of the invention the end-user has a designated starting web portal screen or home page that allows the user to quickly access the various functions of the system, including but not limited to, asset performance metrics, leadership team, maintenance, supply chain management, planning, well operation, human resources, emergency response, field team, facilities, engineering and construction, and so on, as seen in FIG. 21. In this example a representative oil field is displayed in the center of the display. Each asset of the field can be further explored.

The computer program listing appendix submitted herewith provides representative custom software coding to interface with off-the-shelf software that is commercially available, as one example of achieving a portion of the benefits of the present invention in connection with an offshore petroleum production operation with multiple production platforms, compressors, pipelines, and the like. This example should be considered as illustrative and not in a limiting sense.

The invention is described above in reference to specific examples and embodiments. The metes and bounds of the invention are not to be limited by the foregoing disclosure, which is illustrative only, but should be determined in accordance with the full scope and spirit of the appended claims.

The invention claimed is:

1. An apparatus for real time process asset management, comprising:
   (a) a distributed control system to receive readings from sensor devices of one of an oil and gas facility or petrochemical and refining facility and transmit control signals to actuated elements to monitor and control the process;
   (b) an historical database comprising process parameter data interfaced with the distributed control system;
   (c) an expert system interfaced with the historical database to generate expert status and trend reports on uptime, production status, production loss, equipment loss, equipment performance, or any combination thereof;
   (d) an access portal for delivering the expert reports to a user;
   (e) a work management system to schedule a corrective work procedure to equipment or system of the process in response to a request to resolve a production loss from the access portal.

2. The apparatus of claim 1, wherein the expert system comprises logic rules and algorithms for generating the expert reports.

3. The apparatus of claim 1, comprising a knowledge capture tool to update failure logic rules in the expert system.

4. The apparatus of claim 1, comprising a telecommunication device linked to the expert system to transmit the expert reports to a remote user.

5. The apparatus of claim 1, wherein the access portal includes a graphical user interface to display expert alerts and to input requests to resolve the expert alerts.

6. The apparatus of claim 1, wherein the readings from sensor devices of one of an oil and gas facility or petrochemical and refining facility comprise readings from sensor devices of an oil and gas production, processing, or transportation facility.

7. An apparatus for real time production process asset Management, comprising:
   (a) a distributed control system to receive readings from sensor devices of one of an oil and gas facility or petrochemical and refining facility and transmit control signals to plant actuated elements to monitor and control the production process;
   (b) an historical database comprising process parameter data interfaced with the distributed control system;
   (c) an expert system interfaced with the historical database to generate and transmit expert status reports to a user interface device, and expert trend reports to a user via an access portal;
   (d) a work management system to schedule a corrective work procedure to equipment or system of the process in response to a request to resolve production loss via the access portal.

8. The apparatus of claim 7, wherein the expert system comprises calculation instructions and logic algorithms to report statistical data selected from the group consisting of uptime, process status, production loss, equipment loss, equipment performance, or any combination thereof.

9. The apparatus of claim 7, wherein the user interface device comprises telecommunication equipment.

10. The apparatus of claim 7, wherein the expert system is linked to one or more input devices for real time data selected from the group consisting of engineering analysis, operations loss, process capacities, and combinations thereof.

11. The apparatus of claim 10, wherein the engineering analysis data include equipment and system performance data.

12. The apparatus of claim 10, further comprising a process simulation model linked to the expert system for the process capacities data.

13. The apparatus of claim 12, further comprising a reservoir simulation model linked to the expert system to provide reservoir capacities data.

14. The apparatus of claim 7, wherein the access portal comprises a graphical user interface to display the expert trend reports and to input the requests to resolve production losses.

15. The apparatus of claim 7, wherein the readings from sensor devices of one of an oil and gas facility or petrochemical and refining facility comprise readings from sensor devices of an oil and gas production, processing, or transportation facility.

16. An apparatus for real time process asset management, comprising:
   (a) a distributed control system to receive readings from sensor devices of one of an oil and gas facility or petrochemical and refining facility and transmit control signals to actuated elements to monitor and control the production process;
   (b) an historical database comprising process parameter data interfaced with the distributed control system;
   (c) an expert system interfaced with the historical database to generate and transmit variance reports to a user interface device, and optimization opportunity reports to an access portal;
   (d) a work management system to schedule an optimization procedure to equipment or system of the process in response to a request to adjust an operating parameter sent via the access portal.

17. The apparatus of claim 16, wherein the expert system comprises logic rules and algorithms for process or production optimization.

18. The apparatus of claim 16, wherein a process simulation model is interfaced with the expert system for updating the expert system with simulation data.

19. The apparatus of claim 18, further comprising an input device for process engineering model data, configuration information to adjust the process simulation model, production optimization logic rules or algorithms in the expert system, or a combination thereof.

20. The apparatus of claim 16, further comprising an input device for process engineering model data and configuration information to adjust logic rules or algorithms in the expert system.

21. The apparatus of claim 16, wherein the user interface device comprises telecommunication equipment.

22. The apparatus of claim 16, wherein the access portal comprises a graphical user interface.

23. The apparatus of claim 16, wherein the readings from sensor devices of one of an oil and gas facility or petrochemical and refining facility comprise readings from sensor devices of an oil and gas production, processing, or transportation facility.

24. A method of real time process asset management, comprising:
   (a) operating a process with a distributed control system for receiving readings from facility sensor devices and transmitting control signals to actuated elements to monitor and control the process comprising:
      operating the process with the distributed control system for receiving readings from facility sensor devices of one of an oil and gas or petrochemical and refining facility; and
      transmitting control signals to actuated elements of one of the oil and gas facility or petrochemical and refining facility to monitor and control the process;
   (b) interfacing the distributed control system with an historical database comprising process parameter data;
   (c) exchanging process data between the historical database and an expert system for generating expert alerts to notify a user of alert status;
   (d) transmitting instructions to the distributed control system for initiating an automated corrective action in response to one or more of the expert alerts;
   (e) updating failure logic rules in the expert system;
   (f) transmitting a corrective action request to a work management system in response to one or more of the expert alerts;
   (g) performing a corrective work procedure on equipment or system of the process in response to the corrective action request;
   (h) repeating (a) through (g) on a real time basis.

25. The method of claim 20, wherein the expert system comprises logic rules or algorithms for generating the expert alerts.

26. The method of claim 20, wherein updating the failure logic rules comprises capturing knowledge from failure analysis.

27. The method of claim 20, wherein one or more of the expert alerts comprises remote user notification via telecommunication device.

28. The method of claim 20, wherein one or more of the expert alerts comprises notification via an access portal graphical user interface.

29. The method of claim 28, wherein the transmission of the corrective action request to the work management system comprises generating a request to resolve one or more of the expert alerts via the access portal.

30. The method of claim 20, wherein operating the process with the distributed control system for receiving reading from facility sensor devices of one of an oil and gas or petrochemical and refining facility comprises operating the process with a distributed control system for receiving readings from an oil and gas production, processing, or transportation facility; and
wherein transmitting control signals to actuated elements of one of the oil and gas facility or petrochemical and refining facility to monitor and control the process comprises transmitting control signals to actuated elements of an oil and gas production, processing, or transportation facility to monitor and control the process.

31. A method of real time process asset management, comprising:
(a) operating a process with a distributed control system for receiving readings from facility sensor devices and transmitting control signals to actuated elements to monitor and control the process comprises:
operating the process with the distributed control system for receiving readings from facility sensor devices of one of an oil and gas or petrochemical and refining facility; and
transmitting control signals to actuated elements of one of the oil and gas facility or petrochemical and refining facility to monitor and control the process;
(b) interfacing the distributed control system with an historical database comprising process parameter data;
(c) exchanging process data between the historical database and an expert system for generating expert status and trend reports on uptime, production status, production loss, equipment loss, equipment performance, or any combination thereof;
(d) updating equipment, system, operations loss, and process capacity data in the expert system;
(e) transmitting a corrective action request to a work management system in response to one or more of the expert reports;
(f) performing a corrective work procedure to equipment or system of the production process in response to the corrective action request;
(g) repeating (a) through (f) on a real time basis.

32. The method of claim 31, wherein the expert system comprises calculation instructions or logic algorithms for generating the expert reports.

33. The method of claim 31, wherein the updated data in the expert system comprises engineering analysis, production loss reporting, simulation model output, or a combination thereof.

34. The method of claim 31, comprising delivery of the expert reports to a remote user via a telecommunication device.

35. The method of claim 31, comprising display of one or more of the expert reports in a line of sight format via an access portal graphical user interface.

36. The method of claim 35, further comprising sending a request to resolve production loss via the access portal to a workflow engine for root cause analysis, issue resolution, or a combination thereof, to generate the corrective action request to the work management system.

37. The method of claim 31, wherein operating the process with the distributed control system for receiving reading from facility sensor devices of one of an oil and gas or petrochemical and refining facility comprises operating the process with a distributed control system for receiving readings from an oil and gas production, processing, or transportation facility; and
wherein transmitting control signals to actuated elements of one of the oil and gas facility or petrochemical and refining facility to monitor and control the process comprises transmitting control signals to actuated elements of an oil and gas production, processing, or transportation facility to monitor and control the process.

38. A method of real time process asset management, comprising:
(a) operating a process with a distributed control system for receiving readings from facility sensor devices and transmitting control signals to actuated elements to monitor and control the process comprises:
operating a process with a distributed control system for receiving readings from facility sensor devices of one of an oil and gas or petrochemical and refining facility; and
transmitting control signals to actuated elements of one of the oil and gas facility or petrochemical and refining facility to monitor and control the process;
(b) interfacing the distributed control system with an historical database comprising process parameter data;
(c) exchanging process data between the historical database and an expert system for generating expert reports to notify a user of report status;
(d) transmitting instructions to the distributed control system for initiating an automated corrective action in response to one or more of the expert reports;
(e) updating logic rules for process optimization in the expert system;
(f) transmitting an optimization action request to a work management system in response to one or more of the expert reports;
(g) performing an optimization procedure to equipment or system of the process in response to the optimization action request;
(h) repeating (a) through (g) on a real time basis.

39. The method of claim 38, wherein the expert system comprises logic rules or algorithms for process or production optimization.

40. The method of claim 38, further comprising exchanging simulation data between the expert system and a process simulation model.

41. The method of claim 40, further comprising adjusting processing parameters between the process simulation model and process engineering model data.

42. The method of claim 41, further comprising adjusting optimization parameters between the expert system and the process engineering model data.

43. The method of claim 38, wherein one or more of the expert reports comprises production variance data.

44. The method of claim 43, wherein the production variance data are transmitted to a remote user via a telecommunication device.

45. The method of claim 38, wherein one or more of the expert reports comprises optimization opportunities.

46. The method of claim 45, wherein the optimization opportunities are transmitted to a user via an access portal graphical user interface.

47. The method of claim 46, wherein the transmission of the optimization action request to the work management system comprises generating a request to adjust operating parameters via the access portal.

48. The method of claim 38, wherein operating the process with the distributed control system for receiving reading from facility sensor devices of one of an oil and gas or petrochemical and refining facility comprises operating the process with a distributed control system for receiving readings from an oil and gas production, processing, or transportation facility; and
   wherein transmitting control signals to actuated elements of one of the oil and gas facility or petrochemical and refining facility to monitor and control the process comprises transmitting control signals to actuated elements of an oil and gas production, processing, or transportation facility to monitor and control the process.

49. A method of real time performance management, comprising:
   (a) interfacing an enterprise system database pertaining to one of an oil and gas facility or petrochemical and refining facility with one or more functional system databases and a user interface:
   (b) exchanging data between the enterprise system database and an expert system for calculating performance metrics of the enterprise functions;
   (c) exchanging data between the expert system and the one or more functional databases;
   (d) building a functional group performance model for use by the expert system;
   (e) sending status reports from the expert system to a user;
   (f) displaying trend reports via a line of sight access portal graphical user interface;
   (g) transmitting a request to resolve functional group performance issues via the access portal to a work flow engine for the respective functional group;
   (h) sending a corrective action request from the workflow engine to a work management system;
   (i) repeating (a) through (h) on a real time basis.

50. The method of claim 49 wherein the expert system comprises logic rules or algorithms for generating the expert reports.

51. The method of claim 50 further comprising updating the logic rules, wherein updating the logic rules comprises capturing knowledge from functional group performance.

52. The method of claim 49, wherein one or more of the expert reports comprises remote user notification via a telecommunication device.

53. The method of claim 49, wherein one or more of the expert reports comprises notification via an access portal graphical user interface.

54. The method of claim 53, wherein the access portal includes a navigation table comprising a first dimension of grouping attributes comprising planning, actions, and results, and a second dimension of grouping attributes comprising people, equipment, and cost, grouping access to tools associated with the support module.

55. The method of claim 54, wherein the planning group provides access to maintenance tactics and strategy tools, the actions group provides defect elimination and loss prevention tools, and the results group provides facilities, maintenance, and production performance tools.

56. The method of claim 54, wherein the navigation table includes access to an operations knowledge capture tool.

57. The method of claim 56, wherein the operations knowledge capture tool is a database of information collated on process equipment items and respective recorded system defects, containing engineering and operational experiences of causes and effects of the system defects.

58. The method of claim 57, wherein the operations knowledge capture tool includes a database filter based upon a selective combination of two or more of system, manufacturer, sub-system, and defect.

59. The method of claim 57, wherein recorded systems defect data comprise symptoms, severity, consequence, detection mechanism, or any combination thereof.

60. The method of claim 59, wherein recorded systems defect data further comprise data selected from the group consisting of defect occurrence frequency, logic rule frequency, rules, recommended remedial actions, report recipient, miscellaneous comments, and any combination thereof.

61. The method of claim 54, wherein the navigation table includes access to a shutdown incident report register tool.

62. The method of claim 61, wherein the shutdown incident report register tool includes access to information from shutdown incident reports selected from the group consisting of report number, time back, functional responsibility, date raised, product lost, fault found, loss category, cost, corrective action, sent to, cause category, asset focal point, source location, independent service contractor loss, outstanding action, maintenance work request, time down, responsible asset, review process, explanation of problem, explanation of event, close out, and any combination thereof.

63. The method of claim 61, wherein the shutdown incident report register tool provides access to tools selected from the group consisting of administration, shutdown incident report generation, root cause analysis, maintenance strategy, planned maintenance routines, technical changes, report generator, and any combination thereof.

64. The method of claim 63, comprising defining shutdown incident report templates via the administration tool.

65. The method of claim 63, comprising operating the shutdown incident report generation tool to generate a shutdown incident report including data selected from the group consisting of person generating, person sent, loss category, independent service contractor loss, cause category, responsible asset, explanation of event, source location, time down, and any combination thereof.

66. The method of claim 63, comprising operating the root cause analysis tool to generate a shutdown incident report including data selected from the group consisting of date raised, focal person, execute root-cause-analysis-preventive-corrective-maintenance (RCA-PGM) date, recommended corrective action, actions completion date, cost benefit analysis, approval or rejection date, planned execution details, implementation date, close out date, and any combination thereof.

67. The method of claim 63, comprising operating the maintenance strategy tool to generate a shutdown incident report including data selected from the group consisting of date raised, execute root cause analysis and preventative care maintenance date, strategy number, action completed date, cost benefit analysis, execution planned date, execution implemented date, close out date, and any combination thereof.

68. The method of claim 63, comprising operating the maintenance routines tool to generate a shutdown incident report including data from the group consisting of date raised, execute root cause analysis and preventative care maintenance date, strategy number, action completed date, cost benefit analysis, execution planned date, execution implemented date, close out date, and any combination thereof.

69. The method of claim 63, comprising operating the technical changes tool to generate a shutdown incident report including data from the group consisting of date raised, execute root cause analysis and preventative care maintenance date, strategy number, action completed date, cost benefit analysis, execution planned date, execution implemented date, close out date, and any combination thereof.

70. The method of claim 63, comprising operating the report generation tool to generate a report including data from the group consisting of total asset shutdown performance, downtime by cause categories for source locations date range, downtime by source locations date range, downtime by loss category for responsible asset date range, production loss by functional responsibility date range, recurring events date range, shutdown incident report date range, issues report date range, and any combination thereof.

71. The method of claim 54, wherein the people grouping comprises tools selected from the group consisting of preventative maintenance workload, history and plan, maintenance supply and demand, critical actions register, idea database, action log, preventative maintenance compliance, ratio of preventative maintenance to corrective maintenance work, productivity, corrective performance, man hours expended, total maintenance backlog, completion of defect elimination action, and any combination thereof.

72. The method of claim 54, wherein the equipment grouping comprises tools selected from the group consisting of operations knowledge capture, real time influence diagram, criticality assessment, RAM simulation potential, equipment strategy matrix, equipment database, equipment performance, critical equipment status, crane status, shutdown incident register, shutdown incident reports, asset performance metrics, top failures by cause, top failures by location, and any combination thereof.

73. The method of claim 54, wherein the cost grouping comprises tools selected from the group consisting of maintenance budget, maintenance key performance indicators, maintenance budget control process, total maintenance costs, maintenance budget tracking, corrective maintenance costs, maintenance key performance indicators tracking, and any combination thereof.

74. The method of claim 53, comprising using an updating tool associated with the operations knowledge capture tool to populate the enterprise database with data selected from the group consisting of shutdown incident report data, vendor data, expert knowledge, and combinations thereof.

75. The method of claim 49, comprising accessing via a home page of the access portal, tools selected from the group of asset performance metrics, leadership team, maintenance, supply chain management, planning, well operation, human resources, emergency response, field team, facilities, engineering and construction, and any combination thereof.

76. The method of claim 49, comprising displaying a geographical representation of the plant process on the access portal.

77. The method of claim 49, wherein the access portal includes an asset performance tool.

78. The method of claim 77, comprising providing real time asset statistical data selected from the group of production rate, deferment, uptime, and availability, and any combination thereof, via the asset performance tool.

79. The method of claim 77, comprising operating the asset performance tool to access tools selected from the group of infrastructure overview, choke model, status, traffic light, production performance, expert, satellite overview, shutdown incident report, compressor envelope, uptime and availability, loss summary, and any combination thereof.

80. The method of claim 79, comprising operating the infrastructure overview tool to generate a pictorial overview of the respective asset for a selected process area.

81. The method of claim 79, comprising operating the choke model tool to generate a display of flow along a supply chain.

82. The method of claim 79, comprising operating the status tool to generate real-time status of an asset.

83. The method of claim 79, comprising operating the traffic light tool to generate a display of availability and efficiency of an asset.

84. The method of claim 79, comprising operating the production performance tool to a display of generate the potential and actual production performance of a selected production process area.

85. The method of claim 79, comprising generating defect alarms and recommended actions via the expert tool.

86. The method of claim 79, comprising operating the satellite overview tool to report process flow rate over time.

87. The method of claim 79, wherein the shutdown incident report tool provides access to tools selected from the group consisting of administration, shutdown incident report generation, toot cause analysis, maintenance strategy, planned maintenance routines, technical changes, report generator, and any combination thereof.

88. The method of claim 79, comprising operating the compressor envelope tool to generate a display of compressor status performance and envelope map showing a current operating point on the map.

89. The method of claim 79, comprising operating the uptime and availability tool to generate a display of the uptime and availability of an asset expressed as a percentage over a user-selected period.

90. The method of claim 79, wherein the loss summary tool is operated to generate a summary of shutdown incident report information with respect to losses for a selected asset and detail losses attributable to an independent service contractor and deferred production for the respective asset.

91. The method of claim 79, wherein the transmission of the corrective action request to the work management system comprises generating a request to resolve one or more of the expert alerts via the access portal.

92. The method of claim 49, wherein interfacing an enterprise system database pertaining to one of an oil and gas facility or petrochemical and refining facility with one or more functional system databases and a user interface comprises interfacing an enterprise system database pertaining to an oil and gas production, processing, or transportation facility with one or more functional system databases and a user interface.

93. A system for facilitating decision-making in connection with management of enterprise assets, comprising:
(a) a real time expert decision support module;
(b) an access portal for user access to the real time expert decision support module;
(c) a navigation table accessed via the access portal providing a line of sight through the enterprise assets, the enterprise assets comprising assets of one of an oil and gas facility or petrochemical and refining facility.

94. The system of claim 93, wherein the navigation table includes a first dimension of grouping attributes comprising planning, actions, and results, and a second dimension of grouping attributes comprising people, equipment, and cost, for grouping access to tools associated with the support module.

95. The system of claim 94, wherein the planning group provides access to maintenance tactics and strategy tools, the actions group provides defect elimination and loss prevention tools, and the results group provides facilities, maintenance, and production performance tools.

96. The system of claim 94, wherein the people grouping comprises tools selected from the group consisting of preventative maintenance workload, history and plan, maintenance supply and demand, critical actions register, idea database, action log, preventative maintenance compliance, ratio of preventative maintenance to corrective maintenance work, productivity, corrective performance, man hours expended, total maintenance backlog, completion of defect elimination action, and any combination thereof.

97. The system of claim 94, wherein the equipment grouping comprises tools selected from the group consisting of operations knowledge capture, real time influence diagram, criticality assessment, RAM simulation potential, equipment strategy matrix, equipment database, equipment performance, critical equipment status, crane status, shutdown incident register, shutdown incident reports, asset performance metrics, top failures by cause, top failures by location, and any combination thereof.

98. The system of claim 94, wherein the cost grouping comprises tools selected from the group consisting of maintenance budget, maintenance key performance indicators, maintenance budget control process, total maintenance costs, maintenance budget tracking, corrective maintenance costs, maintenance key performance indicators tracking, and any combination thereof.

99. The system of claim 93, wherein the navigation table includes access to an operations knowledge capture tool.

100. The system of claim 99, wherein the operations knowledge capture tool is a database of information collated on process equipment items and respective recorded system defects, containing engineering and operational experiences of causes and effects of the system defects.

101. The system of claim 100, wherein the operations knowledge capture tool includes a database filter based upon a selective combination of two or more of system, manufacturer, sub-system, and defect.

102. The system of claim 100, wherein recorded systems defect data comprise symptoms, severity, consequence, detection mechanism, or any combination thereof.

103. The system of claim 102, wherein recorded systems defect data further comprise data selected from the group consisting of defect occurrence frequency, logic rule frequency, rules, recommended remedial actions, report recipient, miscellaneous comments, and any combination thereof.

104. The system of claim 99, wherein the operations knowledge capture tool is associated with an updating tool to populate the database with data selected from the group consisting of shutdown incident report data, vendor data, expert knowledge, and combinations thereof.

105. The system of claim 93, wherein the navigation table includes access to a shutdown incident report register tool.

106. The system of claim 105, wherein the shutdown incident report register tool includes access to information from shutdown incident reports selected from the group consisting of report number, time back, functional responsibility, date raised, product lost, fault found, loss category, cost, corrective action, sent to, cause category, asset focal point, source location, independent service contractor loss, outstanding action, maintenance work request, time down, responsible asset, review process, explanation of problem, explanation of event, close out, and any combination thereof.

107. The system of claim 105, wherein the shutdown incident report register tool provides access to tools selected from the group consisting of administration, shutdown incident report generation, root cause analysis, maintenance strategy, planned maintenance routines, technical changes, report generator, and any combination thereof.

108. The system of claim 107, wherein shutdown incident report templates are defined via the administration tool.

109. The system of claim 107, wherein the shutdown incident report generation on tool is operable to generate a shutdown incident report including data selected from the group consisting of person generating, person sent, loss category, independent service contractor loss, cause category, responsible asset, explanation of event, source location, time down, and any combination thereof.

110. The system of claim 107, wherein the root cause analysis tool is operable to generate a shutdown incident report including data selected from the group consisting of date raised, focal person, execute root-cause-analysis-preventive-corrective-maintenance (RCA-PCM) date, recommended corrective action, actions completion date, cost benefit analysis, approval or rejection date, planned execution details, implementation date, close out date, and any combination thereof.

111. The system of claim 107, wherein the maintenance strategy tool is operable to generate a shutdown incident report including data selected from the group consisting of date raised, execute root cause analysis and preventative care maintenance date, strategy number, action completed date, cost benefit analysis, execution planned date, execution implemented date, close out date, and any combination thereof.

112. The system of claim 107, wherein the maintenance routines tool is operable to generate a shutdown incident report including data from the group consisting of date raise, execute root cause analysis and preventative care maintenance date, strategy number, action completed date, cost benefit analysis, execution planned date, execution implemented date, close out date, and any combination thereof.

113. The system of claim 107, wherein the technical changes tool is operable to generate a shutdown incident report including data selected from the group consisting of date raised, execute root cause analysis and preventative care maintenance date, strategy number, action completed date, cost benefit analysis, execution planned date, execution implemented date, close out date, and any combination thereof.

114. The system of claim 107, wherein the report generation tool is operable to generate a report including data selected from the group consisting of total asset shutdown performance, downtime by cause categories for source locations date range, downtime by source locations date range, downtime by loss category for responsible asset date range, production loss by functional responsibility date range, recurring events date range, shutdown incident report date range, issues report date range, and any combination thereof.

115. The system of claim 93, wherein the access portal further comprises a home page with access to tools selected from the group consisting of asset performance metrics, leadership team, maintenance, supply chain management, planning, well operation, human resources, emergency response, field team, facilities, engineering and construction, and any combination thereof.

116. The system of claim 93, wherein the access portal includes a display geographically representative of a production process.

117. The system of claim 93, wherein the access portal includes an asset performance tool.

118. The system of claim 117, wherein the asset performance tool is operable to provide real time asset statistical data selected from the group consisting of production rate, deferment, uptime, availability, and any combination thereof.

119. The system of claim 117, wherein the asset performance tool is operable to access tools selected from the group of infrastructure overview, choke model, status, traffic light system, production performance, expert system, satellite overview, shutdown incident report, compressor envelope, uptime and availability, loss summary, and any combination thereof.

120. The system of claim 119, wherein the infrastructure overview tool is operable to generate a pictorial overview of the respective assets for a selected field of production process assets.

121. The system of claim 119, wherein the choke model tool is operable to report flow of production along a supply chain.

122. The system of claim 119, wherein the status tool is operable to report real-time status of an asset.

123. The system of claim 119, wherein the traffic light system is operable to display availability and efficiency of an asset.

124. The system of claim 119, wherein the production performance tool is operable to display the potential and actual production performance of the selected complex.

125. The system of claim 119, wherein the expert system tool is operable to display defect alarms and recommended actions.

126. The system of claim 119, wherein the satellite overview tool is operable to display production flow rate over time.

127. The system of claim 119, wherein the shutdown incident report tool provides access to tools selected from the group consisting of administration, shutdown incident report generation, root cause analysis, maintenance strategy, planned maintenance routines, technical changes, report generator, and any combination thereof.

128. The system of claim 119, wherein the compressor envelope tool is operable to display compressor status performance and envelope map showing current operating points on the map.

129. The system of claim 119, wherein the uptime and availability tool is operable to display uptime and availability of an asset expressed as a percentage over a user-selected period.

130. The system of claim 119, wherein the loss summary tool is operable to generate a summary of shutdown incident report information with respect to production losses for a selected asset and detail losses attributable in an independent service contractor and deferred production for the asset.

131. The system of claim 93, wherein the enterprise assets comprise an oil and gas production, processing, or transportation facility.

* * * * *

UNITED STATES PATENT AND TRADEMARK OFFICE
CERTIFICATE OF CORRECTION

PATENT NO. : 7,584,165 B2
APPLICATION NO. : 10/753190
DATED : September 1, 2009
INVENTOR(S) : John Gibb Buchan It is certified that error appears in the above-identified patent and that said Letters Patent is hereby corrected as shown below:

In col. 53, line 7, in Claim 7, delete "Management," and insert -- management, --, therefor.

In col. 54, line 59, in Claim 25, delete "20," and insert -- 24, --, therefor.

In col. 54, line 62, in Claim 26, delete "20," and insert -- 24, --, therefor.

In col. 54, line 65, in Claim 27, delete "20," and insert -- 24, --, therefor.

In col. 55, line 1, in Claim 28, delete "20," and insert -- 24, --, therefor.

In col. 55, line 8, in Claim 30, delete "20," and insert -- 24, --, therefor.

In col. 57, line 20, in Claim 49, delete "interface:" and insert -- interface; --, therefor.

In col. 57, line 32, in Claim 49, delete "work flow" and insert -- workflow --, therefor.

In col. 58, line 44, in Claim 66, delete "(RCA-PGM)" and insert -- (RCA-PCM) --, therefor.

In col. 60, line 20, in Claim 87, delete "toot" and insert -- root --, therefor.

In col. 60, line 10, in Claim 84, delete "to a display of generate" and insert -- to generate a display of --, therefor.

In col. 62, line 4, in Claim 109, after "generation" delete "on".

UNITED STATES PATENT AND TRADEMARK OFFICE
CERTIFICATE OF CORRECTION

PATENT NO. : 7,584,165 B2
APPLICATION NO. : 10/753190
DATED : September 1, 2009
INVENTOR(S) : John Gibb Buchan It is certified that error appears in the above-identified patent and that said Letters Patent is hereby corrected as shown below:

In col. 64, line 21, in Claim 130, delete "in" and insert -- to --, therefor.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,584,165 B2 Page 1 of 1
APPLICATION NO. : 10/753190
DATED : September 1, 2009
INVENTOR(S) : John Gibb Buchan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this

Fourteenth Day of September, 2010

David J. Kappos
*Director of the United States Patent and Trademark Office*